United States Patent [19]

Anders et al.

[11] Patent Number: 4,656,463
[45] Date of Patent: Apr. 7, 1987

[54] LIMIS SYSTEMS, DEVICES AND METHODS

[75] Inventors: Frank W. Anders, Greeley; Joseph C. Herring; Douglas A. White, both of Aurora, all of Colo.

[73] Assignee: Intelli-Tech Corporation, Aurora, Colo.

[21] Appl. No.: 487,284

[22] Filed: Apr. 21, 1983

[51] Int. Cl.$^4$ .................. G08B 13/18; G08B 13/16
[52] U.S. Cl. .................. 340/572; 340/521; 340/541; 340/825.54; 340/870.09
[58] Field of Search .......... 340/572, 521, 522, 825.54, 340/870.05, 870.09, 870.16, 870.17, 540, 541, 584, 603, 632, 674, 539, 531, 573, 568; 343/6.5 SS

[56] References Cited

U.S. PATENT DOCUMENTS

| | | | |
|---|---|---|---|
| 3,376,547 | 4/1968 | Auer, Jr. | 340/51 |
| 3,541,309 | 11/1970 | Cutter | 340/825.54 |
| 4,262,284 | 4/1981 | Stieff et al. | 340/568 |
| 4,285,236 | 8/1981 | Chien | 340/539 |
| 4,333,072 | 6/1982 | Beigel | 340/572 |
| 4,388,524 | 6/1983 | Walton | 343/6.5 SS |
| 4,466,125 | 8/1984 | Kanayama | 340/825.54 |
| 4,510,495 | 4/1985 | Sigrimis et al. | 343/6.5 SS |

*Primary Examiner*—Glen R. Swann, III
*Attorney, Agent, or Firm*—Joseph C. Herring

[57] ABSTRACT

This invention relates to LIMIS systems, devices and methods. Specifically, it relates to the attachment of passive transceivers which can be altered or coded, erased and recoded to various items as "tags", and the use of active transceivers of various types for Location, Identification, measurement of the Movement of, Inventory and analytical, control, guidance and sorting Systems (LIMIS) using and analyzing the information received from the items.

The devices include at least one small unitary, passive transceiver (PT) and at least one active transceiver (AT) and where necessary, one or more repeater-relays and/or reflectors. The PT is attached to or embedded in the item to be identified. The PTs are encoded, decoded, identified, and located and/or their motion is detected and/or measured by the AT. The AT unit functions can be accomplished by one or more independent devices or a single device.

143 Claims, 35 Drawing Figures

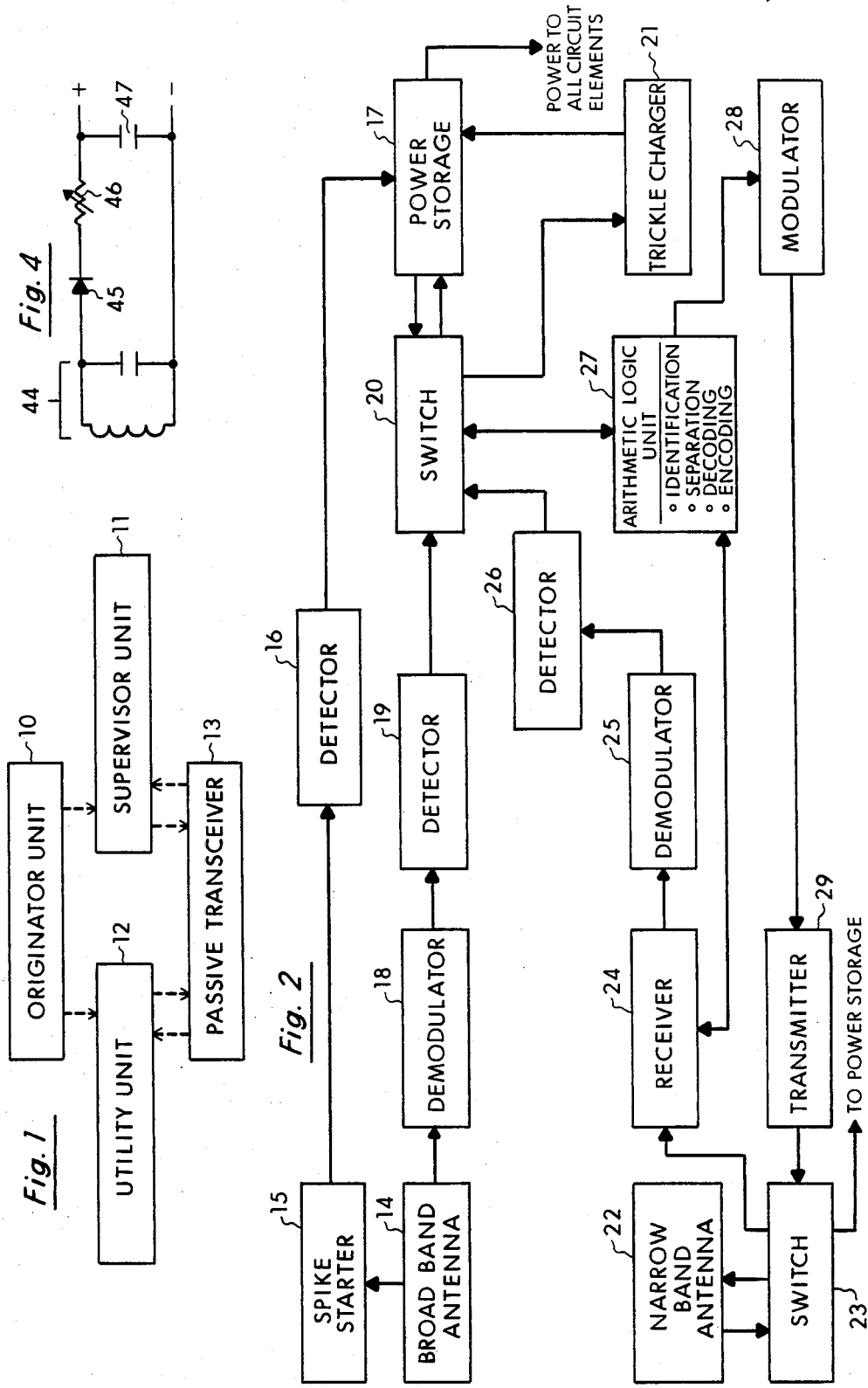

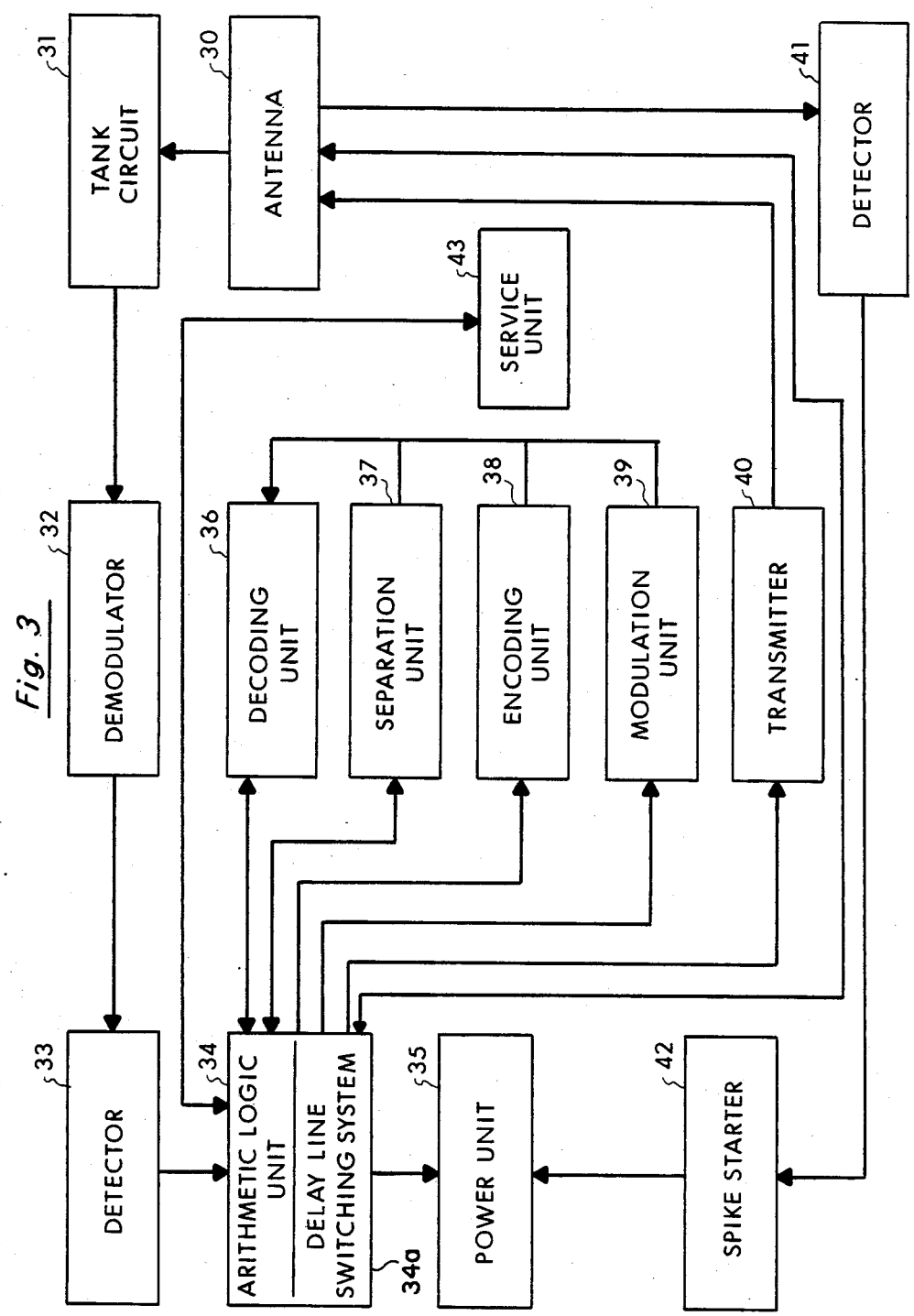

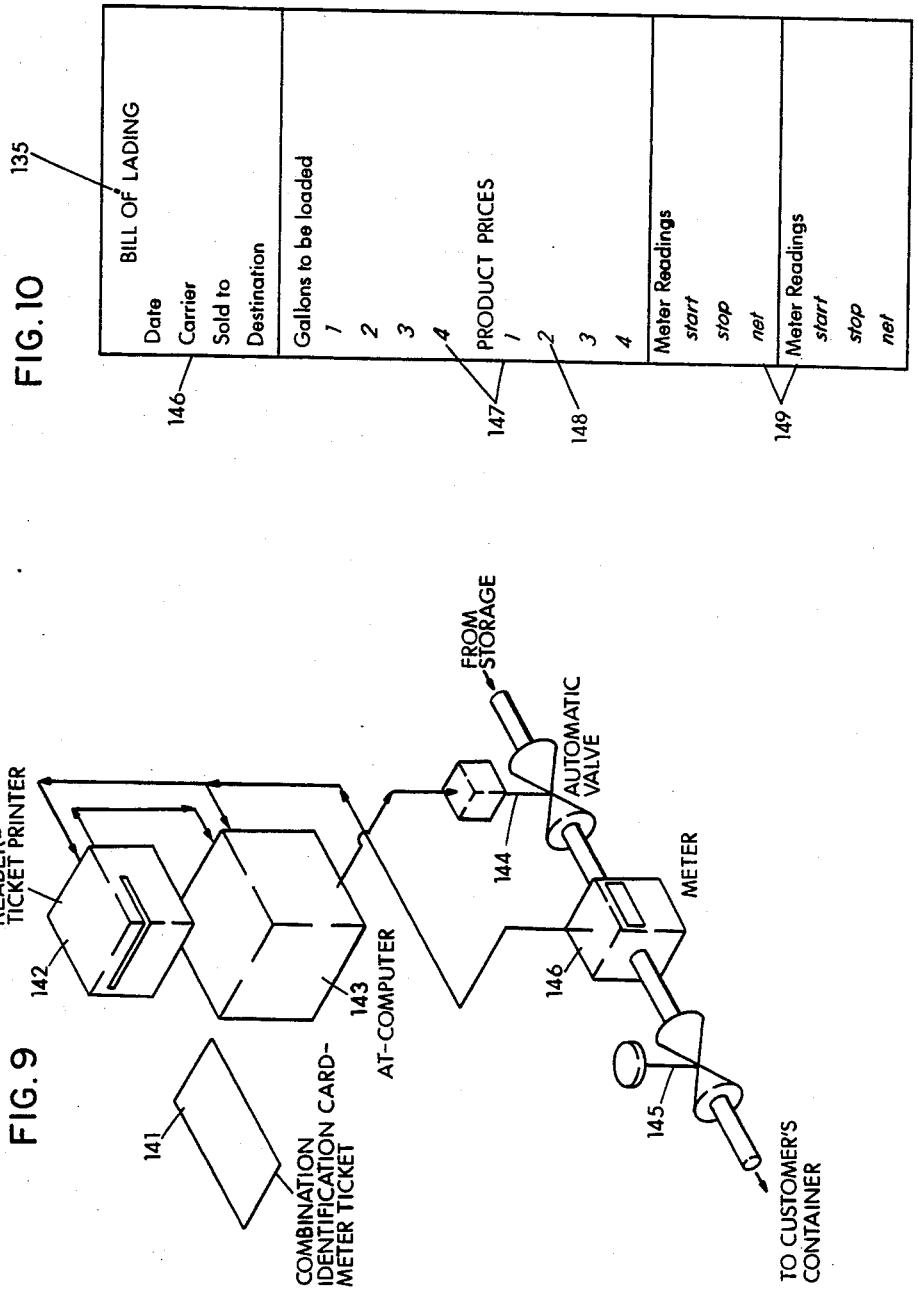

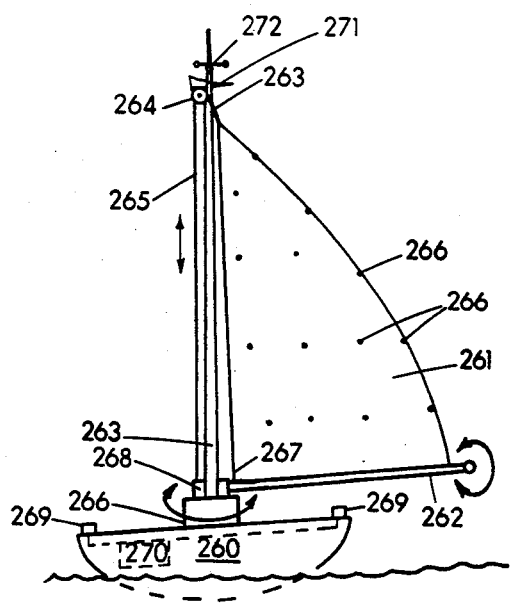
FIG. 21
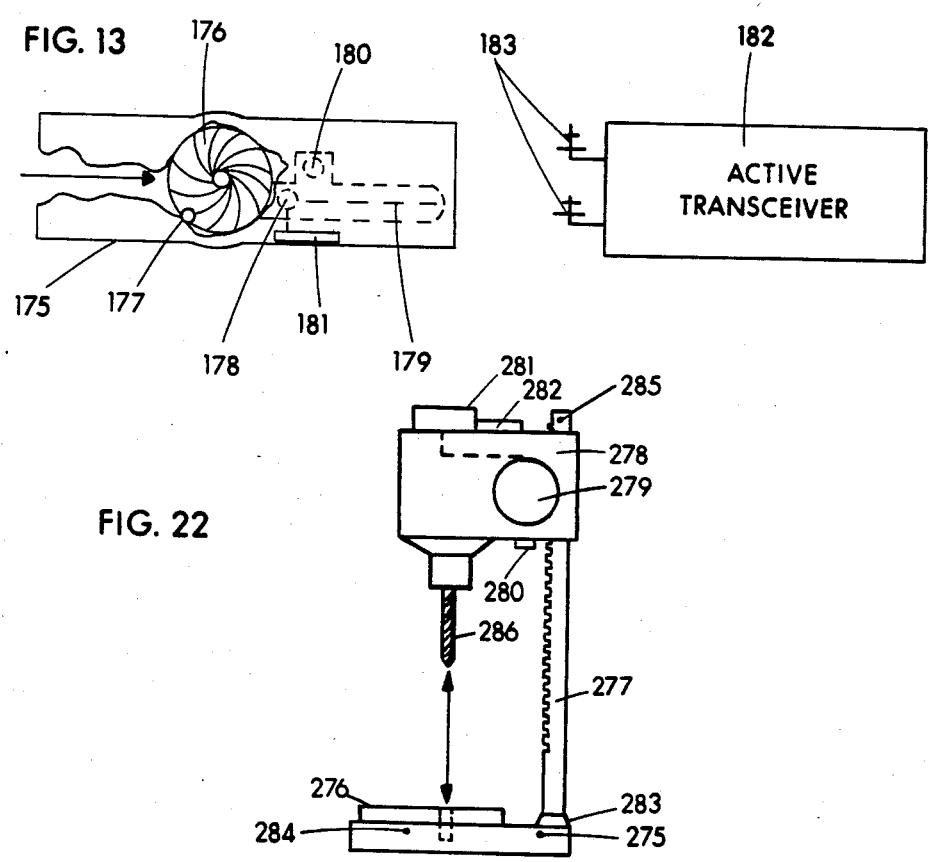
FIG. 13
FIG. 22
ACTIVE TRANSCEIVER

FIG. 16
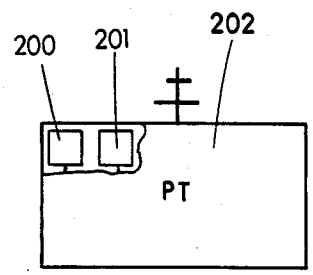
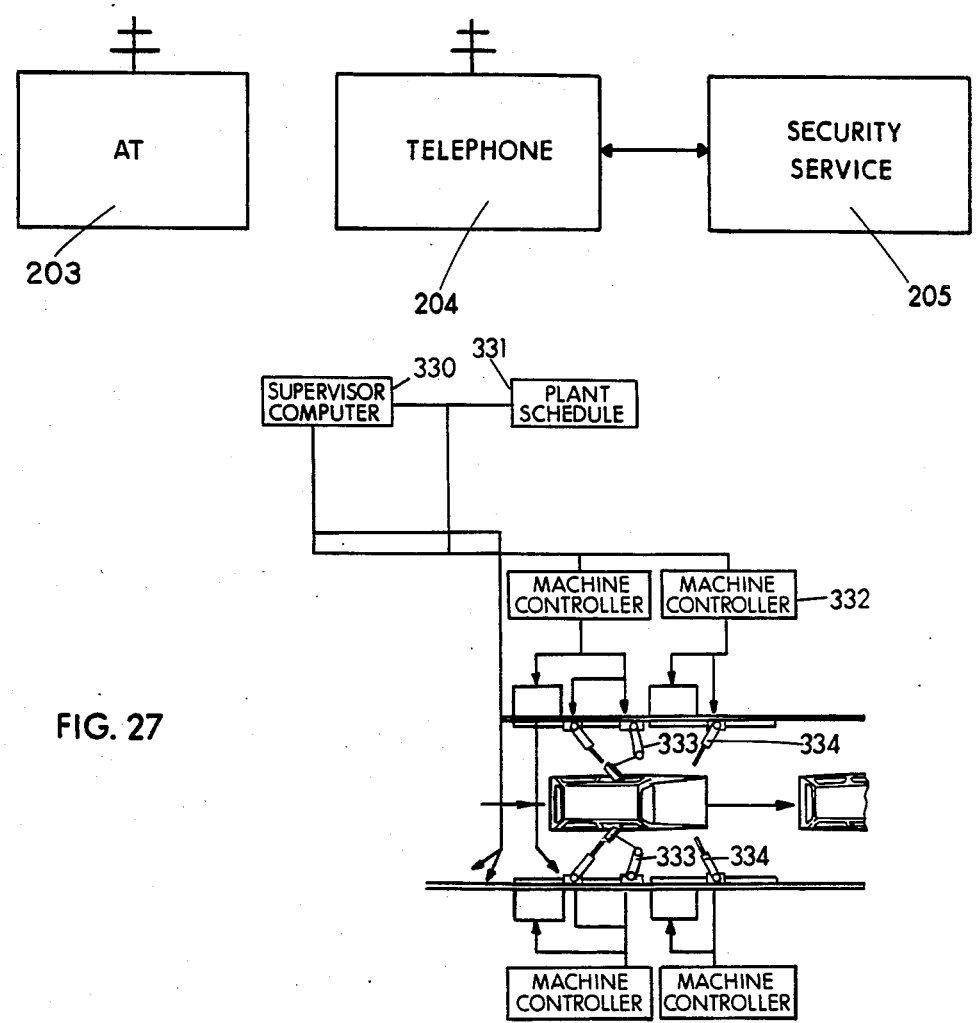
FIG. 27

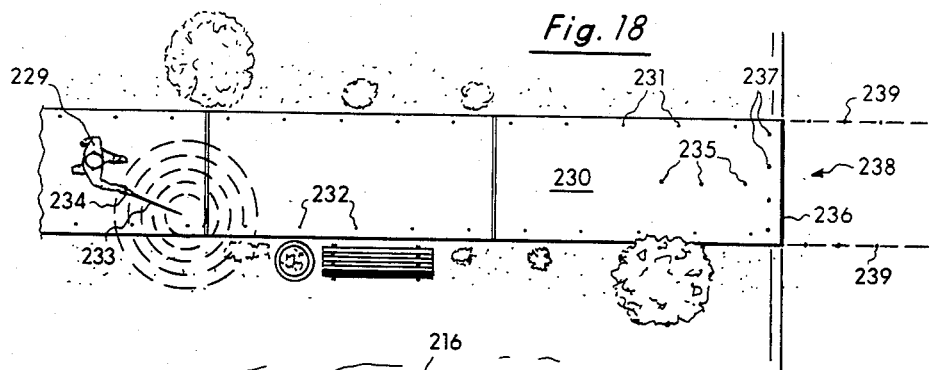
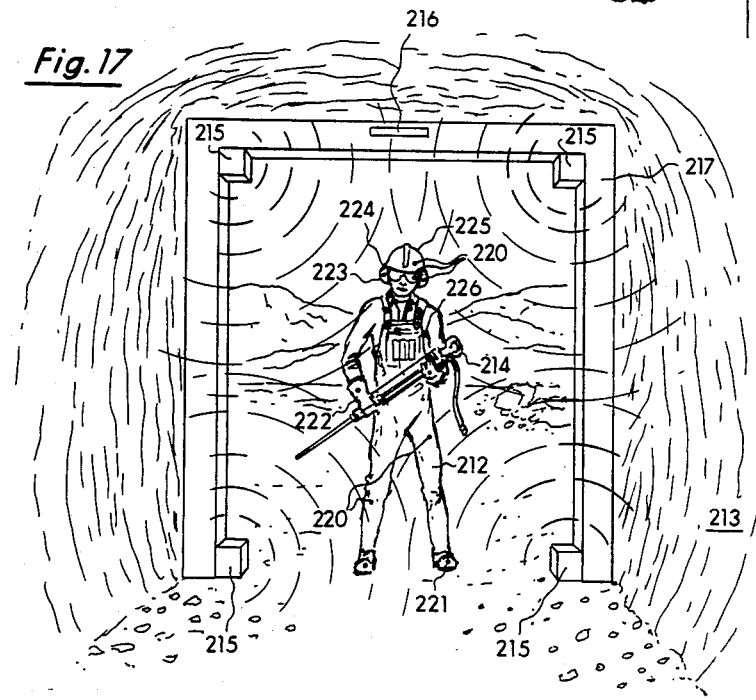
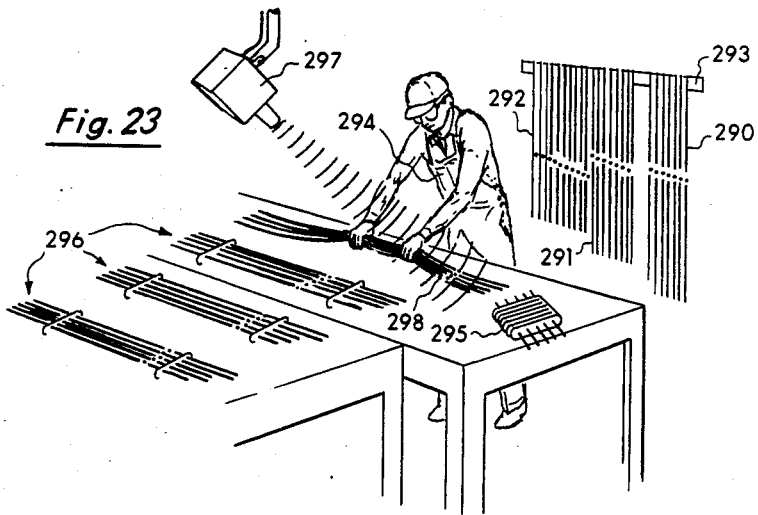

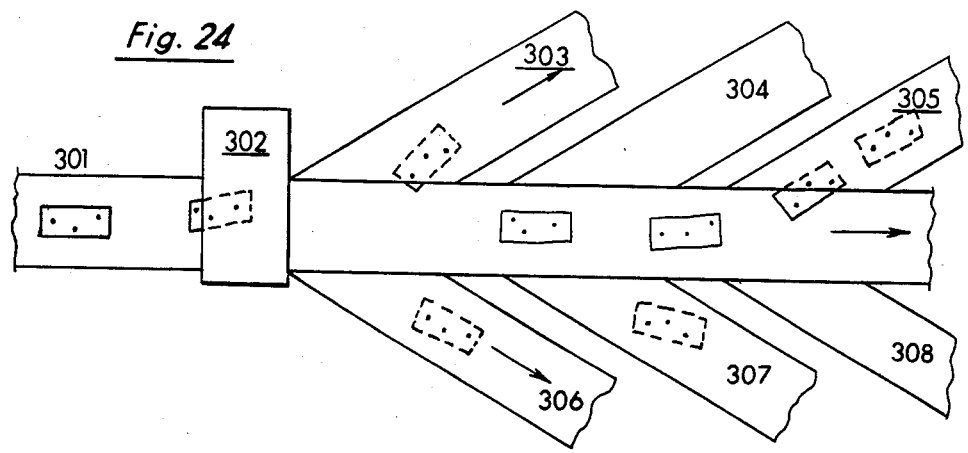
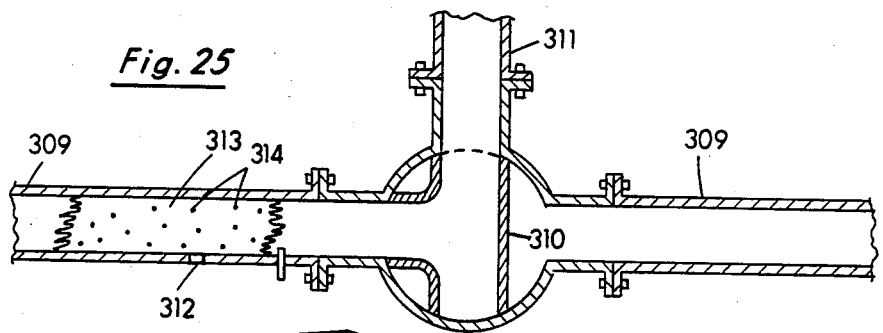
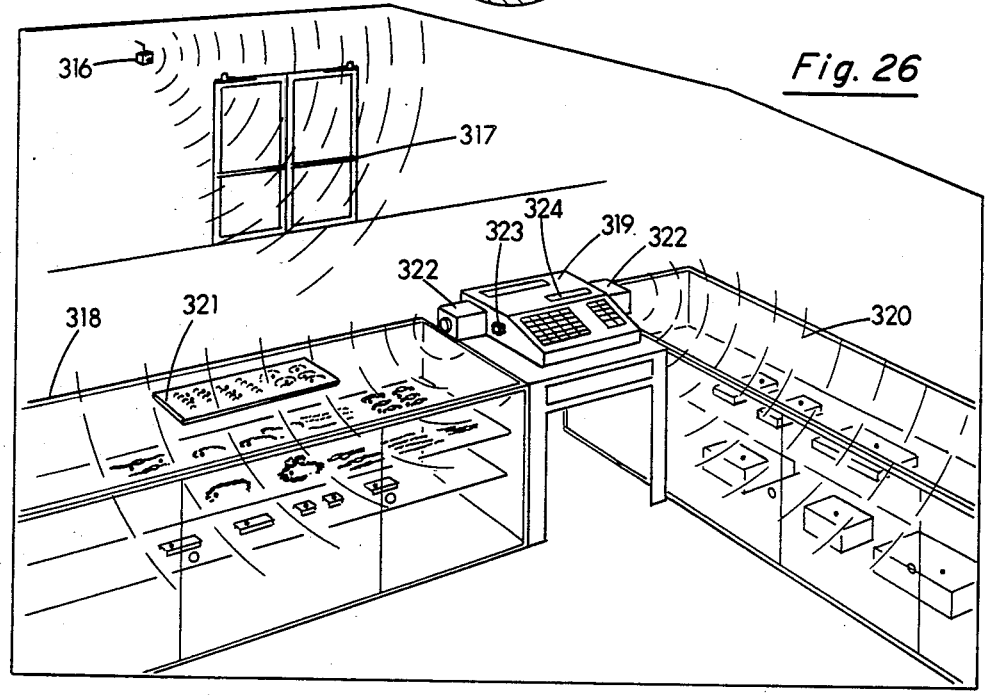

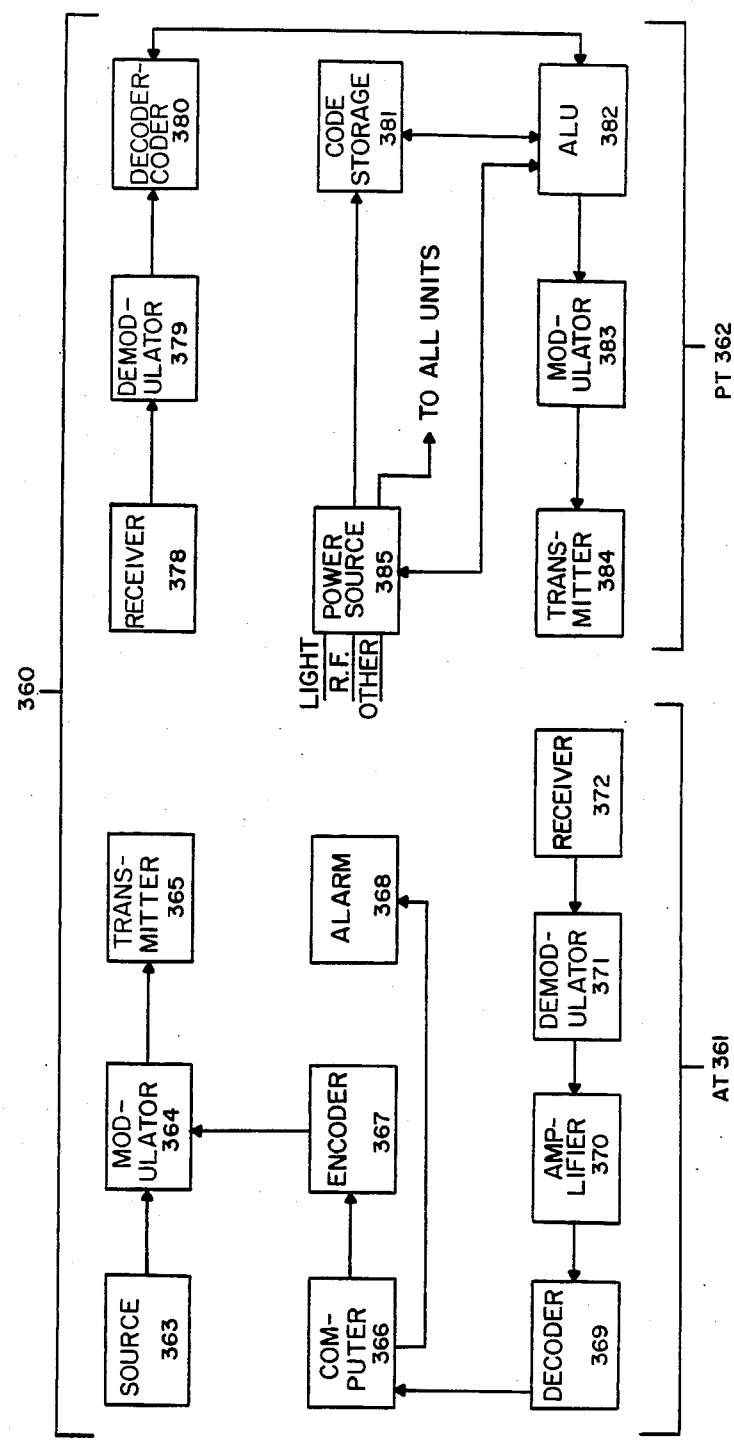
FIG. 30 LIGHT SYSTEM 360

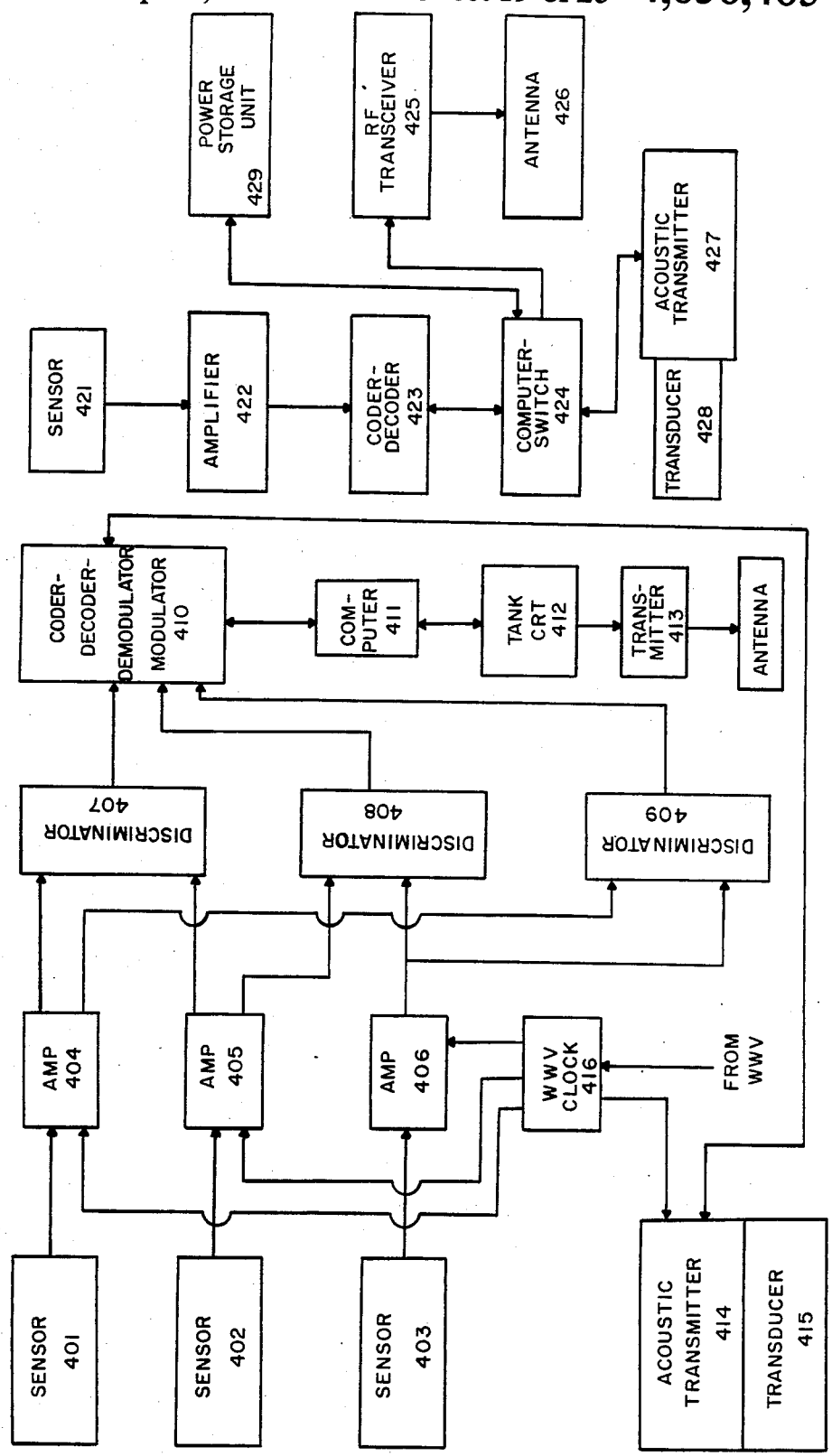
FIG. 31 SONIC AT 400

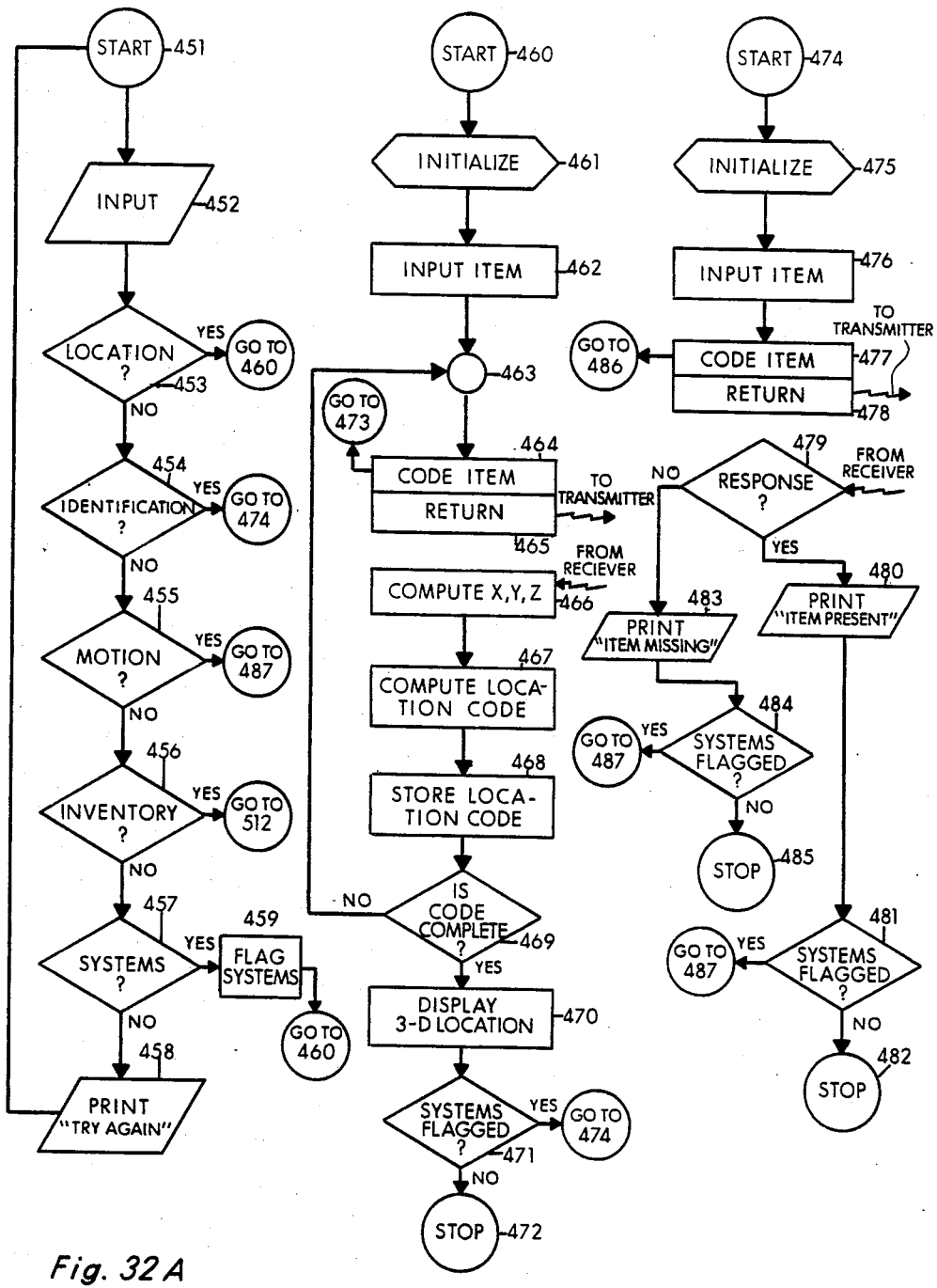
Fig. 32A
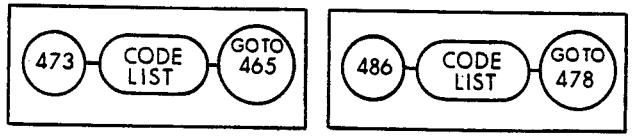

LIMIS SYSTEMS, DEVICES AND METHODS

SUMMARY OF THE INVENTION

This invention relates to monitoring and control systems, devices and methods. More particularly it relates to the attachment of passive transceivers which can be coded, erased, recoded or altered and attached to various items as "tags", and the use of active transceivers of various types for Location, Identification, measurement of the Movement of, Inventory and analytical, control, guidance and sorting Systems (LIMIS) devices and systems using and analyzing the information received from the passive transceivers. Limis is coined for the purpose of providing a generic term for the type of devices and systems taught herein.

SUMMARY OF THE ART

Electronic Article Surveillance (EAS) devices are well known. The system best known to the public uses large white plastic tags which are attached to clothes in many department stores. These devices are removed by the clerks upon sale of the goods for reattachment to other clothing. When an article bearing one of the tags passes through the entrance to a protected store, the circuit in the tag interferes with a radio frequency broadcast by units at the door. A radio receiver senses the resulting resonance and triggers an alarm.

A newer system uses a smaller adhesive label which is glued to the product being sold and has a circuit which also resonates at the store's exit gate if not neutralized. These labels must be covered with a second metallic label to eliminate the tag's ability to resonate.

Magnetic strips form the basis for another EAS system. These strips are of a metal having a high magnetic permeability and alter the energy of the magnetic field maintained at the exit gate to trigger an alarm. The magnetic strips are deactivated by degaussing at the check-out counter.

Still another system uses microwave systems and each tag encapsulates an antenna, a diode and a resonator circuit. The exit gate transmitter broadcasts microwaves at two frequencies and the diode generates harmonics which are detected to set off an alarm. The devices are deactivated at the check-out counter with a wand that emits a pulse to blow the circuit's fuse while appearing to read the bar code. The described systems are the state of the commercial art even with all of their limitations. See Peter Nulty, "Fortune", February 1980, p. 114–119 and "High Technology", September-October, 1982, pp. 16–17.

Another type of system which is more pertinent to the invention discussed herein uses active and passive transceivers which may or may not utilize digital codes.

Typical of the more pertinent prior U.S. Patents are:

U.S. Pat. No. 3,098,971 to R. M. Richardson. This patent describes the use of a remotely actuated device capable of receiving rf energy at one frequency and transmitting at a different carrier frequency.

U.S. Pat. No. 3,914,762 issued to R. J. Klensch teaches a system wherein microwaves are impinged on an identification tag and the tag broadcasts a harmonic frequency of the microwave which is pulse modulated in a preset identification code.

U.S. Pat. No. 4,023,167 issued to S. E. Wahlstrom teaches a system which uses bursts of rf energy to activate passive resonators.

U.S. Pat. No. 4,242,663 issued to L. Slobodin. This patent teaches the transmission of a coded multi-bit digital code signal utilizing phase modulation and examining the output of a homodyne mixer operating on a radar-light recovery reflection signal for a predetermined response.

The prior art devices and systems have consistently failed to solve a majority of the problems facing those desiring to use EAS "tags" on articles in commerce.

A commercial identification and sorting system uses encapsulated, preprogrammed microchip transponders capable of transmitting a specific radio signal containing up to nine digits. The code is programmed during the manufacturing process and cannot be changed. The transponders are used to identify tagged items are powered and interrogated by a "Datawand". The system is made up of the tag, the wand, and a computer and scanner is used to identify horses, fish, humans, cattle, trains and a variety of other devices. Sorting systems can be designed to complement the identification system. In one model the Datawand acts as a combination transceiver and repeater-relay in its cooperation with the Datascan. In another, it activates the tag and this tag broadcasts directly to the Datawand.

Another company uses a coded tag in routing and identification operations, for example, automobiles in a plant. The failure of the various companies working in this area to solve the various problems and combine their solutions with pricing systems and inventory systems is even more obvious. Their failure has led to the development of a completely new art—that of "bar coding" with all of its limitations. The limitations of the various bar coding systems and the enormous future potential for these systems, even with their inherent problems, is described in "The Bar Coding of America", "Fortune", Dec. 27, 1982, pp 98–101.

Companies working in the home, office, factory and security industry have experienced major problems with magnetic, capacitance, and other sensing devices when combined with coded and uncoded transceivers in various types of security systems. These security systems have evolved to the extent that a variety of sensors are used to determine whether refrigerators have failed and the food is warming, water is rising in the basement, various windows have been broken or opened, etc. These various sensors are connected to transceivers which broadcast to a central control unit which is attached to an automatic telephone dialer, etc., to signal an alarm. The codes used with the various sensor-transceivers are used to identify the particular window or object being sensed.

While the previously described industries have, for the most part, evolved over decades, modern computer technology has evolved from a start during the late 1950s and 1960s. From the use of magnetic materials as storage medium, the industry evolved read-only memory (ROM), random access memory (RAM), erasable programmable read-only memory (EPROM), electrically alterable programmable read-only memory devices (EAPROM), and electrically erasable programmable read-only memory (EEPROM). The future for EEPROMs is described by J. Bylinksi, "Fortune", 1982 pp. 183–184. Finally, the encrypting and decrypting of various electronic devices has evolved with electronic circuitry and computer technology.

ART ANALYSIS

The fact that so many researchers in so many countries, companies and universities have worked and are working on various aspects of the systems' problem addressed by the inventions described herein and have failed to combine the transceiver, computer memory and coding technology with their various systems to form the all-encompassing system approach claimed herein points up the great degree of unobviousness inherent in the systems described and claimed.

Electronic semiconductor devices are expensive in small volume production but inexpensive in high volume production, John Free, "Popular Science", January, 1982, p. 62. To be inexpensive enough to be widely utilized, the tags in LIMIS systems should be useful for many purposes and in many types of systems. The inability to alter the transponders used in the prior art devices limits their utility and prevents ultimate minimal costs. ROM and PROM units can be compromised if their code is discovered. The alterable memories utilized in the LIMIS devices can be modified to reduce compromise. This feature makes the passive transceivers used in the LIMIS systems preferable to the nonalterable systems of the prior art. As will be obvious during the course of the description of this invention, the inventions claimed herein provide tags with the broad utility that leads to low cost "tags". LIMIS systems provide the necessary breadth for encompassing all of the multifarious uses of the prior art systems and provide a basis for still other uses, for example, in systems analysis with little additional tag cost.

Substantial EAS art exists for obtaining coded responses from passive transceivers, including some systems for the purpose of locating objects in two and three dimensions, i.e., spatially. Often, these systems can be compromised by their size, reasonably simple electronic counter-measures, jamming, signal identification and conversion. No prior art device is capable of attaining the objectives of this invention although some of the devices, codes, circuits, programs, and methods descried in the prior art can be used, in whole or in part, in designing and using LIMIS systems, devices and methods.

Basic radio transmission theory and practice is reviewed in, for example, *Principles of Communication Systems*, Herbert Taub et al, McGraw-Hill, 1971, p 514; and *Signals, Systems and Communication*, B. P. Lathi, John Wiley & Sons, 1967. More sophisticated noise reduction techniques are discussed in *Analog and Digital Filters Design & Realization*, L. O. Chua, ed. Prentiss-Hall, 1979, p. 632. Computer technology is extensively reviewed in *Electronic Circuits: Discrete and Integrated*, D. L. Schilling, ed., McGraw-Hill, 1963; and, G. L. Braun, Academic Press 1963. Further, the thin film, printed circuit and remaining micro circuits technology needed for the manufacture of LIMIS devices and systems is commercially available. See *Introduction to Microcomputors*, Sydney B. Newel, ed., Harper & Row, 1982, Ch. 12-14.

GENERAL DESCRIPTION OF THE INVENTION

This invention is, for simplicity, described in terms of electromagnetic radiation, e.g., radio frequency, TV frequency, and microwave frequency embodiments. However, it also encompasses light, sound and other frequencies utilized for various signaling purposes.

The devices include at least one small, passive transceiver (PT) and at least one active transceiver (AT) and where necessary, one or more relay-repeaters (RR) and/or EMR reflectors. The PT is association with; e.g., adhered on a container cover with a contact adhesive; attached to, adhered to, or embedded or immersed in, (generically speaking "attached"), the item to be identified. It is encoded, decoded, identified, and located and/or its motion is detected and/or measured by the AT. The AT unit functions can be accomplished by one or more independent devices or a single device. Thus, a security unit can identify, locate and detail the motion of a PT but can only partially code and decode (alter) the computer memory of the PT. Alternatively, an inventory system for a large plant can have a large system of antennas and several AT's in separate locations, all operating independently with common coding or integrally with a central processing unit which provides the capability of performing most or all of the discussed functions.

The passive transceiver, because of its relative simplicity, can be quite small and inexpensive. The PTs can, for example, be adhered to clothing, animals, amusement devices, robots, scientific instruments, glass, recording media, documents, tickets, keys, sound and video reproduction media, sporting equipment, vehicles and their tires and/or tracks, calculators and computers, monitoring equipment, building entryways, e.g., doors and windows, building enclosures, shipping and other containers, adornments, e.g., jewelry, and electronic components. Radio, sonic or photonic homing triangulation or ranging can be used to find the PTs. Since the PTs are coded, they can be used, for example, to identify people, count inventory, detect movement of parts in scientific instruments, identify animals in a herd or which door or window is opened or windowpane is broken.

Several types of AT's are useful in the systems. These are, for example, utility (uu), supervisory (su) and originator (ou) units.

The utility unit encodes PTs with at least the ATs identification code and the user's PT utility code, and can have a code alteration system which can alter the coding in PTs which it has encoded. It is designed to detect the PT within the useful limits of the PT's transmitter range and is equipped with a computer type memory and logic sufficient for its designed purpose. It is preferably within a sealed container and is adapted to erase its programming and/or the data in its storage medium on an unauthorized breaking of the seal. It is, also, preferably, capable of being restored to its original condition by the manufacturer after a seal is broken. Finally, it is, preferably, capable of broadcasting a range code to a PT equipped to receive such range code and thereby substantially increase the broadcast range of he PT for pre-determined periods.

To monitor and preserve the integrity of the system, supervisory units are for use by government, e.g., the police, or private security organizations.

Supervisory units are designed to enable police and other security organizations in the location of PTs where the security organization has been provided with certain information such as, for example, the serial number of the AT utilized to encode the PT, the PT inventory number and the personal AT owner identification code. Preferably, the supervisory units can substantially increase the broadcast range of a PT for predetermined periods.

The supervisory unit can utilize any of the modern fiberoptic or telecommunication networks, for example, radio telephone cellular broadcast networks in locating stolen property, pets, children or the like.

The originator's unit, i.e., a unit from a LIMIS AT manufacturer, can have one or more or all the features of the utility unit, and the supervisory unit. These units can have the additional capability of reactivating any AT which may have had its computer programming and/or storage automatically erased through the breaking of unit seals by tamperers or through breakdown of utility transceivers.

The utility, supervisory, and the originator units are all preferably sealed to prevent breach of AT and PT security. Preferably, all active and passive units should have a code for identification, a variable description, a coding method of self-correction using error detection—error correction methods; redundant circuits; anti-jamming capability and a coding method for, inter alia, on receipt of predetermined coded information from an AT, preventative maintenance and testing.

UTILITY CONSIDERATIONS

The inventions claimed herein provide a basis for pervasive security, inventory, identification and motion detection, and measurement and operating controls, equipment and systems. Obviously, these various functions, methods and devices are overlapping in end use. Most prior art systems are unable to utilize a minimum of active and passive transceiver designs to accomplish the pervasive objectives of LIMIS. They, generally cannot protect themselves from more than the simplest countermeasures and are not equipped to provide for location of goods once stolen or misplaced. None appear to have resolved the problems of operating within limitations of small transceivers imposed by the radar range equation to achieve results over extended distances. (See *The Radar Handbook*, M. L. Skolnick, McGraw-Hill, 1970, Ch. 1–5).

The complexity of a particular LIMIS system will depend upon the type of encryption and decryption used and complexity of its utility. The following examples illustrate this fact and design parameters to be considered.

An owner of a householder utility unit (UU) will, in the normal case, code less than 1,000 household, shop, and automotive items within the allocated set of identification numbers.

A Country Club will have a more compicated utility unit. In such a unit, a central UU will be located in the Club house. It will have a transmitter with a broadcast range covering the entire gold course and adjacent grounds. To reduce the broadcast range required of the PTs in, for example, golf balls, clubs and gold shoes, the player will be provided a personal pocket-sized UU. The player will encode his golf balls with a number from the set of numbers allocated to the Club. The player's UU will act as a switch for the Club house UU. This will insure that the PT power requirements are low. In operation, the player's UU will send a coded signal to the Club house indicating that a particular item is lost. The Club house UU will broadcast a coded signal to which the lost item PT will respond by emitting identification or ranging signals which are then detected either through multiple antennas spaced at predetermined intervals around the course or through repeater-relay transceivers spaced at predetermined intervals around the course.

An office provides a different kind of complexity. In an office, each sheet of paper can have an attached PT. Filing, as such, can be ignored. All papers can be stacked on shelves or generally filed in easily handled bundles or cartons. A system similar to the golf course UU is used except that the broadcast frequency is preferably much higher and the antennas within the office will be located much closer together so that the exact location of a particular piece of paper within the office can be identified with some precision. In the office operation, antennas would be placed at, possibly, 10–24 inch intervals in one or more arrays in the walls, floor and/or ceiling and inside and/or outside shielded containers such as metal desks, filing cabinets, and safes. A secretary looking for a particular sheet of paper will code in the number of the paper in her hand-held unit, it will broadcast a signal to the office UU which will, in turn, interrogate each of the antennas or repeaters and receive back a broadcast providing the position of the PT. The UU computer will analyze the received signals from the antennas and, from the analysis, determine and display the approximate to exact location of the sheet of paper on the master and/or hand unit or generate some signal denoting proximity from the hand unit.

In an alternate configuration, the hand-held UU can be equipped with a suitable antenna(s) and the secretary can point the UU around the office until signal reception is obtained from the PT. The unit would then indicate the point of strongest signal strength and provide a basis for homing toward the sheet.

The oil industry provides additional examples of units with differing complexities. Millions of dollars' worth of oil is stolen annually. The oil companies will suspend in their crude oil encapsulated PTs having the density of the crude. In this manner, the oil containing the encapsulated PTs can be traced and identified in commerce whether diverted from a tank truck, pipeline, tank farm, refinery, or the lile. In the PTs are mixed uniformly with a specific number of PTs to a unit volume, the PTs can be utilized in flow and volume measurement.

An entirely different problem exists in preventing theft of construction, farm and oil field equipment. Hundreds of millions of dollars' worth of drill pipe, drill bits, kellys, pumps, motors, diesel engines, bulldozers, graders and other equipment is stolen annually. The PT used for this purpose must differ from most PTs because its range must be substantially greater than that of, for example, PTs used in an office. The required broadcast range for this type of PT may be up to 10 miles. The radar range problem is circumvented by several mechanisms. A few of these mechanisms are: (1) the PT can be much larger than that required for use in the office; (2) the PT must have a larger power source; (3) ATs can use detectors of increased sensitivity; (4) ATs can periodically provide the PTs with high amplitude energy spikes to charge the PT capacitor storage; and (5) RRs and ATs can broadcast at much lower frequencies.

Sand, gravel, cement, and other particulate solids used in construction and other industries are also stolen. PTs utilized in tracing these materials must have the approximate appearance of the material into which the PTs are mixed and the frequency selected for the transceivers are governed by the "transparency" of the material into which the PTs are to be mixed to the frequency or frequencies chosen transparency is the ability of the material with which a PT is associated to pass most, if not all, of the EMR or sound being used for communication with and substantial reflection and absorption. The character of the material, e.g., its abrasiveness and specific gravity, must also be taken into account in the construction of the particular passive transceiver utilized.

Equipment protection can be obtained with the previously described PT and various antenna systems and one or more RRs. Where a larger PT is utilized, it can also be coded to broadcast to a repeater unit at a low frequency and thereby conserve its energy. If the RR is destroyed, the absence of a return signal from a repeater-relay can trigger a broadcast by the PT at increased power with a commensurately increased range to prevent compromise of the system triggering alarms. If no answer is received after an increased range signal, the alarm is signaled. In many situations, e.g., where a long-range broadcast is required, the use of an active power source for extended range is desirable. The central UU or a supervisory unit, preferably can also increase the broadcast range of the PT in the event a repeater is known to be compromised.

A simpler but different type of system is required for a library. Many libraries presently do not allow browsing and the librarian brings to the user specifically requested books. Using the LIMIS system, the library clerk finds a particular book in the same manner that the law office secretary finds a particular sheet of paper. Similarly, a patron can code the book's number into a hand-held unit and follow the directions of the hand-held unit until the book is located.

A still different use of LIMIS is in the counting and sorting of documents, e.g., paper currency, bonds, shares of stock, tickets, and gaming chips. In such systems, very small PTs are mixed in the paper fiber or plastic and are formed into and become an integral part of the document. For example, the document might have 5-10 PTs randomly distributed through its geometry. Each of the PTs in a document would be coded the same. If the document were torn in pieces, it would still be identifiable or reconstitutable. A document sorter would have the ATs or an RR very close to the document being sorted. This mechanism would provide a means of marking every document manufactured and would make proof of theft much easier. The problems incurred by the criminal elements in their attempts to launder money could be made almost insuperable. For example, banks would have in computer memory lists of stolen bills and, the bill sorters could identify stolen bills as a matter of course. The broadcast range of document PTs can be as short as 3-10 feet and bill sorter-counters one-fourth to one inch and be effective.

PTs can be affixed to torsion balances and the amount of displacement of the balance measured by the AT to give the weight of the object causing the displacement. The motion of PTs attached to a runner's feet, calves, knees, thighs, waist, shoulders, arms, etc., can provide, through AT computer evaluation, a complete analysis of the runner's style and efficiency. Tracking members of a herd of antelope or buffalo is the equivalent of keeping up with oil field equipment. The motion of robots and their moving components can also be detected and used in feedback systems.

PASSIVE TRANSCEIVER

The term "passive" in "passive transceiver" denotes that the PT is physically connected to no external power source. The power source and other components are unitary and self-contained. Thus, batteries or other active sources which may be used in the PT are not replacable. The components can be monolithic on the chip substrate or can be braised, glued or otherwise permanently combined. Since an active power source, e.g. battery, is used in the PT, the PT could be considered active by some definitions. However, for purposes of this application, passive transceiver is used to denote the transceiver used as the "tag" which incorporates the active source within the structure of the tag so that it is a unitary, self-contained device which can be of various physical dimensions depending upon its application. The active source can be used as an auxiliary power source to intermittently increase the broadcast range by increasing power output of the PT in response to an encoded signal. Power for transmission will normally be provided by capacitive storage of received signals, but the active source can contribute to signal output where necessary. The active source can also provide one or more supply voltages. An active source can be used to power active memory means, e.g., where RAMs are used in the RAM/ROM combination memory.

The PT is designed to be of minimal cost and minimal size for the desired usage. Preferably, for most uses, the PTs are based on computer chip technology and their size range will be from less than about one half the size of the period following this sentence to upwards of one inch (2.54 cm) and more preferably up to one half inch (1.27 cm) on a side or in diameter. The size of the PT will be determined, in part, by its intended utility. The desired broadcast range and power output will also determine, in part, the size and thickness of the PT.

This invention utilizes several classes of PTs. All are units with at least one transceiver, code/decode unit which can be a part of a computing unit, power unit, and antenna combined into a system utilizing a single micro-electronic integrated circuit or "chip". Some PT systems also include various electromagnetic radiation (EMR) or sonic input devices, such as acoustical or optical sensors, photocells, IR, UV and scintillation detectors or other meters. Still others with expanded memory or logic units will be connectable to other system components, e.g., when the units replace electronic components in test instruments, computers, robotics, automation and measuring devices. In some instances PTs will contain transmitters or will be connected to separate microtransmitters. Effectively, the LIMIS unit will be a test unit which can be interrogated.

PTs can be suspended in any fluid, whether liquid, a slurry, or a suspension of solids in gases, and the PTs suspended in the fluid can serve to actuate various devices and/or identify the fluid as being owned by a particular individual, from a particular source, or as having a particular ultimate destination.

The PTs can be coated with silicone, Teflon polymer or other inert coatings, where desired, or suspended in a gel or liquid matrix, e.g. in a golf ball center or encapsulated in a material designed to provide PT of predetermined specific gravity. Many PTs should be equipped, at least on one side, with a contact adhesive. The PT can be attached to a substrate usable in labeling equipment prior to a final attachment to an item to be identified or located.

Due to the fact that the passive transceivers will be affixed to many items of commerce and will not have the protection normally accorded computer chips, caution can be taken to insure that the silicon or other substrate is resistent to destruction, e.g., that the conducting lines between elements, etc. are protected, that dynamic and electronic redundancy is incorporated in the circuitry and tha a protective coating, stiffener, and/or cover is applied to the chip to reduce the likelihood that the chip will become useless when tampered with.

The PT's are manufactured using state of the art technology, but preferably with "wiring", and load matching circuitry connecting the PTs. Where this is done, multiple PTs can be left coupled in "daisy chains" and will act as cascade broadcast units with the output of one PT being applied to the next PT with broadcast only from the last PT in the series. This serves to boost signal strength where needed.

PTs can be designed in which there is only a non-EMR power source(s), only an EMR power source(s), or both. When both are used, both can be turned on, for example, when a supervisory or originator's unit applies a code to increase the broadcast range or shorten the pulse length.

High amplitude spikes and/or continuously broadcast energy can also be used to boost the power for increased range broadcasts.

Where desirable, several unconnected PTs can be ganged, for example, in some uses, six unconnected PTs might be positioned around a central cube to achieve maximum broadcast response in several directions. This usage might occur, for example, in a golf ball. Alternately, specially designed antennas can be used providing a broadcast pattern over, for example, roughly a hemisphere. In such case, the PT might have an antenna mounted on both sides, or two PTs with such an antenna on one side can be glued back to back. In some instances it may be feasible to provide the "PT" with internal X, Y, Z antennas. This will, of course, usually require a thicker PT. The PT can be constructed using thick and/or thin film technology in the formation of capacitance, inductance, resistance, and power units. The thickness of the various "wiring" and components of the PT will depend on the application but in general will vary in film thicknesses from between today's bottom limit of about 500 angstroms to a few mils.

The PT can be equipped with a single all wave antenna or can have more than one antenna. Thus, the PT can have an all wave antenna for the reception of ambient rf energy and a second antenna for receiving and broadcasting specific frequencies. Where the PT is used with sonic systems or fiberoptic circuitry, or where laser light is utilized to interrogate the PT, the "antenna" will be a sonic, photonic or other detector of desired wave length.

ACTIVE TRANSCEIVER

The term "active" in "active transceiver" indicates that the power for the system will most often be connected to an external power source or to a separate, replaceable battery.

The AT is, basically, a combination of a micro or mini computer, an encode-decode unit, one or more radio transceivers and one or more antennas, and/or reflectors or transducers. The AT can also include repeater-relays and multiple transceivers/transducers.

There are a number of types of active tranceivers utilized in the LIMIS systems. These transceivers, when broken down by hierarchy are in three primary categories. The first is the originator unit; the second the "supervisory" unit, and the third the "utility" unit.

Utility units can be broken down into several categories, depending on the end-user utility. For purposes of this discussion, the units are arbitrarily broken down into identication, location, inventory, and motion units. The identification units specifically identify whether a specific coded PT is present as, for example, a particular moose in a herd, an automobile on a parking lot, a diamond ring in a jewelry store, or a TV set in a motel room. The location unit determines whether the specified item(s) is present and whether it is at a specific location. For example, are all rings to be shipped in the delivery box and is the location of the box in the warehouse? The inventory unit determines whether a specifically coded item is present, and its present location within a given area.

The motion unit will determine the presence of a specific item, its location, whether it has been moved from its former position, the rate of present movement, its velocity, acceleration, and/or the predicted distance of movement from measurement to measurement.

POWER SOURCES

Passive power sources include batteries such as nickel-cadmium, silver-zinc, lithium-zinc and other Li-XX hermetically sealed lithium batteries, e.g., preferably lithium iodide or lithium sulfide. In addition to batteries, other energy providing mechanisms may be attached, for example a thermoelectric unit, a solar cell, or a solid chemical fuel cell, e.g. $BiI_3$, or combinations of the above. Some regenerative fuel cells use solar energy for regeneration. The number of times the passive power source, e.g., a nickel cadmium battery, is recharged must be considered when the PT end use is determined. If it will take up to about 1,000 recharges, the end use should require many fewer recharges.

The micro batteries can be attached to the chips using the appropriate conductive and non-conductive materials, as can tank circuits, antennas and other devices.

The capacitor technology required for passive power units, tank circuits and the like is well developed and can be laid down as a part of the unit or glued thereto with appropriate conductive leads. While capacitors and inexpensive storage units are broadly useful, there are other utilities, a beacon, which may require no more than a delay line, charge coupled device or electric power storage.

The short discharge times of present capacitors, sometimes nanoseconds per picofarad, is taken into account by several means, e.g., (1) using faster interrogation times; (2) using delay lines; (3) using excess capacitance; (4) recharging at a faster rate; and (5) daisy chaining components.

The PT can be programmed to alert the AT when PT power needs a boost either through a spike charge or a recharge of the battery integrated with the chip. The code, in addition to boosting broadcast range, can be utilized to switch current from a passive power source into the unit if the passive charge system is discharged below pre-determined levels.

For LIMIS, the interrogation time will depend, in part, upon the time required to charge the capacitors in the passive power units. If only one antenna and one frequency is being used by the PT, the charge cycle is slower. If there are two antennas or more, then the PT power storage capacitor can be charged at different frequencies and the charging period minimized.

DETECTORS

The detectors utilized in LIMIS systems are of two kinds. These are the communication and non-communication detectors and those utilized by those skilled in the technical and manufacturing arts in detecting the various electromagnetic radiation frequencies utilized in the various embodiments of this invention. The non-communication detectors include detectors for ions, elemental particles, vibrations, noises, elemental and compositional presence and concentrations, and other data not having human information content.

MEMORY MEDIA

A variety of memory media can be utilized in various code and memory configurations for microprocessors and logic devices used in LIMIS systems. These include the various alterable forms of media, e.g., EPROM, EEPROM, and EAPROM. It also includes ROM where each chip is differentiated during the manufacturing process; PROM where the encryption algorithm, or other mechanism, is premanently "burned" in; and PROM where the coding is burned into one area or a segment of the chip and a later code is then burned into a previously unused portion of the chip and a mechanism is provided to blank the previous codes from consideration. Prior to the development of these computer components, a variety of non-erasable hardware and software equivalents existed. These include various circuits and magnetic media, e.g., monostable multivibrators, delay lines and bucket brigade type circuits. These types of microelectronic media and their uses are taught in the book *Microprocessors: Fundamentals and Applications,* W. C. Lin, IEEE Press, 1976, pp. 334. Another text going into the details of chip fabrication is *MOS Field Effect Transistors and Integrated Circuits,* Paul Richman, John Wiley, 1973, pp. 259. Magnetic storage media are useful in situations where magnetic countermeasures are not easily carried out. The utility of particular "memory media" will be determined by the number of code, decode, and recode cycles which can be carried out in the medium. Thus a combination of ROM and RAM can be used an infinite number of times while the physical characteristics of an EPROM or EEPROM can limit the utility for a particular purpose.

To be operative a LIMIS device must use some form of alterable or erasable, reprogrammable ROM or a combination of ROM and an easily programmed memory medium for example, PROM, RAM, magnetic storage, delay lines and monostable multi-vibrators.

There are advantages and disadvantages inherent in the use of any and all of these memory media. EPROM is highly secure in that it requires a combination of electrical power and ultraviolet light for its erasure but is slow in the decoding cycle. The EEPROM is outstanding in that it is very secure from electronic tampering and is codeable and alterable. Special equipment is desirable for such encoding and decoding. This enhances the security of the system. On the other hand, it requires voltages as high as 5 V and 21 V for such encoding and decoding and the passive power source must supply this power. In a hybrid system, the ROM is totally secure and is used as the "lock" for relatively insecure RAM or other easily eraseable and programmable media used in a PT. Electronic countermeasures can be used against this particular hybrid only with difficulty, but the power source must power the memory at all times or it will disappear.

Some hybrids require continuing power to maintain their memory. Where there is minimal available power, these systems can provide undesirable drain on the available power supply. Memory media such as RAM, delay lines and monostable multi-vibrators are of this type and encoded data is subject to extinction if the power supply is inadequate. See *Electronics & Nuclear Engineering,* R. I. Sarbacher, Prentice-Hall, Inc., 1959. Where the power supply is adequate for the duty cycle, EEPROM and EAPROM are the media of choice.

ANTI JAMMING FEATURES

White noise jamming is difficult to overcome. But, it is also easy to detect when white noise is being used as a jamming source and thereby easy to provide an alarm if someone uses a white noise jamming system to thwart security. The major problem of jamming is changing the code assigned a given item. The use of groups, rings, fields and co-sets as transmission codes reduces jamming potential. One anti-jamming feature of LIMIS is that it takes one or more particular codes to enable the system to work. This code is determined by several sources including the originator unit, the utility unit, and the supervisor unit. One would have to know the codes of these units and their owners in order to completely jam and/or subvert the unit. An electronic expert can tie a code-seeking transmitter to the system and by chance come up with the codes necessary to break cyclic numerical codes or other codes with the large numbers of bits used in identification but the use of such coding is a good anti-jam feature.

Another method of foiling jamming is to use a variable frequency system in which the code transmissions from A to B are made with a number of different frequencies. Sometimes these frequencies are part of a single carrier and sometimes they can be part of a multiplex frequency system. Transmitting several thousand codes at different frequencies at the same time is no problem for a complex AT. The AT and PTs in a variable frequency system can use carrier codes in their transmissions to synchronize operating frequencies. Further anti-jam features include synchronous clocks in the PTs and ATs which are simple to make and are activated only at particular time intervals. The device is "dead" most of the time and receives burst transmissions for predetermined short periods of time.

CODING

LIMIS identifies each of the items being interrogated, therefore, there must be an unique code for each item in a given system through the same codes can apply to other systems at separate locations or different times. Cryptographic systems which can be adapted for purposes of this invention are taught in U.S. Pat. No. 4,200,770 issued to M. E. Hellman et al. In such a system, an algorithm is encoded in the PT and forms the basis for code generation. In another major approach, the code itself is encoded on the chip. The public key crypto system mentioned there is another.

The number of different items that can be coded depends upon the number of bits of information available to code the set of items. Thus, with four bits, one may code $2^4$ or 16 items. With 32 bits $2^{32}$ (over 4 billion) items can be coded—enough to code almost any group of items in a given area. LIMIS systems can use as few as 12 bits and more than 100 bits. Preferably, the systems use 18 to 45 and more preferably use a 36–50 bit identification coding system in which up to more than $2^{50}$ items (approximately 1.2 quadrillion) can be coded uniquely. This approach ensures that LIMIS can encode most, if not all, the items in all the shelves in the USA with a different code to provide security against the use of a computer and transceiver to test coded items until the correct code is located. The problem of broadcasting that many different codes or algorithm signals to break the code of a few PTs is massive. Even if thousands of codes per second are broadcast, it would take years to broadcast them.

The number of bits required will be determined in part by the expected utility, the complexity and/or magnitude of the use and chip configuration. Obviously, a PT used with an AT of the complexity of that of FIG. 25 will require a much larger number of bits or coding than a PT utilized in the sidewalk of FIG. 18.

The code unit of a particular AT can contain one, a portion of or all of the following types of coding, or algorithms for generating the codes, each having a specific purpose relative to the type of unit, code, etc. being utilized. Thus, the code unit of a particular AT may include an originator code, a utility code, a service code, a separator code, a location code, complementary switching code, an inventory code, a motion detection code, an error identification code, an identification code, a maintenance code, a pricing code, a history of encoding-decoding code. The algorithm generating code can handle one or more or all these codes in a unified or segmented manner.

An originator code is a code assigned to ATs to identify the AT and to differentiate the coding of that AT from the coding of ATs of other manufacturers. This coding is, preferably, not erasable. The utility code is a code assigned by an AT to a PT and normally will include the "inventory number" provided by the owner of the utility unit. The service code activates the antenna mode and the preventative maintenance and the parity sequence. The separator code establishes the number of code bits utilized depending on the uses desired and the PT operational mode, i.e., synchronous or asynchronous. The location code provides for one, two or three dimension analysis and provides ranging, area location and volume location, respectively. The complimentary switching code is, effectively, a clock for switching various units on line in the asynchronous mode. The inventory code defines the class of the item, for example, Campbell's Tomato Soup 8 oz. As a practical matter, it is simpler to utilize the AT logic and ignore designation classification for PTs at particular locations.

A pricing code is the price assigned by ATs to particular PTs from time to time during the shelf life of the item to which the PT is affixed. The pricing codes are for utilization in super markets, drugstores, and other outlets for various types of products. Coding-decoding histories can be utilized in PTs attached to dangerous or regulated products, for example, poisons, medicinals, and guns. The identity code can be utilized much like a bar code and for the same purposes. Details of such utilization will be discussed in the discussion relating to the various figures. The total coding for a particular chip is the integrated identification code. The various previously listed codes can have various bit lengths ranging from approximately four to sixteen or more. Thus, PTs to be embedded in a sidewalk will require a minimum of encoding because of the simple form of the output, whereas, a code utilized in a commercial research laboratory might be considerably more sophisticated and require a substantially greater number of bits. Similarly, credit card bit identification might require a substantial number of bits to ensure maximum error detection and jamming prevention.

Coding can be a simple binary coding system or more complex coding systems. A preferred coding system is known as the Hamming error detecting-error correcting code system. There are many others. Some of the codes use fields, groups, rings and polynomial theories of algebra. Still other codes use cyclic methods.

In order to develop individual codes which conform to a group code one must have a computer and/or other storage system. The storage system sometimes requires a large number of addresses to utilize all the numbers assigned to elements in a particular LIMIS system. A preferred way to use the coding systems described above is to use a code generator whenever a PT is formed.

Code storage is practical when it is realized that turn-over reduces the number of items to be kept in memory. Use of duplicate storage space further reduces storage requirements. In transferring from one mathematical or unit code space to another, there can also be duplicates of one item in one code space, say a bank, with the item in the code space of, say a grocery store. Whether a person using an originator's code could break the common code of another having the same group code space is unlikely if geographical and item classification are controlled. Coding logic takes minimal space as far as logical systems are concerned so that PTs can accommodate the small space attached to the various codes used in the LIMIS system. Subsets of binary codes are preferably used for the error detection and correction codes in LIMIS systems.

CODING THE MEMORY MEDIA

The encoding systems used will be those commonly used in industry. The manufacturer programs ROM through a change of mask, by using an electron beam, a laser or other mechanism during the manufacturing process. These systems are not, thereafter, capable of modification. ROMs, hybridized with PROM, EPROM, and other modifiable memory media are subsequently modifiable but only the alterable portion of the hybrid chip can be changed. Where ROM is the memory medium utilized, a program of an algorithm or other mechanism must be manufactured into the chip allowing code changes via the signals received by the PT from the AT.

PROM modification is accomplished through "blanking", i.e., ignoring or destroying old data at one address on the chip and introducing new data at another address. When the last address on the chip is being programmed, it can be programmed with an algorithm permitting AT actuated coding changes. The AT is preferably programmed to ignore addresses which have been "blanked" and to deal with particular addresses in sequence.

Alterable PROMs are decoded and re-encoded or altered by the many devices presently marketed for the purpose. In LIMIS "systems", the chips are without the conventional leads and the encoding-decoding or alteration mechanisms will usually be through EMF control signals received through the receiver portion of the circuitry. Presently, some alteration systems require two voltages and some require ultraviolet light. Preferably, systems requiring the use of ultraviolet light are utilized only under conditions where the light can be readily applied at the required radiation input levels. The Pro-Log Corporation of Monterey, Calif., U.S.A. provides a variety of equipment for programming various types of PROM chips and logic. They and other companies are well equipped to provide specialized instrumentation for PTs having a form of leads and which are not designed for recoding or alteration through electromagnetic signals received by the PT receiver circuitry. In fact, Pro-Log, and others, have equipment already adapted for the recoding of leadless PROMs. One of their almost "universal" systems, the M-980, utilizing a PM 9080 personality module, can be modified for use with such systems.

The EMR signal actuated PTs are equipped to provide the necessary single or multiple voltages required for alteration of the particular memory medium being utilized. The power for such systems is preferably supplied by a battery which provides the necessary voltages. The battery, of course, will be integrally manufactured into the PT and, on completion of the last practical recharge cycle of the battery, the PT must be replaced if further coding change is required.

ERROR DETECTION

In the detection of a code broadcast between A and B it is necessary to make certain that what arrived at B was a member of the set of codes that were assigned to A. If it is not, and a single error is detected, an error correction system must be used to correct that error. The means of correcting such errors are very well known, see *Error Correcting Logic for Digital Computers*, F. F. Sellers, Jr. et al, McGraw-Hill, 1968 pp. 284.

Preferably, a coding system is selected that cannot be easily broken and handles minimal errors. The coding system need not require the large number of bits required by the identification coding because it is only necessary to find the code which will start the LIMIS system. Coding interferes with the jamming process. A combination of a white noise analyzer and a jamming detector can overcome most jamming attempts.

In the LIMIS system, error correction and detection coding is not only used for maintenance purposes but is also used to code the various transceivers in LIMIS units so that a particular code will open and close switches. The use of these codes in preventative maintenance is well known. In LIMIS systems, a single code will preferably be used initially for all of these functions, e.g. one long identification code can be made up of 10 separate, distinct codes.

ANTENNA ARRAY

All types of antennas can be used in LIMIS systems. Coils can even be used in antennas in some usages. A repeater-relay system is required for many of the LIMIS uses. The book, *The Radar Handbook*, M. L. Skolnick, ed, McGraw-Hill, 1970 pp. 1536 generally describes antenna and transceiver considerations. Wave lengths useful with such systems preferably vary from more than 10 m to less than 1 mm. The antennas can be loaded where necessary.

LIMIS antenna systems for determining the location and movement of items and to trigger the broadcast of an alarm signal when various types of jamming are introduced. The antenna systems can be analogous to radar detection and interception antennas for air traffic control purposes (ATC). However, LIMIS requires less stringent time, distance detection, receiver sensitivity, transmitter power, accuracy and maintenance requirements than the ATC systems.

LIMIS utilizes repeater-relay antenna systems between the AT and the PT where needed. These antenna arrays are preferably fixed in space. The use of repeater-relay units circumvents the major problems faced when trying to avoid the severe limits of the radar range equation with small PTs.

Special antenna arrays are needed for two purposes: (1) to control the antenna lobe in three dimensions to determine the location of an item in space; and (2) to increase the gain of an antenna lobe. The LIMIS system preferentially will use antenna arrays which can be moved electronically rather than mechanically. Various antenna systems can be used to locate items in a grocery store. In the case where an antenna is placed on each shelf, the lobe can be as narrow as the shelves being searched. As the lobe proceeds along the shelf, it reaches the item being interrogated with a coded signal. The signal opens a coded switch which opens when the code signal challenges it, and the antenna lobe remains until it charges the capacitor to the proper energy level. The AT then waits for a reply from the interrogated PT. After receiving this information, the antenna lobe proceeds on to the next item, and so on. In unusual systems, e.g., the Guggenheim museum in New York City which is quasi-conical, a simple rotary array can be used to interrogate PTs on each painting, sculpture, guard and ticketed patron.

The antennas of the repeater-relay units can be energized from the AT or other source in a way that causes these relay transmitting systems to act as an array producing a smaller beam lobe and produce greater power energy interception at the PT antenna. This is a practice that is carried out today in communicating with satellites and with transmission systems across the world.

The antenna system does not have to be an array. It can be the output of a waveguide, for example, a flared output in which the waveguide is flared to match the impedance of the environment. Such a system would preferably be utilized in counting and sorting documents or in automatic change makers with counters. Automatic change makers can be constructed utilizing the LIMIS system, thereby allowing the machines to ingest various denominations of bills where PTs are incorporated in the paper. A flared antenna can be placed directly over a twenty dollar bill in which PTs are embedded with little loss of radar energy or K-band energy, as it may be, and as the item passes in front or across the flared antenna, the same or different information will be broadcast by the PT that is received from an interrogation signal. In this case, no location information is needed; therefore, no array is needed. The antenna can be one or more dipoles producing a hemispherical antenna lobe pattern in two directions, forming a figure eight. The center of the dipole would be aimed at the item being interrogated for location or other purposes. Many dipoles can be arranged in arrays and the arrays may be as large as the dipoles on our largest aircraft seeking radar antennas for some uses and the size of a postage stamp for others, or less. Similarly, the antenna can be in the form of paraboloids. Modern types of antennas such as the 1 mm to 1 cm to 1 m cloverleaf antennas can also be used and the former are preferred for many PT uses.

In order to go over the horizon with frequencies as high as those in the UHF and K-bands, one needs repeater-relays. These repeater-relays can also have active power sources. Furthermore, the antenna wavelengths required between the active transmitter and the relay transmitter could be large, for example in the 10 m band or the experimental and citizens' band frequencies. However, when low frequencies are broadcast to high frequency units, harmonics can be utilized for coded interrogation or the receiver tank circuit can be bypassed. The transmission from the last repeater-relay can be at the higher frequencies so that the maximum power input into the PT is accomplished. Preferably, the last antenna used in this system is in the UHF band or higher. However, there are some uses of LIMIS where the last transmission is preferably in the 1-10 meter band, for example in the identification of ships, trains, and large moving objects, or elements of trains, boxcars, oil trucks, and automobiles. The PT daisy chains in this case can be attached to larger antennas to augment their own small antennas or positioned adjacent to a repeater-relay.

In systems which operate over large distances, various commercial type links can be used. For example, telephone, cellular radio telephone, satellite communication and microwave, other telecommunication, and home media systems can be used as intermediate links in LIMIS.

ANTENNA CONTROLS AND MECHANISMS

Antenna controls and mechanisms used in LIMIS are preferably non-mechanical and are similar to the controls and methods used in commercial ATC. However, the antennas can have the capacity to be aimed and pointed in azimuth and/or in bearing.

There will be times when the antennas will have to be placed in arrays. Preferably, the initial placement is in a position such that the antenna systems will not have to be readjusted. An antenna separator code is used to change the job required of the antenna for inventory minimalization purposes. One AT owner may wish to have only identification and not location, inventory, or security. An antenna which is used only for identification, may be as simple as a single dipole used in ham broadcasting and receiving or it might be a complex exponentially flared antenna. Another antenna can be required to position the antenna system to accept spherical, rectangular or cylindrical coordinates. The mechanism which will be used for this purpose will necessarily have to be a coded system which will connect and energize all the dipoles of an antenna sequentially or in parallel or which will energize the antenna system feeding these dipoles.

Furthermore, if movement information is required, then a much more complex antenna control system is needed than is required for simple location. Systems analogous to those used in ATC are then preferred.

ANTENNA-ENVIRONMENT

In situations in which interrogation of the PTs is being made at a short range, the flared antenna waveguide is preferable because it concentrates the energy where needed and it can be used in an enclosed area where the higher frequencies can be absorbed to protect the operators. Any other type of system can be used at a distance if the operators are shielded. At such frequencies, power requirements are greater. PTs can be used as repeater-relays in various relatively short range systems.

The middle distance systems, for example, a golf course, requires different LIMIS system designs. These systems are limited by the radar range equation. The last link between the PT and the relay antenna is important. One can place 10 m antennas or 1 m antennas in or around any object on the golf course, such as a light pole or a tree or even in the flag, or in the hands of a person who may be looking for the ball by way of a hand-held unit which can switch in the Club house unit if the ball and its attendant PTs are out of its range (See FIG. 29). Every golfer can, alternatively, be given a repeater-relay antenna that clips onto a golf club using the metal club shaft as an antenna; in conjunction with a master transmitter at the Club house. The maximum distances will be on the order of several hundred feet when used with a transmitter with 5 kilowatts peak power.

The third type system is for long distance operations where powerful PTs are miles away and attached to items such as farm equipment, trains, or automobiles located beyond the horizon. In these cases the type of system presently used for cellular or telephone systems is preferred in cities. The police can utilize such systems in searching for stolen goods.

A LIMIS system can be tied into a commercial repeater-relay and then transmitted to a central location on, for example, a farm or a railroad station. Also, this problem can be resolved in the same way telephone companies have solved it, i.e., by installing their antennas as high as possible and transmitting the energy by low frequencies to the repeater-relay and then increasing the frequencies at the last stage of the system. The band width must be controlled and the podium on which the antenna is placed must be stable. Satellite communication systems can also be used much as radio beacons are used to locate lost aircraft with larger PTs with a high energy battery or other high energy non-EMR power source.

LIGHT POWERED SYSTEMS

Light is an excellent mode for PT power if there is a parallel means of charging the condensers, or, if one has an active power supply or solar source of power. Ordinary light can be "blinked" or turned on and off at extremely fast rates; it is therefore possible to communicate with the PT through a photocell and to code the light transmission just as the radio frequency transmissions are coded. The light system is more expensive when a light response is expected from the PT. Light can be used to interrogate and radio frequency used to answer the interrogation or vice versa. In instances where the item being interrogated is only a short distance from the light source, then light transmission from the item to the interrogator can be used. This would be the case of bank bills. Whether ordinary light or infrared or ultra violet light is used depends only on the application. During the day it is preferable to use the ultra violet sources. At night infrared or ordinary light can be used.

Where larger distances are required, and where the human element is absent, laser light can be used to both transmit and receive. When using laser light, one can reflect it with mirrors to inaccessible spots, also one can diffract it, use it in lenses, and modulate it.

The laser can be used in many ways to transmit information, but is not used around people unless the laser is completely enclosed. The PT can have a light detector, e.g., a photoelectric cell, a charge coupled device (CCD) or a quartz crystal window directly coupled to a transistor.

The laser beam frequencies can be from the low infrared to the high ultraviolet frequencies and can range from low to high "Q" ratios of frequency to change of frequency. Laser signals can be transmitted via fiber optics, e.g., glass and plastic) to insulate them from people. The light sensor picks up the coded signal and passes it into the PT. A passive condensor can be charged by a charge coupled device from laser beam energy.

Laser beams can also be transmitted over a desired path with mirrors alone or in combination with fiber optics. For example, a laser can be used in combination with rf signals to provide a system which is much more secure than either the laser or the radio frequency LIMIS systems. In a combination system, the laser can switch the PT on for the reception of rf signals.

SONIC SYSTEMS

Sonic systems can be used, particularly at ultrasonic frequencies, over relatively short distances. The power required for operating sonic systems is relatively great when compared with rf systems. However, sonic systems represent a well developed available technology for incorporation into PTs.

The same types of coding that are used in light systems can be utilized with sonic systems.

Location is accomplished in sound systems through sound differentiation between multiple sensors or through Doppler ranging.

Doppler effect ranging is preferably utilized with ultrasonic systems. Practically, it is preferable to create systems where the audio is utilized in the interrogation by the AT and rf frequency transmission is used for the signal returning to the AT.

Subsonic, sonic and ultrasonic frequencies, i.e., between about 5 and 500,000 Hz, preferably between about 60 and 250,000 Hz and more preferably about 5,000–50,000 Hz can be used in LIMIS system communications. The antenna(s) are made up of many materials, e.g., organic or inorganic piezo materials. The distances between the transmitter and the receiver are relatively small in such systems. Additionally, the transmission times are long.

In the case of inventory where only the question of an item's presence is involved, there is plenty of time to pass information back and forth, unless the number of items tagged is very high.

As indicated from the previous discussion, and for the purposes of this invention sound and, electromagnetic radiation (EMR) which communication is via includes all radiation of a wavelength suitable for desired reception and transmission, e.g. rf, UHF, VHF, microwave, and the like.

SPECIFIC DESCRIPTION OF THE DRAWINGS

FIG. 1 is a block diagram of the major components of LIMIS devices and their inter-relationship.

FIG. 2 is a block diagram of a passive transceiver using frequency demodulation and synchronous system.

FIG. 3 is a block diagram of a passive transceiver utilizing a single antenna and asynchronous operation.

FIG. 4 depicts a spike starter circuit.

FIG. 9 depicts a system for dispensing petroleum products from a bulk storage plant.

FIG. 10 depicts a combination credit card-meter ticket.

Figure 11:
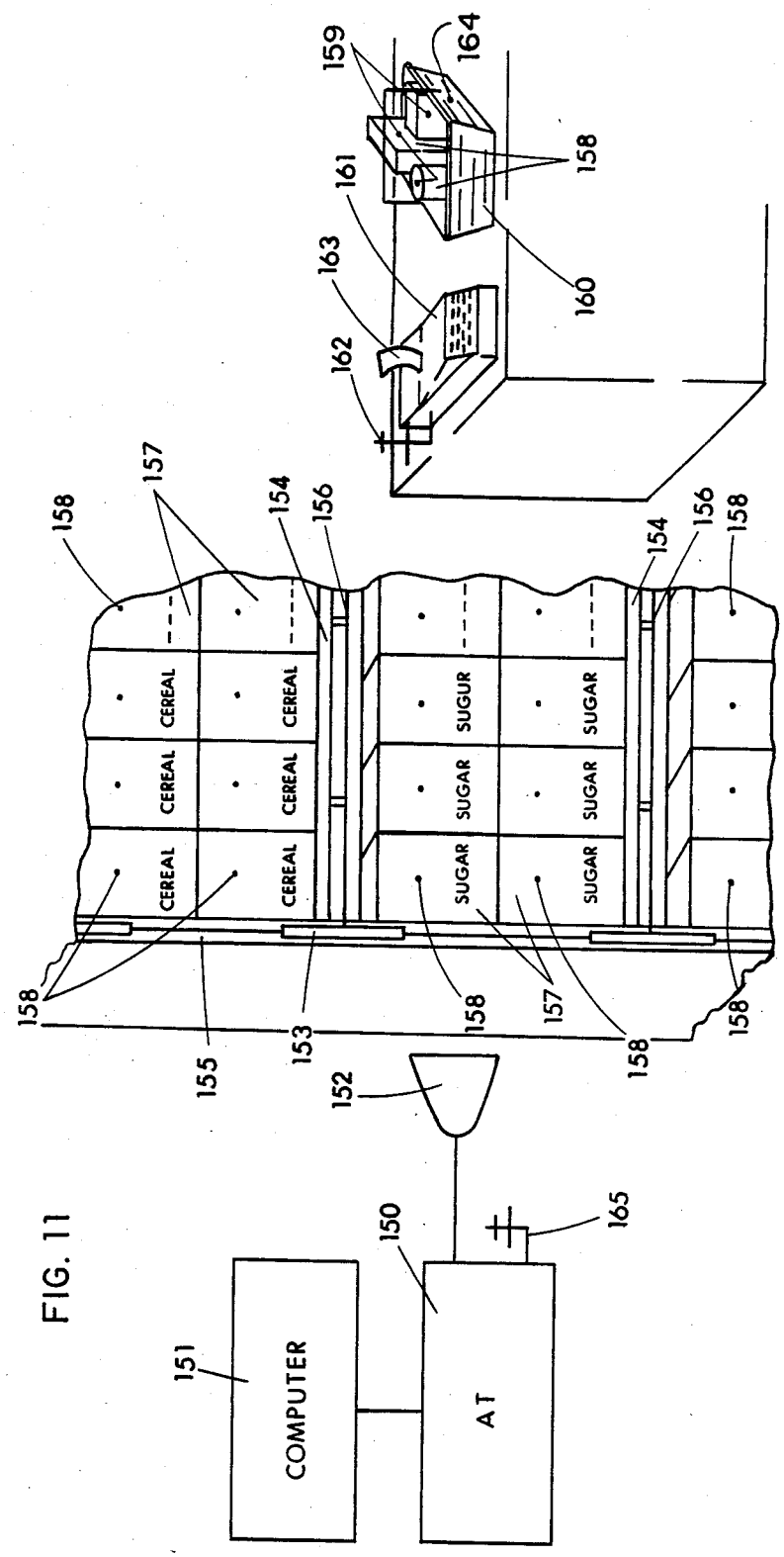

FIG. 11 describes an embodiment useful in a super market.

Figure 12:
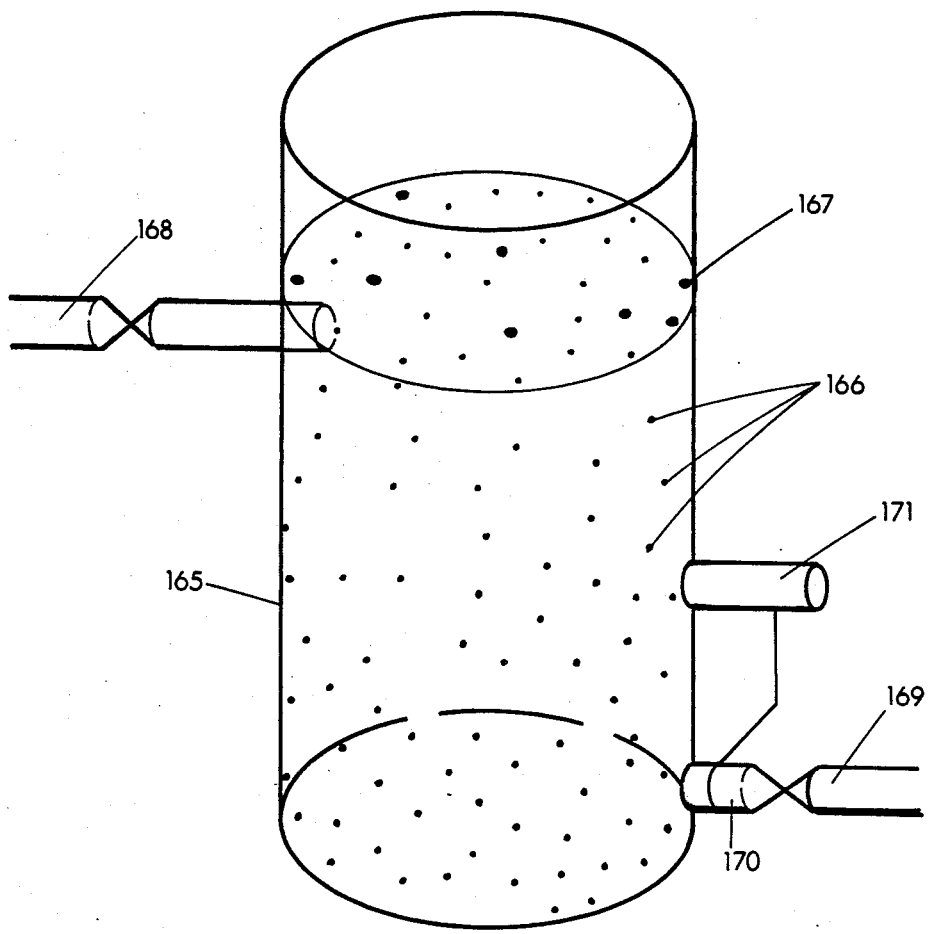

FIG. 12 depicts the use of PTs in an oil storage tank.

FIG. 13 describes a turbine flow meter.

Figure 14:
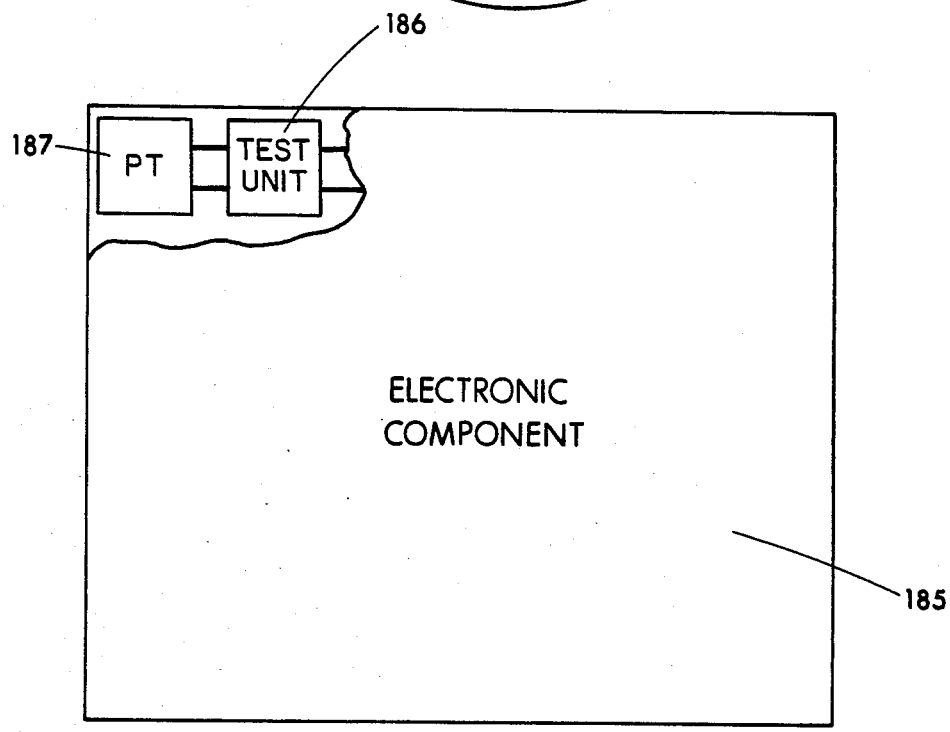

FIG. 14 describes a representative electronic component.

Figure 15:
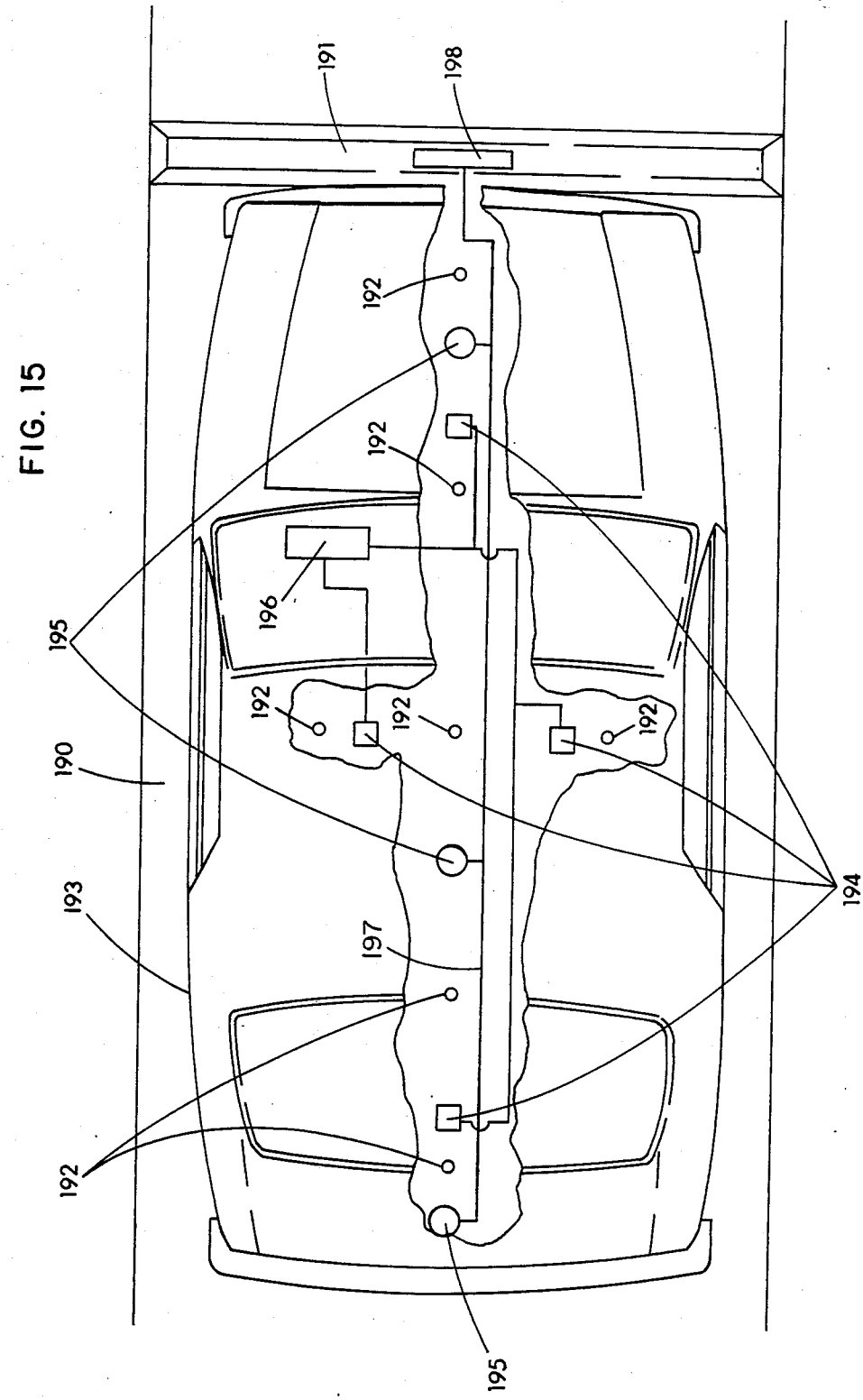

FIG. 15 describes the use of LIMIS in automobile parking and parking space location.

FIG. 16 describes a representative detector-alarm system.

FIG. 17 depicts a miner wearing safety equipment utilizing LIMIS systems.

FIG. 18 depicts the use of LIMIS systems in aiding the blind.

Figure 19:
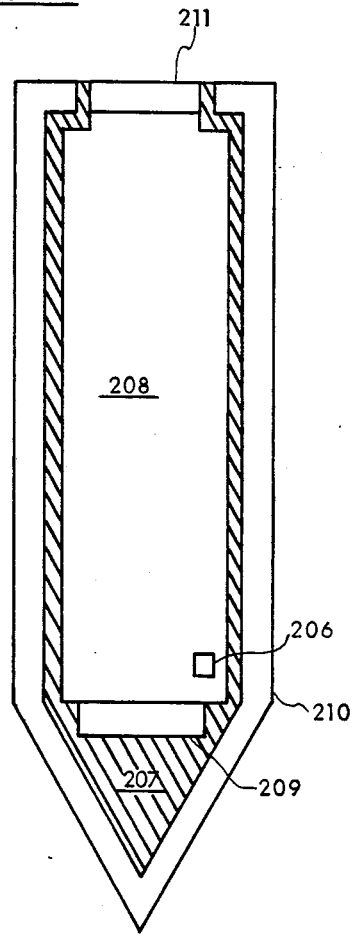

FIG. 19 depicts a temperature alarm system for use with animals.

Figure 20:
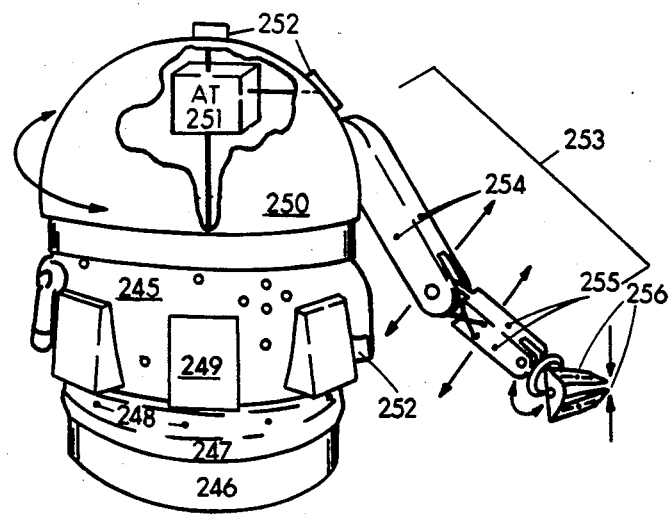

FIG. 20 depicts the use of LIMIS systems in robotics control.

FIG. 21 depicts the use of a LIMIS system in a sailboat.

FIG. 22 depicts a LIMIS controlled drill press.

FIG. 23 depicts a blind worker wiring harnesses.

FIG. 24 depicts a currency counter-sorter.

FIG. 25 depicts a pipeline valve system.

FIG. 26 depicts the use of LIMIS systems in department stores.

FIG. 27 depicts a segment of an automated automobile paint line.

Figure 28:
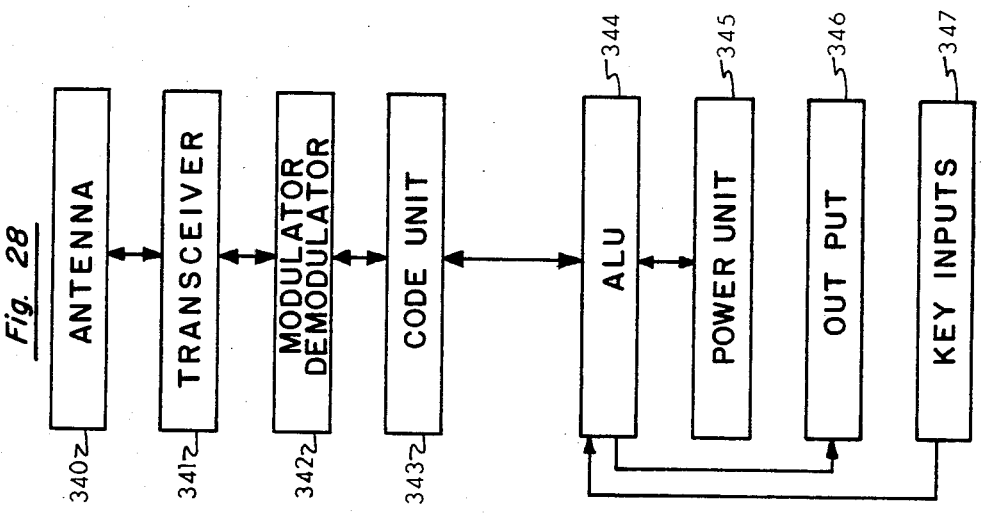

FIG. 28 shows, in block diagram form, a hand-held unit.

Figure 29:
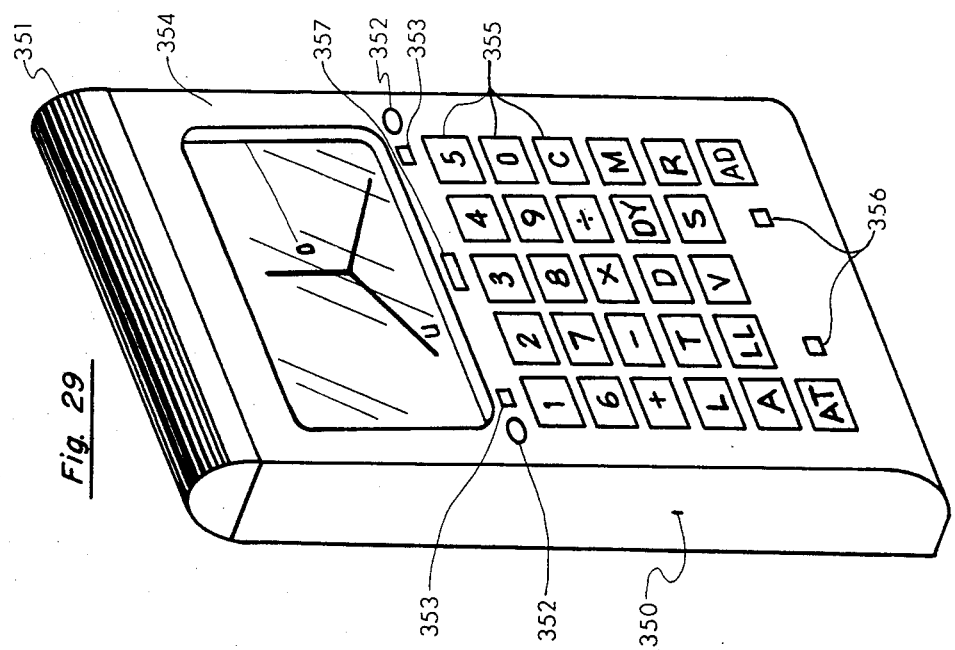

FIG. 29 depicts a hand-held unit suitable for many functions.

FIG. 30 depicts a light system in block form.

FIG. 31 depicts a sonic system in block form.

Figure 32B:
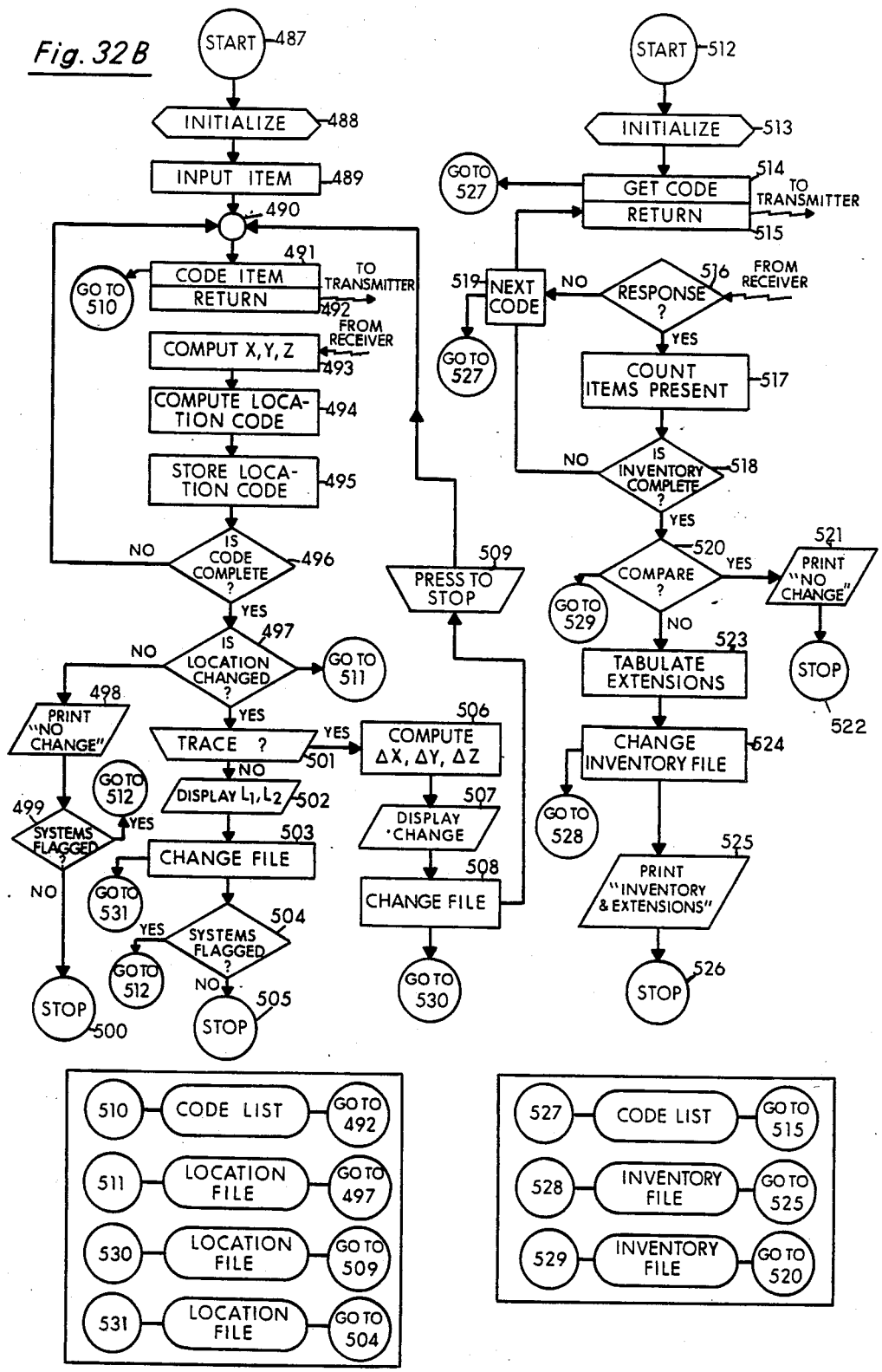

FIGS. 32a and 32b depict a logic chart for an AT.

Figure 5:
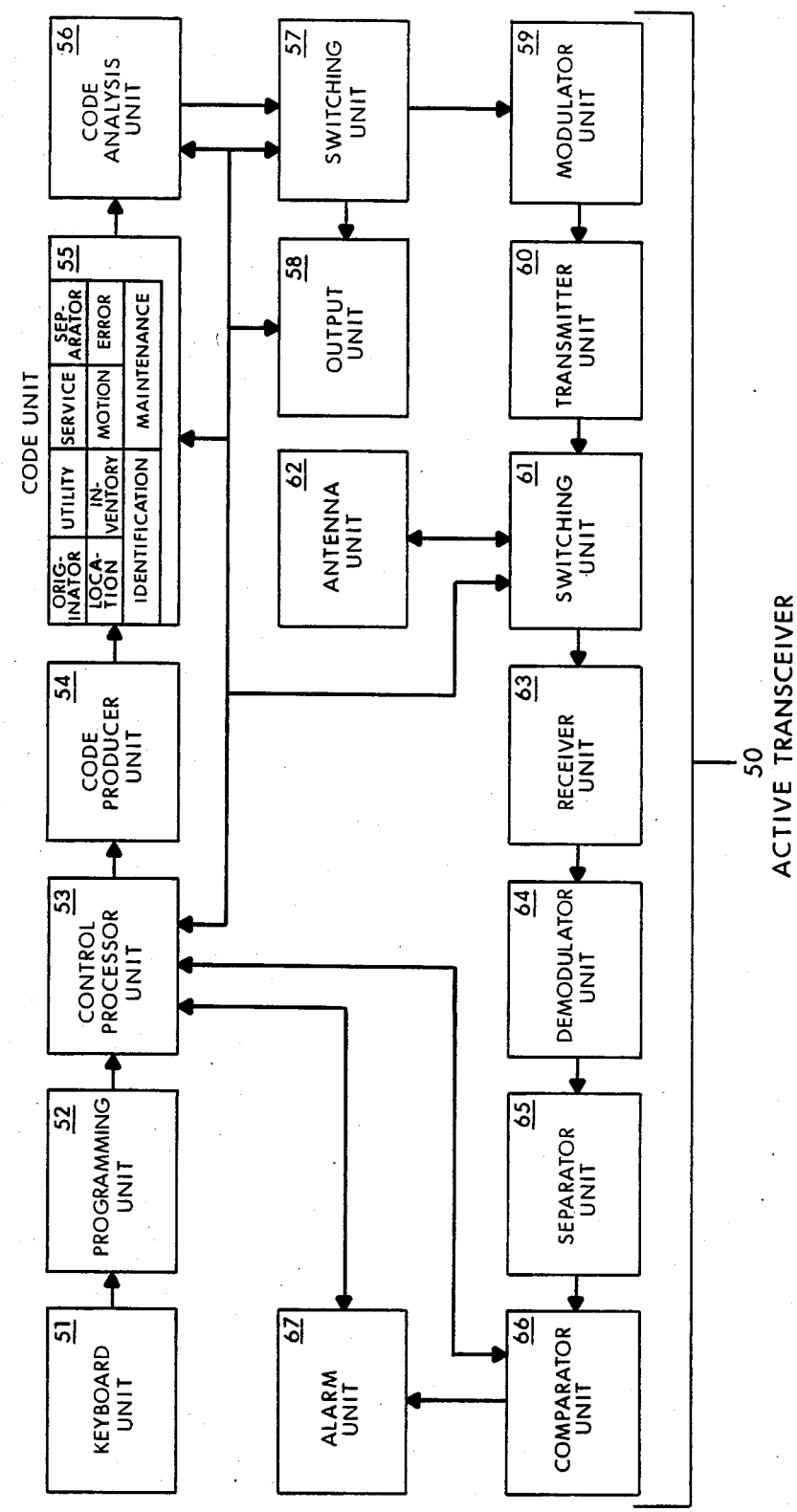
FIG. 5 is a full diagram of an AT which provides all LIMIS functions.
Figure 33:
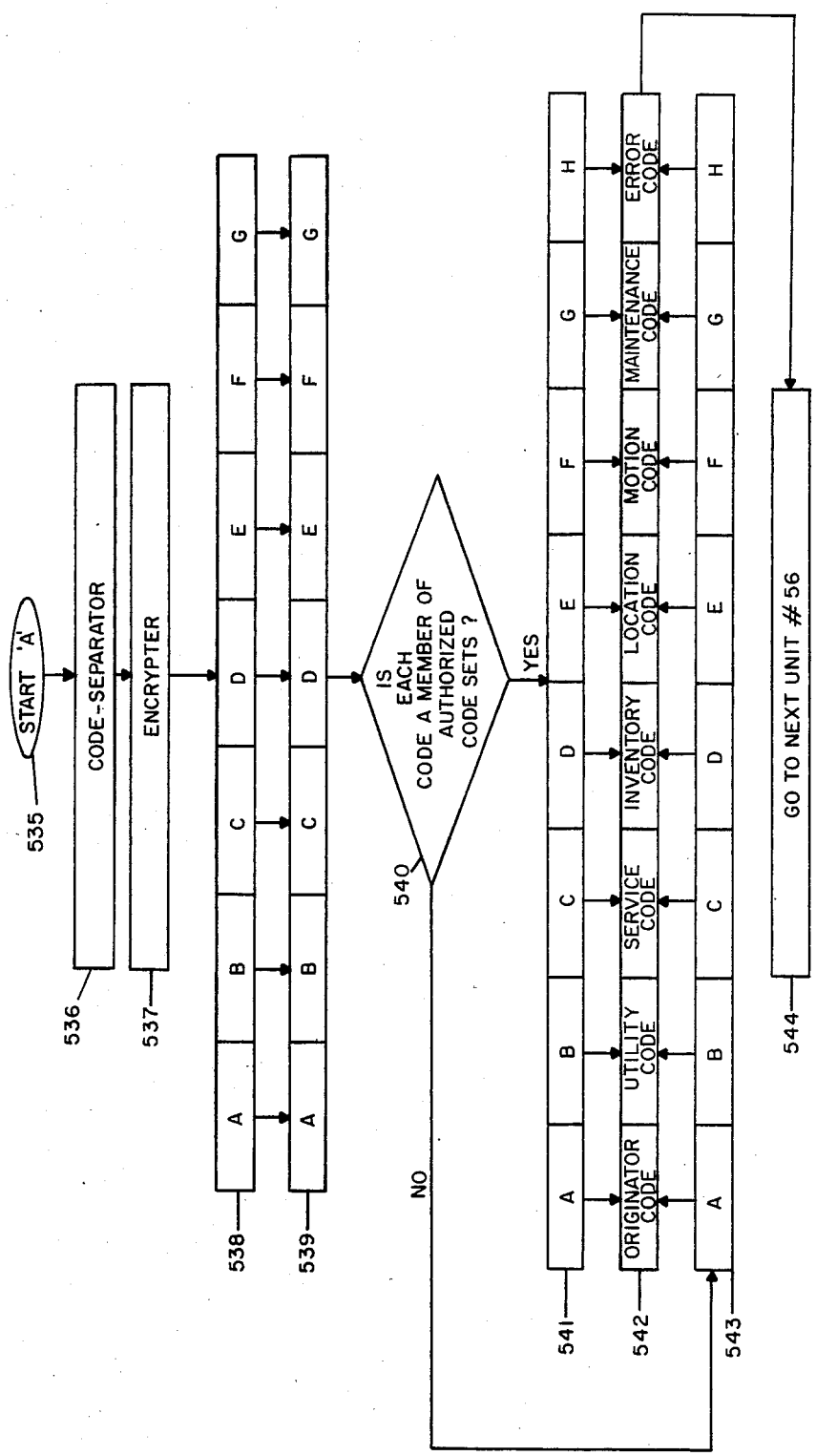

FIG. 33 depicts a logic flow diagram of block 55 of FIG. 5 in the write mode.

Figure 34:
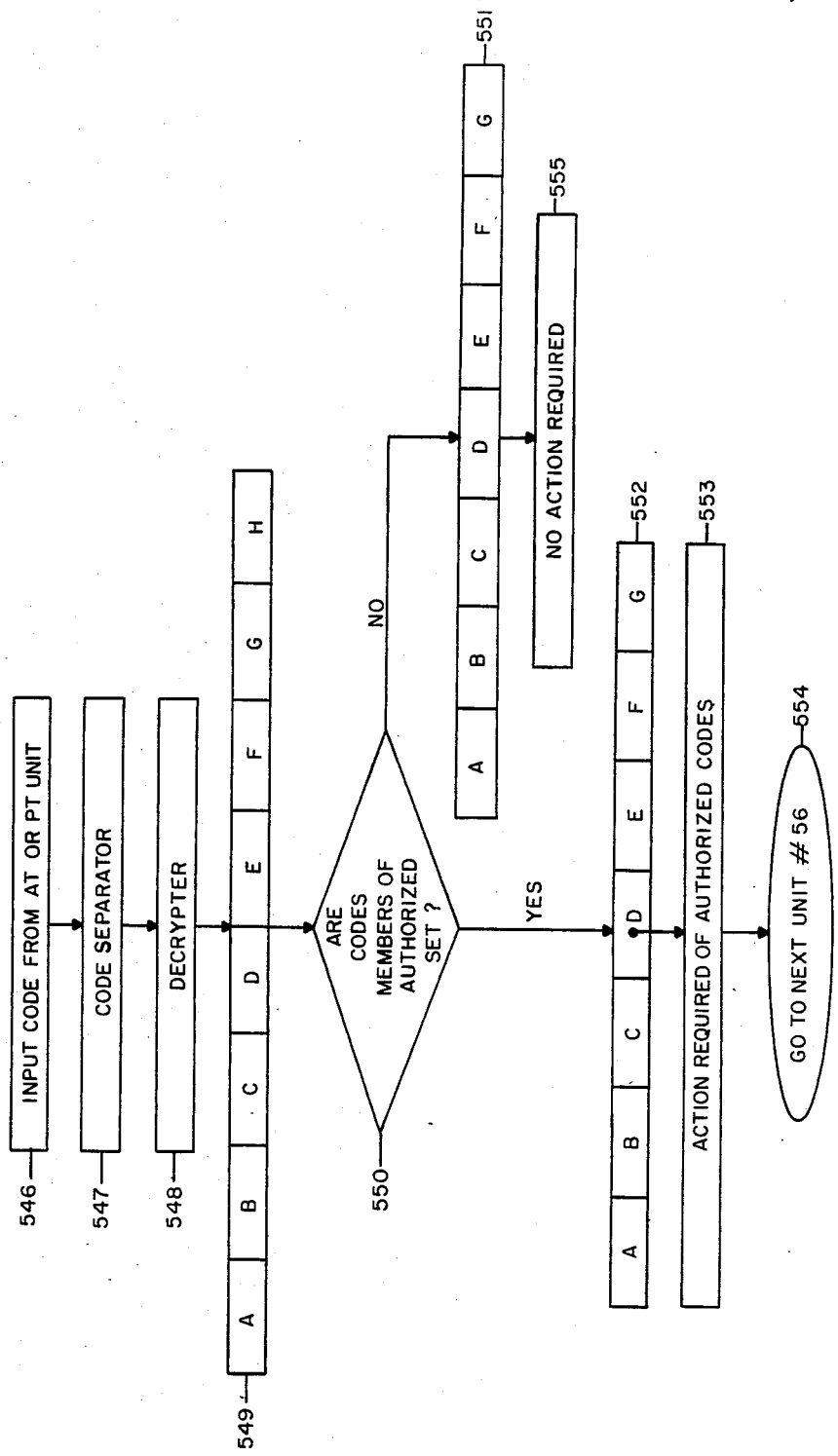

FIG. 34 depicts a logic flow diagram of block 55 of FIG. 5 in the operation mode.

DESCRIPTION OF PREFERRED EMBODIMENTS OF THE INVENTION

FIG. 1 depicts a functional diagram of the major components of the systems of this invention. It is made up of an originator unit 10, a supervisory unit 11, a utility unit 12, and a passive transceiver 13.

The originator unit is owned by the company manufacturing all or a part of the system or an organization designated by such originator. A function of the originator unit (OU) 10 is to provide each supervisory unit 11 (SU) and utility unit 12 (UU) with the manufacturer's code and recode units which have had their coding and/or programming erased. Units 11 and 12 are preferably engineered to erase their memory and/or programming if detectors in the units indicate that the physical or electrical integrity of the units is being violated. The OU recodes and reprograms ATs returned to the factory with broken seals. The OU also, as a part of encoding the units 11 and 12, then allocates codes in accordance with utility functions and/or other codings to assist in security, inventory, etc.

The function of SU 11 is: (a) locate PTs attached to lost or stolen (misplaced) items after notice from the owner or possessor (owner) that the item is lost; (b) and in a preferred mode, changes the PT coding to increase the transmitted power of the PT; recode the PTs to decrease the PT transmitted power to the original coding once the item on which the PT is affixed is found or returned and (c) encode the antenna system for particular usages. Transmitted power can be changed by applying power from the active power source for transmission The functions of UU 12 is to code and decode PTs and to locate, identify, detect and measure acceleration, velocity and distance; identify and perform combinations of and analyze the above.

PT 13 is, as previously indicated, attached to almost any item of value. Its components will be designed to withstand the manufacturing process and intended use of the item in which it is to be attached. The PT can be embedded in any material which does not interfere with its particular mechanisms for receiving energy and with the reception and transmission of coded signals is substantially transparent to such signals at the particular frequencies and range chosen for the particular usage. The PTs would normally be attached to, or encapsulated within depressions, in oil field equipment, metal radio cases, I beams, steel doors, window casements, silverware, and many scientific instruments.

FIG. 2 describes an embodiment of a PT of this invention which is synchronous in operation and uses frequency demodulation and modulation to maximize power storage and output.

In the system, broad band antenna 14 receives a broad spectrum of radio waves, passes them through spike starter 15, and detector 16 into capacitance storage 17 to charge the unit. A portion of the energy, possibly at a different frequency, e.g., in a single sideband system, is also passed through demodulator 18, detector 19, switch 20, and trickle charger 21 prior to passing the signal into power storage 17. Narrow band antenna 22 passes the signal of the encoding AT through switch 23 and receiver 24, demodulator 25, and detector 26 into switch 20. Switch 20, a logic gate, routes a portion of the received energy to trickle charger 21 and another portion to the arithmetic logic unit or central processing unit 27 which provide identification-separation and decoding of those signals received from an AT. The correctly encoded signals are passed back into modulator 28 where the carrier wave is added. The encoded signal is amplified in transmitter 29 and the amplified signal activates switch 23 causing a broadcast through antenna 22. Energy received on narrow band antenna 22 is passed into capacitance storage 17 when the PT is not transmitting via switch 23. If the signal from demodulator 25 is decoded, and identified as a signal which the PT is to respond to, switch 23 discharges power storage 17 through Arithmetic Logic Unit (ALU) 27 into modulator 28 where a carrier wave is added to the signal. The encoded modulated signal is then passed through transmitter 29. Switch 23, in effect, converts narrow band antenna 22 into a broadcast antenna and transmits the signal.

Where no demodulation and modulation is required in the PT, demodulators 18 and 25 and modulator 28 can be eliminated from the circuit.

In the system of FIG. 2, a chip having a size ranging from 0.1–1.0 centimeters on a side, will have a narrow band antenna and broadcast frequency ranging from 300 gHz to 3 gHz. The helical broad band antenna 22 has a length ranging from 10 to 1,000 cm. A narrow band, cloverleaf antenna useful on the chip will have a size of about 0.1-10 cm on the side. Detectors should have a sensitivity of 0.1 to 1 microvolt. Quieting should be on the order of 120 db and the system should have an antenna input impedance to match the transmission medium—(30–300 ohm). Storage should be on the order of a minimum of $10^{-6}$ Joules (1 watt/$10^{-6}$ sec) or $10^{-6}$ watt/sec. Recovery time for the unit should be on the order of a minimum of 1 minute. (Passive charge times will depend on the power and number of pulses per second produced by the AT). When constructed, the chip of FIG. 2 can have a helical broad band antenna on one side and a narrow band, cloverleaf antenna on the other with chip and circuitry sandwiched between the antennas. The systems should have a broadcast range of 10–100 feet with an efficiency of 1–10%.

FIG. 3 depicts an asynchronous system utilizing one antenna. In the system, a signal is received through antenna 30, passed through tank circuit 31, which acts as an impedance matcher, demodulator 32 and detector 33 before passing into delay line switching system 34. A portion of the signal received by the antenna passes into power unit 35. The power unit will normally be a capacitor or battery of desired size. A second passes into decoding unit 36.

The received electromagnetic radiation (EMR) energy is "recognized" by decoding unit 36 and code separation unit 37, system 34 dumps energy from power unit 35 into encoding unit 38, modulation unit 39 and transmitter 40 in sequence. The energy from transmitter 40 is then broadcast via antenna 30. To insure that the system is fully charged when needed, ATs will periodically broadcast a high amplitude signal which will pass through detector 41 and spike starter 42 before storage in power unit 35. Service unit 43 monitors chip performance and chip function through ALU 34.

FIG. 4 depicts a spike starter unit made up of a tank circuit 44, diode 45, variable resistor 46 and capacitor 47. EMR energy enters the circuit at the coil and the envelope is formed into a large pulse of short duration at the diode. The average energy is passed to a resistance 46-capacitance 47 storage combination and acts as an instantaneous battery of very short duration but which is sufficient to enable PT operation.

FIG. 5 depicts a flow diagram of AT 50 which conducts location, identification, inventory, motion detection and measurement and systems functions. It also provides a basis for quality assurance and maintenance testing, and error correction. It provides for, in combination with the devices of FIG. 6, the use of the repeater-relay units as part of the UU. The active transceiver is made up of a keyboard 51; programming unit 52; control processor unit 53; code producer 54; code unit 55; code analyzer 56; switching unit 57; output unit 58; modulator unit 59; transmitter 60; switching unit 61; antenna 62; receiver 63; demodulator 64; separator 65; comparator 66; and alarm unit 66.

Keyboard unit 51 has any combination of alphabetical, numeric and/or symbolic characters of the various business and/or scientific keyboards in the marketplace and is used to introduce transmitting codes into LIMIS.

Programming unit 52 can be a modification of commerical equipment if the PTs are uncoated and are present for direct physical contact. Where a code is to be transmitted to the PT, unit 52 is a standard code generator.

Control processor 53 has a variety of functions and directs much of the activities of active transceiver 50. These functions range from acting as a clock in metered AT-PT combinations to the functions described below. It will produce instructions for active transceiver 50, for repeater-relay 70; and for the PTs so that maximum efficiency is produced in both the synchronous and asynchronous modes of operation. The control processor unit 53 (CPU) is similar to the CPU units in other computers and is a requisite for the LIMIS functions.

Code producer (generator) 54 produces a code for code unit 55. Code producer 54 is, preferably, a random generator and a mechanism for insuring that no two randomly generated codes are ever delivered to the same code space.

Code unit 55 receives unique codes from code producer unit 54. The codes are divided into various code spaces. One code space, for example, which could be 4, 8, 16, 32, 64 or 365 bits in length is assigned to the orginator space, the utility space, the service space, or the separator space. The orginator space is set aside for the manufacturer of the LIMIS unit. A number of bits, e.g. eight or sixteen, can be set aside for the originator. The utility space is used by the company, group or individual buying a LIMIS. A code space, e.g. sixteen bits, can be set aside for the utility space. The service space is to be used by users of SU's. Sixteen bits could be set aside for the supervisory space.

The separator space is required by an OU or UU to encode the services which are to be provided by a particular UU, i.e., location, identification, and/or motion detection and/or measurement. The separator code determines which service is to be provided. Eight bits, for example, can be utilized for this space. Since the space set aside in code unit 55 is preferably greater than 32 bits and less than 64 bits, the originator, utility or service codes can be lengthened correspondingly.

The second code space is set aside for four different spaces, location space, inventory space, motion space, and error detection. Location space need only describe three coordinates; these three coordinates could be, for example, X, Y, Z as in coordinate space; or alpha, beta, gamma, as in spherical space. The inventory space provides the number of items in a given memory space and in conjunction with control processor 53, determines any change in the inventory location that has taken place since the last antenna sweep. The motion space provides in conjunction with control processor 53, any change in coordinates of a given item, i.e., as delta X, delta Y, and delta Z. The error space is set aside for an error code which detects and accounts for one or more errors.

The third large space in the code unit is set aside for identification and maintenance testing. This section should be as large as practically possible, e.g. 48 bits. Each of the possible hundreds of thousands of items in the originator's space must be given a unique identification code. The maintenance code is essential to predict errors that will occur before they do occur. Preventive maintenance programs are common.

Code analysis unit 56 must take the codes that are available in the code unit and use them for the instructed purposes. In other words, it must use the error codes for error detection and correction, and the maintenance codes for preventive maintenance. The separator code will be used by the code analysis unit to connect the identification, location, inventory and motion sections of the PT unit 90. The code analysis unit 56 must also check each code to make certain that it is unique and that it is a member of the code provided for the UU by the originator.

Switching units 57 can be a part of control processor 53 or can be positioned throughout LIMIS. Switching units are normally logic units which are not available directly to maintenance. They are available, however, to error and maintenance routines which are passed to the switching unit from code analysis unit 56. If there are errors in the switching unit, they can be repaired by switching in redundant circuits which by-pass inoperative logic elements in the switching unit. The switching unit is preferably very fast and accurate. The switching unit 57 can contain sufficient logic to convert the information in the code unit to the desired output for output unit 58 and can be a part of control processor 53.

Output unit 58 can also be integrated with a cathode ray tube, a typewriter, a printer, a tape or a cassette, or other display or memory device. The unit should be capable of providing one or more identification codes for any one of the thousands of items coded into the system, showing its location, providing a complete inventory of all items; and a complete motion description. It can also identify and/or describe any errors, maintenance problems, and the originator, utility, service and other codes. Where needed, it can have the capability of any computer or broadcast output.

Before a group of pulses is transmitted, they are modulated in unit 59, i.e., combined with a carrier frequency that can be transmitted and picked up by the PTs or RRs. It could be the receiver of the repeater-relay, another AT or a PT. The modulator unit 59 circuits and requirements differ from frequency to frequency, range to range, PT to PT configuration, etc. and is similar to other transmitter modulators designed for like frequencies and parameters.

Transmitting unit 60 changes the high impedance information given to it by the modulator into lower impedance information required by the antenna unit. Transmitter units are well known to the art for various frequencies and other parameters in the bands assigned from 10 meter to millimeter wavelengths.

Switching unit 61 acts to turn off the receiver when the transmitter is turned on, and vice versa. This can be done in a synchronous or an asynchronous manner. The switching unit then passes the information on to antenna 62.

Antenna unit 62 can be as simple as a dipole or as complex as a phased array. The phased array antenna is one which, without moving parts, can move an antenna lobe in 360 degree azimuth and in 360 degree bearing. It can produce coordinate information for the location space. In cylindrical coordinates, the range is also required. In such instances, the antenna unit 62 is used in a manner similar to radar ranging, signal transmission, reception interval measurement, or buoy triangulation. The AT antenna units can be placed as required by the radar range equation. Multiple antennas 62 are required when the detection space is large relative to the designed broadcast range of the PT, e.g. in determining the number of ticketed people or locating a doctor in a football stadium where PTs have been attached to the tickets. The antenna units 62 may also be in spatial array such as in the corners of a room or the roof of a building, or on trees lining a golf course or light poles along a street, parking lot, or highway.

The AT of this figure can be utilized as an OU, an SU or a UU. In use as an OU, the manufacturer utilizes the OU to encode in the memory of the UU a predetermined set of codes which correspond to the UU serial number and limit the capacity of the UU. If a PT which has been coded by one of the codes allocated to the particular UU is lost, the OU transmits to the SU the originator code which correlates to the UU serial number. The user's utility code is then combined with the originator code and a range extending broadcast code. The SU then broadcasts the range extending code to the PT. When used as an SU, the unit functions as a self-contained UU, but can obtain a portion of its coding from the OU in a radio, telephonic or other communication.

Figure 6:
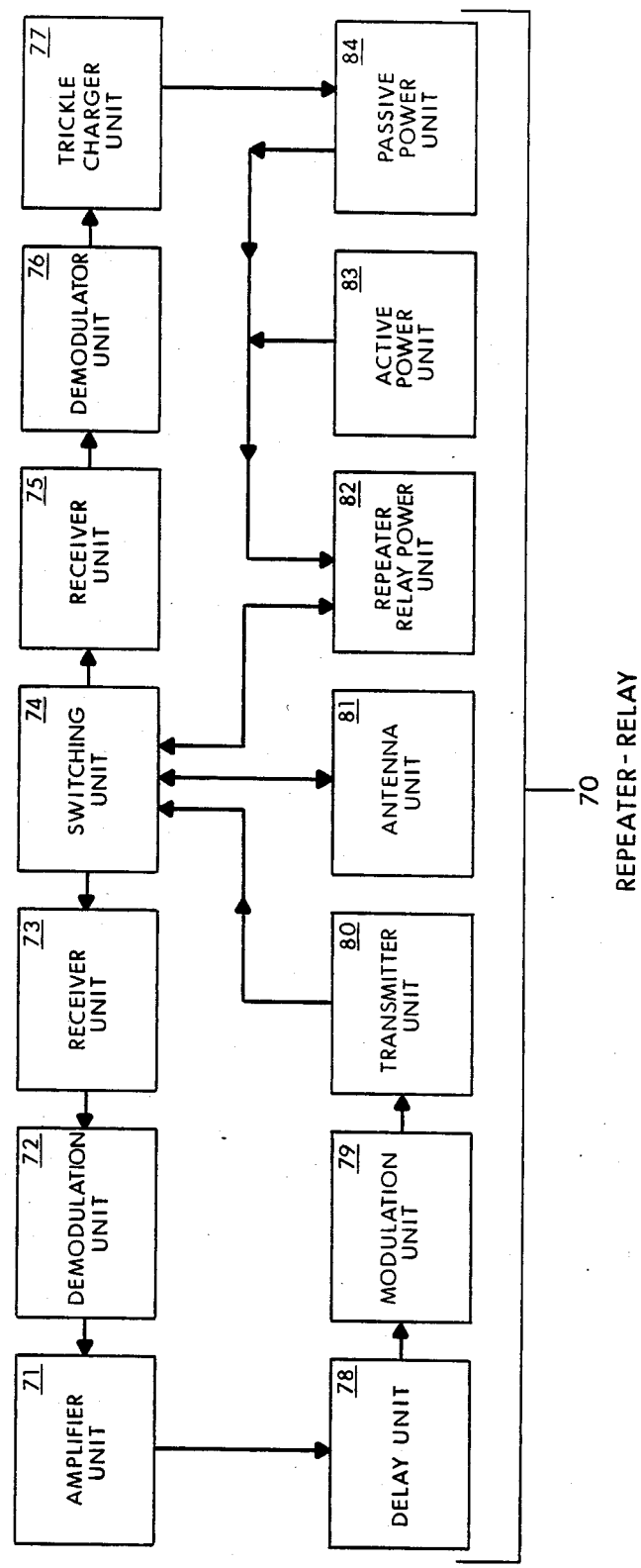
FIG. 6 is a block diagram of a repeater relay utilized in LIMIS systems.

FIG. 6 is a block diagram of a repeater-relay 70. Repeater-relay 70 consists of amplifier unit 71; demodulation unit 72; receiver unit 73; switching unit 74; receiver unit 75; demodulator unit 76; trickle charger unit 77; delay unit 78; modulation unit 79; transmitter unit 80; antenna unit 81; repeater-relay power unit 82; active power unit 83; and passive power unit 84, when needed.

Antenna unit 81 acts as both a receiver and a transmitter antenna. The information signal received is passed to switching unit 74 which directs the signal into one of receiver units 73 or 75 on reception of transmissions from an AT.

Receiver unit 73 receives the coded information from AT antenna unit 81 and demodulates it in unit 72 so that it can be more easily amplified in unit 71 than at the higher frequency. Demodulation unit 72 is not needed in applications where there is ample antenna power. The same is true with the amplifier unit 71. It is needed only when the repeater-relay 70 is far enough away from the UU or SU antenna that it must amplify the signal before retransmitting it to the PT.

Delay unit 78 serves as a switch and separates the receiver unit 73 from transmitter unit 80 insuring that transmitter unit 80 and receiver unit 73 are not on at the same time.

The signal from delay unit 78 is passed to demodulator 79 where it is changed to the higher frequency and transmitted through switching unit 74 and antenna unit 81.

Receiver unit 75 receives the pulsed signals from the switching unit 74 and is used when passive power is required or when the operator of a SU wishes to activate repeater-relay 70. This can be done by using units 75, 76 and 77 to charge a condenser bank or to recharge a nickel cadmium cell. The repeater-relay 70 can utilize other types of power, e.g., solar cells. These are all exemplarily titled repeater-relay power unit 82, active power unit 83, passive power unit 84 and transmitter 80 and other units through switch 74.

FIG. 6 shows how the signals transmitted by antenna units from repeater-relay 70 or PT 90 pass through switching unit 61, when appropriate, into receiver unit 63 and demodulator unit 64 changes that information into pulsed information for analysis by separator unit 65.

Separator 65, in conjunction with comparator 66, compares the code of the incoming signal from a PT with the preset PT codes assigned to the transceiver computer so if there is a difference in the coding, then an alarm 67 can sound or the signal can be ignored. The separator 65 and comparator units 66 check the item before and after the antenna sweep. If there is no difference in coded information received during those sweeps, no alarm is necessary. But if there is, then an alarm can be given and the alarm unit passes that information to, for example, a manned CRT output unit, or to an automated security unit for review and assessment or to a telephone or transmitter to broadcast to another location.

Figure 7:
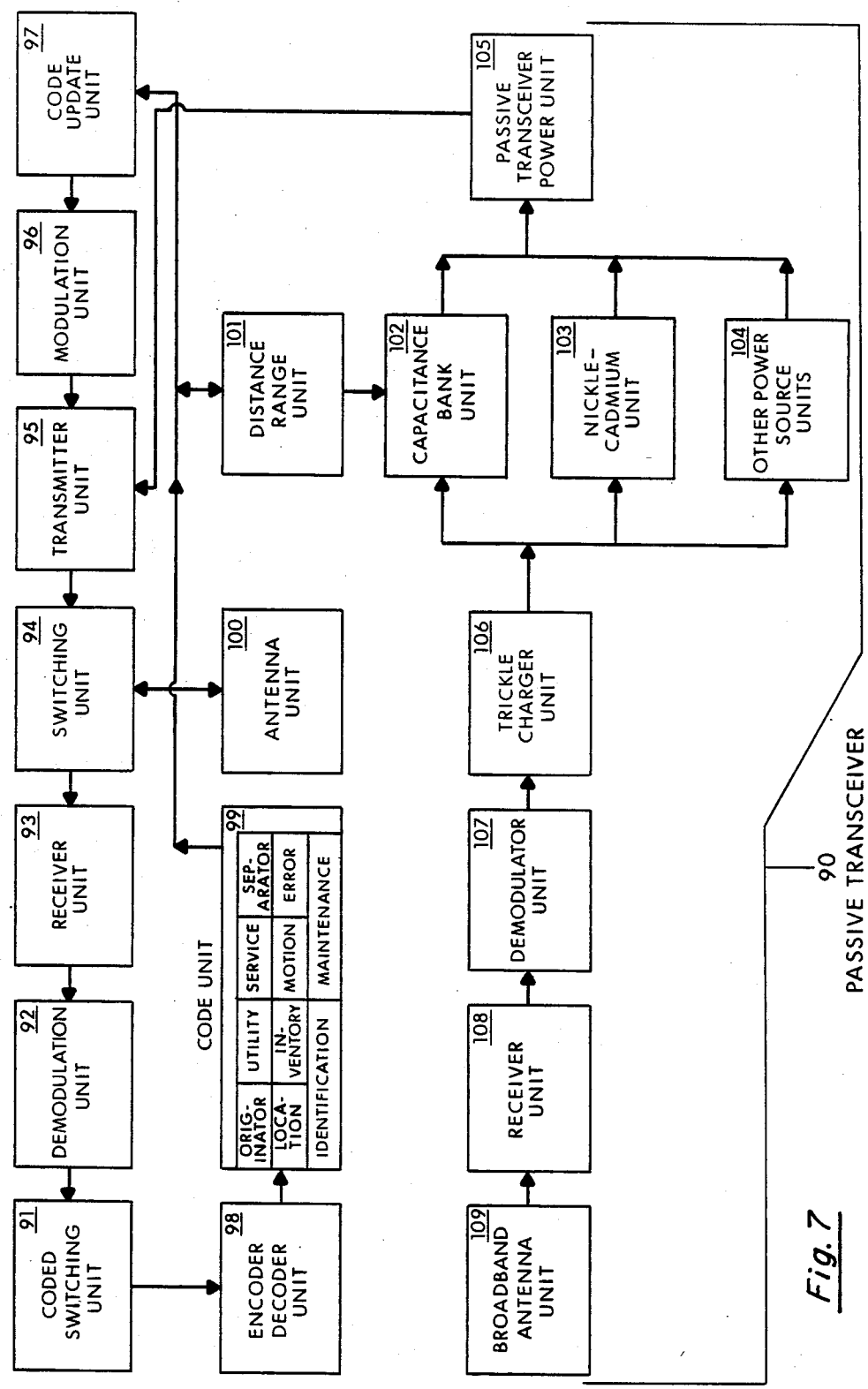
FIG. 7 is a block diagram of a passive transceiver encodable for essentially all LIMIS functions.

FIG. 7 is a block diagram of a PT operative with the AT of FIG. 5. Antenna unit 100 will be a different unit from the antennas of the computer transceiver and the repeater-relay in that it is extremely small. To get one wavelength at a ¼ inch or ⅛ inch, one must operate at 300,000 megacycles to 300,000 gHz. To operate at longer wavelengths, the antenna must be loaded. The amount of energy received by the PT transmitter is low because of its small size. Three useful antennas are the cloverleaf which can be millimeters on a side, the dipole, which can be ¼ wavelength long and the helix which can be made as long as practically necessary.

Information received from either an AT or repeater-relay passes through the antenna unit 100 into switching unit 94 which separates the functions of receiver 93 and transmitter unit 95. Receiver unit 93 provides a signal for demodulation unit 92 which removes the carrier frequency and changes the UHF information into coded pulses which are then used by the coded switching unit 94 to determine whether or not PT 90 replies to the received signal.

The demodulated identification code from code producer 54 passes through code switching unit 91 which is an adaptation of the converter device of U.S. Pat. No. 4,200,770, FIG. 1, and which switches the device on. The encryption process must be followed or PT 90 will not broadcast because the power source is routed through unit 91 if there is no authentication of transmission between the AT and PT. Encoder decoder unit 98 files the information received from the AT or repeater-relay in the code unit 99. Unit 99 uses a combination of ROM (originator code) and PROM (remaining codes). As unit 98 receives properly coded information, the information is encoded prior to introduction into code unit 99. When all information has passed through the encoder—decoder unit 98, the code unit 99 memory capacity should be correctly filled. As changes occur, that information is maintained in code unit 99 and transferred to code update unit 97 which then transfers it to the modulation unit 96 where a carrier signal is added and then to transmitting unit 95 switching unit 94, antenna 100 and thus on to the AT 50 or repeater-relay 70. Code unit 99 is preferably identical to the code unit 55 of AT 50. Code unit 99 preferably contains the same number of bits assigned code unit 55 in AT 50 and is capable of doing everything that the code unit of AT 50 does.

Each PT memory contains space for at least the originator, the utility, the service, the separator, the location, inventory, motion, error, identification and maintenance codes. Their use in the PT is as described previously in the discussion of AT 50. One difference exists, however, the output of the code unit 99 must have a special code for the service space. The service space code will be sent to the "distant range" unit 101 which causes additional capacitors of the capacitance bank unit 102 to be discharged and the power to the transmitting unit 95 to be increased. In such a case the output of code unit 99 is fed to the code update unit 97. This unit will make an analysis of the code unit 99 data before and after the AT antenna lobe has swept past the PT antenna unit 100. Any change will be transmitted by antenna unit(s) 100 to AT 50 where it will be analyzed. The modulation unit 96 and transmitter unit 95 combine to transmit the information analyzed by the code update unit.

The broad band antenna unit 109 is designed to receive as much energy as possible from the EMR medium surrounding the antenna. This energy is fed into the capacitance bank 102 and/or nickel cadmium unit 103 or other power source 104 to charge the capacitor through the trickle charger unit 106. Broad band antenna unit 109 is connected to the receiver unit 108 and then to the demodulator unit 107. That energy is passed on to the trickle charger unit 106 which changes it into a direct current to be used to recharge the power source. The result of the recharge is the stored power is delivered to the power unit 105 and thence to transmitter unit 95.

The utilization of the variety of codes enables the manufacturer to limit or expand the commercial utility of the PT in conformance with regulatory and marketing requirements.

Figure 8:
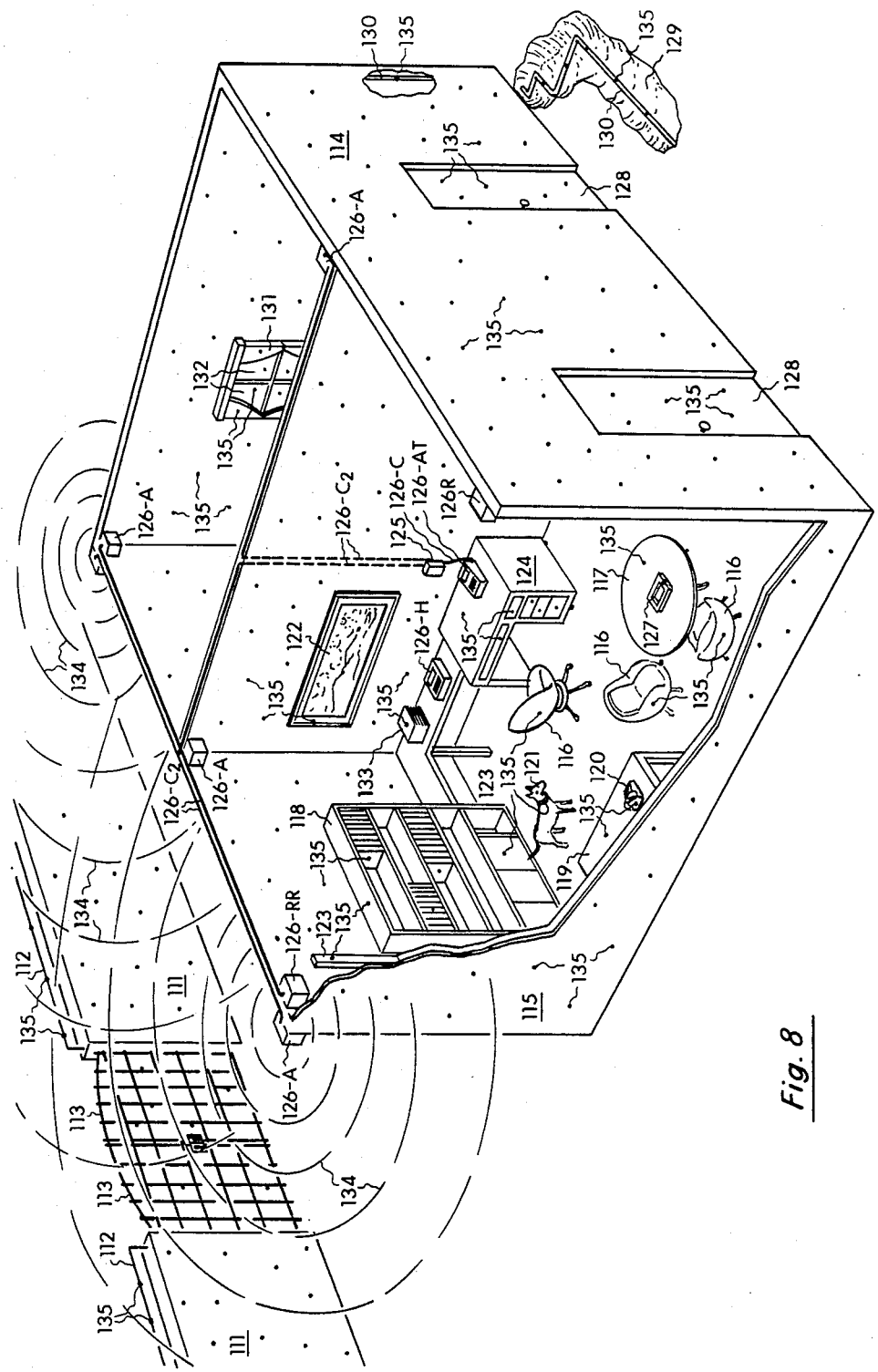
FIG. 8 is a drawing of a small building utilizing LIMIS inventions.

FIG. 8 is a drawing of a two room building surrounded by a boundary separating device, i.e., a fence. Fence 111 has, on its upper surface, a taut wire 112, an iron gate 113, and PTs 135 embedded in fence 111 and affixed to wire 112 and gate 113. Building 115 has, in the near room with the cut-away wall, chairs 116, coffee table 117, bookcase/divider 118, and table 119. On table 119 is automatic telephone dialer 120. A pet dog 121 is on the floor of the room and a picture 122 is on the opposite wall. A 2x4 stud 123 is shown protruding from the cut-away wall. Connection box 125 is connected to active transceiver 126-AT through cable 126-C and to antennas 126-RR through cables 126-C an radio frequency reflector 126R is in the lower right corner. The LIMIS unit of this facility also includes a hand-held locator 126-H with a liquid crystal display. An ash tray 127 rests on coffee table 117. Doors 128 lead to both rooms of the building. Partially excavated trench 129 reveals buried conduit 130 which bends and passes vertically through the wall of the upper right hand of the side of the building as shown in the cut-away. In the far room a window is shown only having curtains 131 and window panes 132. In the near room a stack of papers 133 rests on a bench (unnumbered). Outside antennas 126-A are shown in the broadcasting mode, the wave fronts are depicted by dashed circles 134. Preferably, the antennas broadcast pulsed signals alternately for location purposes.

In the system depicted, someone climbing over fence 111 depresses or otherwise moves the wire 112 and displaces chips 135 from their normal positions. This position change is noted by 126 AT and provides a basis for forwarding an alarm to a security service through automatic telephone dialer 120 or broadcasting an audible alarm at the building location.

Similarly, if someone breaks through the walls of fence 111 or building 115, opens doors 128 or breaks a window pane 132, these chips move from their accustomed position in space and provide a signal to the active transceiver 126 AT at which time it sounds the alarm.

If dog 121 is allowed to roam outside of fence 111 and gets lost, the broadcast antennas 126-A can be used to locate the dog if he is near the home. If the dog is more remote, hand-held unit 126-H can be used as a repeater-relay for unit 126-AT.

The LCD display of unit 126-AT or 126-H can be used to locate one of the books in bookshelves 118 on which PTs 135 are placed or a paper on which a PT 135 has been placed within stack 133. 126-AT or 126-H preferably contain a list of the items to which PTs have been attached and the utility code assigned to each item. These can be displayed to the user in the "scroll" mode or otherwise. A second, non-computer memory, inventory list should be maintained in a separate secure place.

The spatial position of the particular item sought is displayed on an X, Y, Z axis portrayal in 126-AT. Security is also provided for items in the cabinet at the bottom of bookshelf 118 and in the drawers of the desk 124 by PTs 135 affixed to the doors and drawers. Again, when the PT is moved from its accustomed position, 126-A either telephones a signal to a security source or triggers an alarm. If an item is stolen, for example ash tray 127, the police or a private security service is called, a supervisory unit similar in function to handheld unit 126-H can be used in combination with a cellular or other network or alone to locate the stolen item if it is too remote for location by the home AT. If the stolen object is nearby, the home 126-AT can be keyed with the utility code and AT-126 can then be used to locate the stolen object in a mode similar to the police supervisory unit. The broadcast range of the PT of the preferred embodiment is increased and one or both of the home AT-126-AT antennas 126-A and the hand-held unit 126-H are used in the location of the stolen object. Stud 123 and pipe 130 are also located by unit 126-H if the operating frequency is low enough to avoid absorption by the wall panelling and the earth. Preferably, unit 126-H can be tuned to multiple frequencies for increased search utility.

While the security system of this Figure detects the motion of PTs attached to fences, doors, etc.; the utility of such type system is not limited to buildings. Thus, movement of PTs in the doors of safes, lockboxes, valves and motion detectors of various sorts can signal an intrusion, breakage, or unauthorized opening.

FIG. 9 depicts a system for dispensing petroleum products from a bulk storage plant. In the system of FIG. 9, one or more of PTs 135 is embedded in combination credit card-meter ticket 141. Credit card reader-ticket printer 142 is actuated by the insertion of ticket 141. The reader-printer 142 dates the card and transmits the identification number encoded in PTs 135. This identification signal is fed to AT-computer 143 which searches its memory storage to determine whether an allowable credit balance remains for the customer having the identification number in PTs 135. If the identification number is not authentic, or if the customer has taken all of the petroleum products which he is allowed under a pre-set credit limit previously entered into the computer, the computer will not unlock the automatic valve 144. If an allowable credit balance remains for a customer whose credit card 141 is in the meter-printer 142, the AT-computer 143 will emit a signal to open automatic valve 144. Withdrawal of materials may then be accomplished by opening manual dispensing valve 145. A meter 146 located in the dispensing line may be automatically or manually zeroed at the start of withdrawal, this zero amount is printed on the card-ticket 141 by the reader-ticket printer 142. The total amount of the petroleum product withdrawn is transmitted to the AT-computer by meter 146 where it is converted into monetary units according to the price of the petroleum product being dispensed. Alternately, the maximum credit limits can be expressed in terms of loads and to eliminate the conversion of each delivery into monetary units. In either case, the amount delivered is subtracted from the remaining allowable credit balance and the new balance replaces the old in the computer memory. Alternatively, the meter pulses during delivery can be transmitted immediately to the computer and the computer can continuously reduce the remaining balance.

The computer may be used to make periodic billings by totaling the amounts of each individual delivery received in its memory storage and then printing out these data when the billing periods ends. Also, the computer may be used to maintain continuous inventories on each of the commodities available for sale at the distribution station and may signal whenever a pre-set low level of inventory on a commodity is reached.

FIG. 10 describes an embodiment of the combination credit card-meter ticket 141. PT-135 is shown as embedded in the upper end of the ticket 141 but one or more PTs can be embedded anywhere within ticket 141. Card 141 has a section 146 on which is imprinted, visually in human readable type, the customer identification number, dates and any other data which may be useful in connection with the identification of the customer to whom the material is to be delivered. Section 147 of card 141 is numbered for the printing of the number of gallons of each product to be loaded by the driver of the vehicle. Section 148 of card 141 is numbered for the printing of the prices of the product to be loaded. This portion may be filled in by supervisory personnel at the driver's home terminal or may be left blank where the amount of delivery is to be determined merely by filling the tank to its legal capacity. The lower portion 149 of the ticket is divided into spaces for the entry of initial and final meter readings with space for the calculation of net amounts delivered and for corrections and variations in temperature, density, etc. Reader-printer 142 (FIG. 9) fills in the blanks in ticket 141 providing a record of continuing transactions for administrative purposes.

While the embodiments of FIGS. 9 and 10 are described in terms of a petroleum bulk plant, there are many analogs of the system. These include credit cards which require no print-out and are used in automatic banking, by gasoline retail service stations, business gift certificates, athletic sports season ticketing, and entry to animal feeding stations. Other analogs include the use of such devices, either in card form, in "key" form for home, business, hotel, and equipment locks and as identification aids in laboratories and businesses requiring segregation of personnel, and routing aids to keep people off the wrong trains or airplanes and unticketed people off commercial carriers using "tickets" or passes.

Boarding passes and routing tags for passengers, luggage and packages would have PTs coded only for the particular vehicle, or vehicles, to be boarded or loaded. An AT at the loading "gate" is coupled with a motion or other sensor for the passage of the individual or package. The AT sends an "interrogate" message on the passage of the individual or package and, if no response is received, signals an alarm so the individual or package can be removed from the vehicle.

FIG. 11 depicts a much cut-away modular shelving system and a LIMIS system for use in supermarkets, pharmacies, service stations, libraries, plant inventory control units, and other locations where products for sale or distribution are stacked on shelves and removed periodically by customers, clients and clerks. The system is described for use in a grocery store but can be used elsewhere with appropriate minimal modification, e.g., parts, supply rooms for a production line, or explosives control in a mine. In the figure, a constant shelf by shelf and item by class inventory is maintained by AT-150 which utilizes computer 151 for data storage and processing. AT-150 is wired to parabolic antennas 152 placed on the ceiling of the store in predetermined patterns or repeater-relays 152 which are preferably positioned in or under the ceiling of the facility in a predesigned pattern required by the radar-range equation for radio contact with the repeater-relays 153 attached to the modular shelving 154 attached to vertical supports 155. The repeater-relays 153 are shown wired (unnumbered) together for attachment to an electric power source, i.e., 115 V or 230 V. Attached to repeater-relays 153 are antennas 156 suspended from the bottom of each shelf 154. The LIMIS system provides inventory counting control by utilizing AT-150 to periodically broadcast through antennas 152 codes incorporating product identity and pricing to the PTs 158 on goods 157 stacked on shelves 154. The interrogated PTs immediately broadcast a response signal which is picked up by antenna 156 and broadcast by repeater-relay 153 to antennas 152. The computer 151 connected with AT 150 then counts the numbers of items on the shelf and provides stocking equipment or personnel with notice when the supply of particular goods on the shelves 154 are below pre-set minimums.

AT-150 can reset pricing information by erasing the pricing section of the coded information previously encoded in PTs 158 and broadcasting new price data.

Items in stock are removed from inventory when goods 159 in shopping basket 160 are positioned in predetermined locations adjacent check-out unit 161. Check-out unit 161 interrogates PTs 158, determines the pricing data, and broadcasts a signal through antenna 162 to antenna 152 of AT 150 to print the bill, deleting the goods 159 from inventory and decode PTs 159 to the extent permitted by the system when a clerk presses a button on register unit 161 indicating that payment for the goods has been made. If the PT 159 code indicates that the item 158 is a controlled substance, computer 151 will note the date, time of sale, credit card, identity, and other required data.

Market basket 160 has an attached PT 164. PTs 159 are periodically, e.g. once per two minutes, interrogated through antennas 152 to determine their movement through the store. As PTs 158 are interrogated, computer 152 matches their removal from shelves 154 with the route of market basket 160 and correlates the removal of an item 157 with the location of market basket 160. As market basket 160 approaches the check-out counter, AT check-out unit 161 immediately interrogates the PTs of items 158 in market basket 160 to determine whether items removed along the line of travel of market basket 160 are in the basket, whether the items are in other baskets, whether the items have been placed on other shelves within the store, or have, effectively, disappeared. If the store utilizes credit cards, (an analog of the bill of lading of FIG. 10) the computer, through check-out unit 161, can quickly establish the card identity and note that various types of items 157 disappeared in the proximity of the bearer of the credit card. The system of FIG. 11, through computer 151, can determine whether patterns of theft occur during repeated visits to the store by the card-bearer and alert management of the presence of the individual in the store for identification purposes, so that surveillance or body searches can be initiated.

In a different system, similar to that utilized in bar-coding, no pricing information is encoded on PTs 158. Unit 161 contains an up-to-date pricing schedule periodically broadcast by AT 150 and when the particular goods are placed in the predetermined proximity of unit 161 the bill or credit document is computed from the codes entered by PTs 159 and the previously stored pricing data.

FIG. 12 depicts an oil storage tank 165 containing PTs 166. These PTs have been encapsulated in a material which provides them with approximately the same specific gravity as that of the crude oil and prevents substantial creaming or settling to the bottom of the tank. On the surface of the crude oil, PTs 167, encapsulated in a lighter material, float to provide liquid volume data from their positions in the tank. Oil is introduced into tank 165 via valved pipe 168 and exit from the tank through valved pipe 169. Connected to valved pipe 169 is a turbine flow detection device 170 wired to a repeater-relay 171. The turbine flowmeter is depicted in more detail in the partially cut-away unit of FIG. 13.

FIG. 13 describes a flowmeter 175 shown in the cut-away portion on the left side of the unit. A turbine blade 176 is centered within an enlargement in unit 175 and is fitted to close tolerances. PT 177 (enlarged greatly) is attached to one blade of the turbine and, as fluid flows through the turbine from left to right, spins the turbine past a repeater-relay 178 having an antenna 179. The repeater-relay 178 and antenna 179 are embedded in a material which is, preferably the color of the unit and sufficiently hard to protect the repeater-relay 178, antenna 179 and AT 180 (for flowmeter 175) from accidental destruction. The embedding material should be substantially transparent to the broadcast frequency. Repeater-relay 178 is powered by a battery pack 181 that can be recharged from any external power source. The external power is required when the broadcast repetition rate of PT 177 is increased to the repeater-relay and from repeater-relay 178 to active transceiver 182 where the repeated signals are counted.

While the device shown in FIG. 13 is discussed in terms of a flowmeter, using the basic concept, it can be used to obtain wind data from anemometers, automotive and aircraft turbochargers, viscosity from viscometers, and, in close analogs, the rotational speed of various types of turntables, electric meters, and miles per hour for wheeled vehicles. Analogous units can be used to trigger feathering devices or governors of windmills and other similar bladed devices. In another close analog, instead of measuring the rotational speed of a blade, units equivalent to active transceiver 182 can measure the rate of reciprocal motion, for example in a diesel engine, to trigger a governor. In still another analog, a PT attached to the LIMIS system rotor of a turbine or electric motor can trigger a controller to increase or decrease the voltage and/or the amperage to the appropriate coil(s) in use to achieve motor operations within a prescribed rpm range and reduce energy utilization by maintaining the applied power to that minimum required for maintaining the predetermined rpm range under the ambient load.

In the instrument shown in FIG. 13 three frequencies are utilized. A very high frequency broadcast signal is broadcast continuously by a repeater-relay unit 178 to maintain the charge on PT 177. PT 177 repeater-relay 178 and AT 182 broadcast alternate code groups at two different frequencies. The coded broadcast signals are amplified in repeater-relay 178 and broadcast through antenna 183 to AT 182 at the same or a different frequency. The powering signal broadcast of repeater-relay 178 also serves to keep the passive power supply of PT 180 "topped off" so that the owner of the active transceiver can have a long range broadcast from PT 180 in the event that unit 175 is lost or stolen and is triggered by an SU. Active transceiver 182 can serve as a surveillance unit in the location of unit 175 and, as indicated by the dual antennas 183, locates the unit by triangulation or ranging.

FIG. 14 depicts a partially schematic, partially cut-away view of component 185 of electronic and electrical devices, e.g., hand-held calculators, microcomputers, mainframe computers, electronic switching devices, optical readers, automotive and aircraft controls, and typewriters. Component 185 has, as part of its logic, testing, switching and checking circuitry, a logic and "test unit" 186. Unit 186 is connected to PT 187 which receives its input signal through chip "wiring" rather than through an antenna and broadcasts its alarm signals on detection of a major breakdown in component 185 which cannot be resolved through routing the electronic computer component functions through redundant circuits. PT 187 has two functions. One is to respond when interrogated by an AT to indicate its presence and two is to broadcast alarm signals when unit 186 indicates a substantial malfunction of component 185. Units 186 and 187 utilize component's 185 logic circuits which are a part of the arithmetic logic unit of the PT 187. (See, for example, FIGS. 2, and 3).

FIG. 15 depicts parking spaces 190 having a divider 191 at the center of two parking spaces and a cruciform array of PTs 192 attached to the surface of the parking area. An automobile, shown cut-away, has, antennas 194 mounted on the underside of the car and wired to AT 196 mounted on the dashboard of the automobile 193. This first embodiment of the invention provides the motorist with a means of correctly positioning automobile 193 within parking space 190.

In operation, the driver moves automobile 193 into parking area 190 and over PTs 192. Antennas 194 are wired to AT 196 having a display (not shown) mounted on the dashboard of automobile 193. Active unit 196 spike charges and interrogates antennas 194 sequentially, computes the position of each antenna relative to PTs 192 and is programmed to display an outline of automobile 193 superimposed on a cross representative of the collective locations of PTs 192.

In a second quite different embodiment of the system heretofore described, the system detects empty parking spaces. In this system, PTs 195 are connected to repeater-relay 198 through a cable indicated by line 197. PTs 195 are a part of a magnetic anomaly detector in RR 198. In this embodiment, the detectors sense the presence of the ferromagnetic materials in a vehicle such as automobile 193, a motor cycle or a bicycle. The sensed data is then broadcast to a nearby RR or AT for use.

An analog of the second system of this figure can be utilized in the binning of ferrous and other parts. For example, the system could be used in the inventory of bolts or plastic parts in a bin.

FIG. 16 depicts a unitary "smoke" detector fire alarm system. The system includes ionization detector 200 and smoke detector 201 elements on a passive transceiver 202 with a radio link to the household or office at 203 which is, in turn, in radio communication with an automatic dialing telephone. Telephone 204 automatically dials a security service 205 which sends personnel to investigate the alarm. Alternatively, the AT 203 may sound an alarm at the site of its location on detection of an irregularity from the radio signals broadcast from PT 202.

A variety of detectors can be substituted for ion detector 200 and smoke detector 201 for the creation of alarm systems. Thus, a similar system could be set up to sense the presence of water in a basement, oil in a moat surrounding an oil storage tank, various fumes in a laboratory or plant, the presence of light where darkness is required, excessively high winds, overheating electric motors, overloaded cranes or overheated hot water heaters. If the PT has a sensing "coil", the PT can be used to detect the flow of electricity when such flow is undesirable or prohibited.

Where detectors 200 and 201 have been substituted with infrared detectors and seismic-type detectors, the system AT can be programmed to determine activity and body temperatures. This particularly is true where a heat detector is attached to an animal as in FIG. 19.

An analogous system detector 200 detects isotopic disintegrations per second and detector 201 determines the energy of disintegrations to aid in identification of isotopes.

FIG. 17 depicts a miner wearing overalls 212 entering a mine shaft 213 carrying a pneumatic jackhammer 214. Antennas 215 are connected to repeater-relay 216 mounted on portal 217. Repeater-relay 216 amplifies and broadcasts signals to an AT (not shown) where a safety officer monitors the presence or absence of safety equipment worn by personnel entering the mine. Thus the AT would alarm if PTs 220 on fireproof overalls 212, safety shoes 221, gloves 222, noise mufflers 223, safety glasses 224 and safety helmet 225 are not worn. A powerful AT 226 is mounted in a chest or backpack and is equipped with sensors for excessive smoke, poisonous gases, oxygen deficiency and a motion detector and programmed to signal the loss of equipment. The unit is also programmed to broadcast a distress signal in the presence of excessive noxious gases, insufficient oxygen, or a prolonged absence of motion. The various shafts and drifts of the mine (not shown) are equipped with antennas adapted to receive very low frequency distress signals from AT 226 or signals indicating an extended lack of motion from AT 226 and analyze the signals for location, identification and other purposes. The low frequency AT 226 transmissions are designed to broadcast through cave-ins and flooding waters which isolate the miner and indicate whether the miner is alive after a disaster. If the miner is also equipped with a commercial infrared pulse detector incorporated in the worker's watch to determine the miner's pulse and temperature and a PT 202 similar to that used in FIG. 16, an added increment of the worker's health can be determined during and after a disaster.

FIG. 18 is a top view of a blind man 229 walking down a sidewalk 230 having, on the walker's left, a row of PTs 231 and on the right side, a row of PTs 232. Cane 233 is an antenna for an AT 234 held in walker's 229's hand. As walker 229 swings his cane 233 back and forth across the sidewalk, unit 234 provides a sound and/or vibration indicating the increasing proximity to the line of PTs 231 or 232. This allows walker 229 to position himself on the sidewalk, as desired. As walker 229 walks to the right as shown in FIG. 18, he approaches PTs 235 which are spaced apart some distance back from the curb 236. At curb 236 a line of PTs 237 causes a different sound or vibration to issue through AT 234. PTs 239 further delineate the pedestrian walkway in road 238. Each of PTs 231, 232, 235, 237 and 239 is coded differently and AT 234 broadcasts a different pulsed vibration or audible sound. The time between pulses decreases as cane 233 approaches the particular PT. Alternately, the sound or vibration can increase as cane 233 approaches a PT.

The guidance system of FIG. 18 is readily adaptable to the guidance of automobiles, taxiing aircraft, robots, and other devices on various "ways", e.g., on walkways, roadways, alleyways, and taxiways. Thus, the automobile of FIG. 15 can determine its position within a driving lane through the utilization of antennas 194 attached to the undercarriage of the car.

Lane defining systems such as that shown in FIG. 18 are particularly useful in guiding automobiles, tractors, and aircraft over snow covered roads, runways, parking lots and the like. The system is equally applicable to in-factory and in-warehouse robot and automated tractor controls. The system, in such cases, might be covered by vinyl tile or some other decorative material. The signals from ATs 235 can be utilized to brake the tractor and ATs 237 to stop the tractor at a predetermined location. The tractor could thus be "stepped" from location to location through a plant or a robot through various work stations.

FIG. 19 depicts a temperature sensor designed to be inserted in the mastoid bone area of cattle or other animals. The device is made up of an infrared detector 206 surrounded by a potting material 207 and affixed to PT 208. The unit is powered by a thermocouple or thermoelectric unit 209. PT 208 is enclosed in an outer sheath 210 in the form of a nail and extends its antenna 211, preferably loaded, to the end of sheath 210. When the temperature indicating signal from infrared detector 206 goes above or below a pre-coded range, the ALU causes a signal to be broadcast via antenna 211 at the maximum range designed for the unit.

The unit of FIG. 19 will utilize an outer casing similar to that of a mechanical device which is shot into the head of cattle using equipment similar to that used in driving nails into concrete.

Commercial devices now being marketed are made up of an outer nail shaped shell, a painted, compressed spring with a nail through it extending into a frozen eutectic composition in the bottom of the outer shell. When the animal's temperature rises, the eutectic melts, freeing the nail and allowing the spring to expand. The "flags" of these commercial devices can only be seen for short distances and therefore are ineffective for use with range cattle. The device of FIG. 19 extends the range so that, with suitable repeater-relays, cattle can be tracked over a wide area, their location ascertained rapidly, and temperature increases as a result of running from predators or illness noted immediately.

Similarly, an aircraft parking system utilizing PTs 232 can be used to assist pilots in staying within a particular snow-covered taxiway. PTs 235 indicate a slow down prior to a turn mandated by a programmed broadcast by the control tower, turning points and stops would be indicated to the automated taxi system by PTs 237 and 239.

FIG. 20 depicts a mono-arm robot 245. The robot has a base skirt 246, a sensing section 247 with antennas 248, heat vents and air exchangers 249, and a rotating cap member 250. Internal to cap member 250 is AT 251 connected to antennas 248 and 252. Arm 253 is attached to rotating cap 250 and is hinged at and controlled from its upper end, at the elbow, and wrist. The components of the robot differ from those used in commercial robots only to the extent of aesthetic design and adaptation to that design and in the utilization of AT 251, antennas 248 in the guidance system and PTs 254 in controlling the robot arm. Antennas 248 broadcasts signals to PTs such as PTs 232, 235, and 236 of FIG. 18 and PTs located on walls, at work stations, and other predetermined locations necessary to complete a desired guidance program, and if a PT includes a charge coupled device, provides the robot with RF "sight".

The robotic arm control of AT 251 determines the positions of various segments of robot arm 253 by broadcasting a signal through antennas 252 to PTs 254 to control vertical upper arm movement, 255 to control forearm movement, and 256 to control "hand" movement. Antennas 252 are used to broadcast at operating wavelengths of from about 1 cm to about 1 mm and continuously and sequentially triangulate or range the positions of 254, 255 and 256. This system permits essentially continuous feedback between arm and workpiece during robot arm manipulation.

Currently, robotic arm operation is incrementally sequenced by a computer command program. Without feedback, the robot arm and even the robot itself can be overstressed if the robot arm is sequencing and its movement is prevented by some object not normal to the sequence space in the absence of a feedback mechanism such as that provided by LIMIS. If the robot is mispositioned, it may be unable to grasp the workpiece without the necessary feedback.

FIG. 21 depicts an automated small sailing vessel made up of a hull 260, a sail 261, a boom 262, and a mast 263 with a pulley mechanism 264 and a sail elevation control cable 265. PTs 266 are attached to sail 261. Mast 263 is rotated in either clockwise or counterclockwise motion by mast rotating unit 266 and spar 262 is likewise rotated clockwise and counterclockwise directions by spar rotator 267. Cable controller 268 is used to raise and lower sail 261. Antennas 269 are connected by cables to an AT 270 position within hull 260. Other antennas 269 (not shown) are placed on the mast and the bow and amidships of boat 260. Mast rotating unit 266, spar rotating unit 267 and cable controller unit 268 are all equipped with strain gauges (not shown). A wind direction indicator and anemometer 272 are mounted on mast 263 and input to AT 270. AT 270 spike charges and interrogates each of the sail mounted PTs 266, determines the position of PTs 266 in space, and, from their relative positions, determines the trim of the sail. AT 270 utilizes wind direction, wind speed and sail trim to rotate the mast, rotate the spar, and elevate or raise the sail using technology common to modern automatic sailing vessels.

FIG. 22 is a LIMIS system controlled drill press designed for repetitive drilling functions. The press is made up of a base 275 and on the base is positioned a workpiece 276. Vertical support 277 is affixed to base 275 and is serrated on its front edge. Drill mount 278 is moved vertically by a screw interacting with the serrations and driven by motor 279 which is affixed to the side of mount 278 and wired at AT 281. Antenna 282 is positioned adjacent AT 281 and connected thereto. AT 281 is wired to motor 279 as indicated by the dashed lines. The base is equipped with PTs 283 and 284 and vertical support 277 is equipped with PT 285. The controls on motor 279 automatically turn on the drill powering motor (not shown) when a workpiece 276 is placed on base 275 in drill mount 278 and motor 279 is turned on, thereby moving drill mount 278 downwards. AT 281 periodically interrogates PTs 283 and 284 to determine, respectively, the position of drill mount 278 relative to PT 283 and the presence of a workpiece 276 on drill base 275. The energy broadcast at the frequency of PT 284 is such that workpiece 276 is somewhat opaque to its transmission. The reduction in signal reaching antenna 280 indicates the presence of a workpiece in place. As work mount 278 moves downward, it constantly checks the position of drill mount 278 with respect to PT 283 and, when it reaches a predetermined position at which drill bit 286 has completely penetrated workpiece 276, the direction of movement of drill mount 278 is reversed. At this point, antenna 282 is activated and interrogates PT 285 as drill mount 278 moves upwardly. When drill mount 278 reaches a predetermined distance from PT 285, motion ceases until a workpiece 276 is placed in position over PT 284. Preferably, the AT utilizes multiple antennas.

FIG. 23 depicts a blind worker assembling wiring harnesses. In the figure, wires 290, 291, and 292 having, respectively, shorter lengths, are hung over bar 293 for later assembly. Worker 294 takes two long wires 290, two medium length wires 291, and one short wire 292 and strings them through two harness pieces 295. The assembled harnesses 296 are then laid out for inspection. AT 297 broadcasts an interrogation code to the vicinity of the bundle being assembled. If the amplitude of the return signal indicates that two PTs 290, two PTs 291 and one PT 292 are present, the assembly has been correctly made by blind man 294.

FIG. 24 depicts a currency counter-sorter. The counter-sorter is made up of a conveyor belt 301, AT 302, and vacuum lines 303, 304, 305, 306, 307 and 308. Currency deposited on belt 300 is conveyed under AT 302. AT 302 reads PTs embedded in the currency. PTs embedded in various denominations have different coding and can have the complete serial number of the bill in the coded output. In this particular embodiment of the LIMIS system, the interrogating code is common to all currency but differs from other paper products, for example, shares of stock or bonds. Each of these latter species of paper products would have a common coding which could be broken down by type of document and the document producer, for example, shares of IBM, Inc. In the embodiment depicted, AT 302 identifies the denomination of the currency and, if the serial number of the currency is recorded in the PTs, whether the bills, which have been stolen or lost, can be traced by the police. AT 302 activates the proper vacuum units 303–308 for various denominations of bills. As currency having PTs 301 embedded therein pass down conveyor 100, they are vacuumed off the conveyor as the bills pass the appropriate vacuum station which are sequenced by unit 302 and into a counter-stacker (not shown). Stolen bills and uncoded bills would, also, have sort receptacles where such bills are held for further handling.

FIG. 25 depicts a pipeline 309 having a valve 310 for diverting the flow of fluid in the pipeline through "T" 311 or allowing the fluids to continue along pipeline 309. Pipeline 309 has an AT 312 embedded in the pipeline wall. As a separator slug 313 containing suspended PTs 314 passes AT 312, it signals a valve actuator (not shown) to position valve 310 and allow the flowing fluid to continue to flow down pipeline 310 or to be diverted to pipe 311. The position of the valve can also signal an unauthorized withdrawal when equipped with an appropriate PT.

FIG. 26 depicts a portion of a department store having an AT (not shown), an antenna 316, and exit door 317, a jewelry counter 318, a cash register 319, and a hand-held calculator and computer counter 320. The ring display 321 is on top of counter 318. Cash register 319 has antennas 322 broadcasting a pattern extending 25 feet around the antenna. Register 319 is connected to the department store's central AT data bank and periodically broadcasts an inventory code to determine the presence of all items of jewelry, hand-held calculators and computers which has been checked into the area of the counter designated for their display. In the event that an item, e.g., a ring, having a PT (not shown) is removed from the broadcast range of antenna 322, and no deletion from inventory has been made, a buzzer 323, sounds a code to clerks nearby that an item has been removed from the permitted zone. At the same time, register 319 inputs a signal to the department store AT to activate the "locate" code and initiate a storewide interrogation broadcast from various antennas 316 in the store to determine the location of the item, whether the item is moving, is indicated to be in someone's handbag, and the direction of travel of the object. Display 324 on register 319 indicates the approximate location of an item outside its permitted zone in the vicinity of register 319. Buzzer 323 sounds a coded alarm to indicate to the clerk that the item outside the zone is in the proximity of the register so that the clerk will look at display 324 and determine the location of the individual with the item so that the individual can be pointed out to store security personnel should they not have their hand-held locator units. (See FIG. 28)

FIG. 27 depicts a portion of an automated automobile paint line. The line is made up of a supervisory computer 330, plant scheduler 331, machine controllers 332 and various pieces of equipment (unnumbered). Supervisory computer 330 and plant scheduler 331 make up the LIMIS system and, in turn, control machine controllers 332.

Actuation of door openers 333 and spray guns 334 is by mechanisms similar to those used in the controls of the robot of FIGS. 20 and 22. The PTs and ATs combine to measure distance and location of the various paint spray and door opener units as well as starting and stopping the travel of these units and actuating the paint spray when appropriate. The amount of paint applied is readily and commonly determined by the volume of the paint sprayed in combination with the area covered. The supervisory computer 330 computes this function. Alternately, PTs can be affixed to the surface of the material being painted or otherwise coated. Measurement of the average depth of the paint is by computing the diminution of signal strength from the PTs attached to the workpiece.

FIG. 28 depicts the functional units of a hand-held unit useful for operating either with or without one or more other ATs in a larger LIMIS system. The unit is made up of antenna 340 and asynchronous transceiver 341. Modulator-demodulator 342, code unit 343, ALU 344, power unit 345, output 346, and key inputs 347.

All the elements of this unit except outputs 346 and keys 347 have been discussed in detail previously. The output unit 346 can be one or more of the following: lights, a liquid crystal or other display, sound emitters, and/or vibrators. Key inputs 347 will be those inputs normal to hand-held calculators. If the calculator is to be combined with the hand-held unit, suitable special keys are required.

In operation, the unit is switched on and particular input desired is keyed. The ALU 344 then turns on power unit 345, activates code unit 343 to provide modulator-demodulator 342 with a signal which is then broadcast through transceiver 341 and antenna 340. On recepit of a reply to the coded broadcast signal, the signal received by antenna 340 passes through transceiver 341, is demodulated in unit 342, the coding checked in unit 343 and the functional output programmed by ALU 344.

FIG. 29 depicts a multi-purpose hand-held usable in the home and elsewhere. For example, it can replace the blind walker unit of FIG. 18.

Unit 350 has an antenna section 351 at its upper end, lights 352, sound emitters 353, an LCD unit 354, keys 355, vibrator units 356 and on-off switch 357. In addition to the standard keys 355 (0-9), arithmetic functions and the "C" (clear) key, there are "L" (locate), "T" (trace), "DY" (display), "D" (distance in numerals), "M" (memory), "V" (vibration), "LL" (lights), "A" (augment power), "S" (speed), "AT" (auxiliary mode), "R" (repeat) and "AD" (audio).

The unit normally operates in the hand-held calculator mode with an activated display 354. The individual can then conduct normal hand-held calculator computations utilizing the standard keys. Should the individual desire to locate an object the "L" key is pressed, and the "PT" utility number keyed. If other than a display output is desired, the V, LL or AD keys are pressed to activate these functions. When "L" is keyed, an X, Y, Z axis projection will be projected on display 354. The position of the hand held unit 350 will be displayed as a "U" and the lost object displayed as an "O". Referring to FIG. 8, the sought object would be located in the stack of papers 133 and the hand held unit will be positioned in the lower right hand corner of the figure.

Both the sound and the vibration are at different frequencies but light amplitude would be used as a "pointer". If the unit were being used for horizontal location, and the object was off to the right, the right buzzer would sound louder, vibration would be greater and/or light would be brighter. The converse would be true if the item being sought were to the left. If the object were straight-ahead, the lights, vibration and sound levels would be equal. In searching for some object above or below the level of the hand-held unit 350, the unit would be turned on its side and the sound and vibrations would again point the direction for the user. The light, sound and vibration would be pulsed and the time between pulses would increase with increasing distance between the user unit 350 and the object sought. The unit can have "range" settings for various distances.

If the user of unit 350 desires a trace of the movement of the object sought, the "T" and "DY" keys are pressed to display and hold a trace of the movement of the object. Items such as distance, time and speed are displayed in appropriate form on display unit 354. If the object sought does not appear on the display or elicit a light, sound, or vibration, under desired circumstances, the "A" key is pressed to increase unit sensitivity and/or the broadcast range of the PT. If no response is again elicited, the "AT" key is pressed to activate other parts of the particular LIMIS system. In terms of FIG. 8, the pressing of the key "AT" of the unit of FIG. 29 would activate unit 126AT and bring into play all antennas 126A in and around the building. The greater power and sensitivity of unit 126AT could then be used in the search for the lost object.

While the unit of this figure has been described in terms of keying for use in the home (FIG. 8); by the blind (FIG. 18) and in a department store (FIG. 25), it can have different key operations for other uses, e.g., on a golf course. The golf course unit can have keys such as "HD" (hole distance), "BN" (ball number) and "BS" (best score). The golf course unit can, however, be considerably simpler because functions required by the deaf and/or blind, i.e., sound and vibration, could normally be eliminated.

In a mine, factory, scientific laboratory and the like, other keyed functions would similarly replace a number of the keys of FIG. 29. In many instances, where an inexpensive unit is required, even the arithmetic calculator functions can be eliminated.

FIG. 30 depicts a rf-light based system 360 which is made up of an AT 361 and a PT 362. AT 361 is made up of a light source 363, a light modulator 364, a light transmitter 365, a computer 366, encoder 367, alarm 368, matching code decoder 369, amplifier 370, demodulator 371 and receiver 372. In the broadcast mode, information from computer 366 is passed to encode 367. The encoded data is used to control modulator 364 which either switches light from source 363 on and off or modulates the light. The light from 364 is focused in transmitter 365 and broadcast to a PT 362. In the receiving mode, rf energy received by receiver 372 is demodulated by demodulator 371, amplified in amplifier 370, decoded in decoder 369 and the decoded data is input to computer 366. The data input into computer 366 may signal an alarm via alarm 368 or result in the transmission of a signal to encoder 367 and modulator 364 which modulates light from source and broadcasts it through transmitter 363.

PT 362 is made up of receiver 378, demodulator 379, matching code decoder-coder 380, code (memory) storage 381, arithmetic logic unit 382, modulator 383 and transmitter 384. In operation, light from AT 361 is detected by receiver 378 and converted to a digital electroic signal. Detector 378 can be any one of a variety of light detectors, preferably solid state. In demodulator 379, the carrier wave is stripped from the received signal. The demodulated electronic signal is decoded in decoder-coder 380 and transmitted to ALU 382 which acts as the switching unit for the system and provides all electronic data handling. If the received code requires alteration of the code in code storage 381, ALU 382 switches power source 385 into the required voltage mode(s) for alteration of code storage 381 and provides the applied voltage for encoding code storage 381 with the new code. If the decoded information from decoder-coder 380 merely is an interrogation of PT 362, ALU 382 inputs a coded signal to modulator 383 where an rf or light carrier frequency is used to modulate the rf or light signal and the modulated signal is passed into transmitter 384 and broadcast through an antenna (not shown) to activate transceiver 361.

The power source 385 is passive and is charged by light, rf, or other energy. Power source 385 provides power to all units in accordance with commands of ALU 382 in this asynchronous system.

Transmitter 384 can also output to a display, printer or other appropriate device.

FIG. 31 depicts a sonic system having an AT 400 and PT 420. The AT is made up of three sensors, 401, 402 and 403, their respective signal amplifiers 404, 405 and 406; discriminators 407, 408 and 409; coder-decoder-modulator-demodulator 410, computer 411, tank circuit 412, rf transmitter 413, acoustic transmitter 414, acoustic transducer 415 and clock 416. On operation, sound received by sensors, 401, 402 and 403 is converted to a digital electronic signal and amplified, respectively, in amplifiers 404, 405 and 406. A signal from each amplifier is fed to two of the three discriminators and the discriminated signals passed into coder-decoder-modulator-demodulator 410. The coder-decoder function of unit 410 in AT 400 is an adaptation of one converser of FIG. 1 of U.S. Pat. No. 4,200,770 and the coder-decoder 423 of PT 420 is the other. It includes a limiter preventing the codes in different PTs and in different code spaces from being the same within specified areas and/or utilizes. The decoded and demodulated information from unit 410 is passed into computer 411 which calculates the three dimensional position of the PT relative to AT 400 from the signals detected through sensors 401, 402 and 403. If the decoded information matches the previously designated code identification in computer 411, an rf or acoustic transmission is made. If an rf transmission is to be made, the signal is re-encoded in unit 410, forwarded by computer 411 into tank circuit 412 and transmitted through transmitter 413 via an antenna system (unnumbered). If an acoustic broadcast is required, the encoded signal from unit 410 is transmitted to acoustic transmitter 414 and broadcast via transceiver 415. WWV clock 416 serves to synchronize the operation of AT 400 and PT 420. Synchronization is obtained by superimposing a clock signal on the input to the coder-decoder-modulator-demodulators. The clock signal is also superimposed on the signals input to acoustic transmitter 414 from unit 410 to obtain synchronization with PT 420.

PT 420 is made up of a sensor 421, amplifier 422, coder-decoder 423, computer-switch 424, rf transceiver 425, antenna 426, acoustic transmitter 427, transducer 428 and passive power storage unit 429. The clock function is integral with computer-switch 424. Power for the system is supplied by power storage unit 429.

In operation, a coded sound signal impinged on sensor 421 is converted to a digital electric signal, amplified in amplifier circuit 422 and decoded in coder-decoder 423. The memory of computer-switch 424 combines ROM and RAM capability. The decoded signal is matched in computer-switch 424 with a previously stored code. If a match is made, the computer-switch 424 initiates a response. In this embodiment, the code can require either of an rf transmission or an acoustic transmission. In the event an rf transmission is required by the received signal, the computer-switch transmits a signal to coder-decoder 423 causing coder-decoder 423 to encode a signal to be transmitted. The encoded signal now is returned through computer-switch 424 and broadcast to rf transceiver 425 for broadcast through antenna 426. In the event than an acoustic transmission is required, the signal emanating from computer-switch 424 is re-encoded in coder-decoder 423 and switched via computer-switch 424 into acoustic transmitter 427 from whence it is broadcast through transducer 428. Power storage unit 429 supplies power to each unit in the PT through computer-switch 424 in this system.

The discriminators 407, 408 and 409 can be omitted in Doppler systems which need only the clocking and code signals for proper operations. Phase or FM modulated systems operate with discriminators.

FIG. 32 is an operational flow chart for AT of FIG. 5. The logic flow of control processor unit 53, code producer unit 54, code unit 55 and code analysis unit 56 which items control the remaining components of the AT begins with start 451 and flows to input 452. This input can either be manual or preprogrammed and handled by machine. This input selects the "branches" of the logic tree to be accessed, i.e., Location, Identification, Motion, Inventory, and/or Systems. The input signal is compared in comparators 453, 454, 455, 456, and 457 and if the signal matches pre-set parameters, the proper branch of the logic tree is activated. If the inputed signal does not match any of the pre-set parameters, a display is triggered and the logic flow returns to "start" 451.

In the location mode, a positive switch at 453 activates start 460, initializes the program at 461 and asks for an input at 462. This input can be manual by operator or preprogrammed. The input signal is encoded at 464 by referring to code list 473. The code is returned to 465 activating the transmitter and initiating a broadcast to the PT. The proper response from the PT activates logic block 466 for computation of the X, Y, and Z coordinates. Block 467 computes a location code from the X, Y, and Z coordinates, and this code is stored at block 468. Comparator 469 asks if the code is complete and if it is not it causes the flow to re-enter the program at connector 463; if the code is complete, the 3-dimensional location is displayed at block 470. Comparator 471 asks if the system's mode is flagged, if the answer is "yes", it causes the program to enter the identification mode at start 474. If comparator's 471 answer is "no", the flow goes to stop 472.

In the identification mode, a positive switch at comparator 454 causes the flow to activate the identification at start 474, initialize the program at 475 and ask for an input at 476. This input can be manual or preprogrammed. The input signal is encoded at 477 by referring to code list 486. The code is returned to 478, activating the transmitter and initiating a broadcast to the PT. The proper PT "response" is returned through the receiver to comparator 479. If there is a proper response, the flow activates display 480 and prints "present", asks if the systems mode is flagged at 481 and chooses the correct path, to stop at 482 or to start the location branch at 487. If there is no proper response at 479, the flow goes to display 483 and prints "missing", to comparator 484 and chooses the correct path to stop 485 or to start 487.

In the motion measurement mode, a positive switch at comparator 455 causes the flow to enter the program at start 487, and initialize the program at 488 and ask for an input at 489, this input can be either manual, or preprogrammed. The input signal is coded at 491 by referring to code list 510. The code is returned at 492 and sent through the transmitter to the PT. When the proper response is returned through the receiver to logic block 493 where the X, Y, Z coordinates are computed. The location code is computed at 494 and stored at 495. The code is checked for completion at 496; if the code is not complete the program is re-entered at connector 490. If the code is complete, the location code is stored in file 511 and is compared in comparator 497 with the data in location file 511. If the location has not changed, a display of "no change" is triggered at display 498. Comparator 499 asks if the system's mode is flagged and chooses the appropriate response of "stop" 500 or "go to the start" 512 of the inventory logic branch. If the location has changed (a positive result at 497), an input is asked for at 502. This is to cause the computer to either display the old and then the new location or to continuously sample the location and trace its movement. A positive response at 501 causes flow to enter logic block 506 and compute the change in the X, Y, Z coordinates ($\Delta X$, $\Delta Y$, and $\Delta Z$) to display the change at 507, update the location in the location file 530 at 508, flow through interruptor 509 to connector 490. The interruptor 509 allows the cycle of tracing the motion of the interrogated object to continue until the operator stops it. If a negative response is given at 501, the old location, and the new location is stored in location file 531 and last location stored at 503. Comparator 504 determines whether the system's mode has been flagged and switches the flow to the proper path of stop 505 or to the start of the inventory mode 512.

In the inventory mode a positive switch at comparator 456 causes the flow to enter start 512, initialize the program 513, code the item at 514 by referred to code list 527. The code is returned through 515 and transmitted to the PT. The response is channeled through the receiver to comparator 516. If there is no response the flow goes to logic block 519 to get the next code from code list 527 and re-enter the program at 515. If the response is positive at comparator 516, the flow goes to 517 where the items "present" are counted. Comparator 518 asks if the inventory is complete; if the inventory is not complete, the flow goes to logic 519, gets the next code and re-enters the program at 515. If the inventory is complete, comparator 520 compares the list of positive responses with the inventory file 529 and if they are the same, prints "no change" at 521 and stops the program at 522. If there is a change in the inventory, the extensions are calculated and tabulated at 523. The inventory file is changed at 524, the inventory and the extension are printed at 525 and the program is stopped at 526.

FIG. 33 is the logic flow diagram of block 55 FIG. 5, in the write mode, which generates the individual codes necessary for the operation of each individual system. Each individual system requires a different set of operations dependent on the needs of the user, e.g., certain applications will not need a motion detector system, while others will need that option. The coding system is set up so that all functions are available on request. The individual location code is compiled of a series of bit strings with pre-established lengths, i.e., the different codes will be the first x number of bits and the next code the second x number, etc., the individual code comprises the string of all the bits present. If a particular code is not used in a particular system, then the uncoded sectors must be filled by loading a dummy code in the allocated area. This is done by loading a generated code from outside the designated code space.

The flow starts at 535, flows to code separator 536, this space selects the information requested, i.e., inventory, location, motion, etc. The encrypter 537 generates a code for the individual modes of operation, i.e., inventory, location, motion, etc., and places them in designated areas in the separated code space 538. Code comparator 539 checks the separated codes for accuracy. Decision block 540 decides whether each code present is a member of an authorized code set. If the decision is "yes", these codes are loaded into a string leaving "blanks" of known number of bits between spaces of requested information. A negative response at 540 sends the flow to code generator 543 which generates a "meaningless" string of bits (i.e., outside of the assigned codes list) and fills the "missing" bits with this meaningless intelligence such as a string of zero or ones and constructs the identification code string at 542. The logic then flows through 544 to the next operation (i.e., block 56, FIG. 5).

FIG. 34 is the logic flow diagram of block 55, FIG. 5 during the operation mode, when the received code is interpreted. The input either from the AT or a PT enters the flow at 546. It then goes to code separator 547 where the codes are separated, and sent to decrypter 548. The decrypted codes are then compared at code comparator 549. A decision is made at block 550 as to whether or not the codes are members of an authorized code set. If the code is a member, it is stored in the proper segment of temporary storage 552. The code is picked up at block 553 to instruct the machine to manipulate the appropriate data. Block 554 then shunts the flow to the next block, i.e., block 56, FIG. 5.

FIG. 34 is also representative of the logic of PT of FIG. 7 operating through code unit 99.

The above examples and discussion have broadly and specifically described many utilities, circuits, devices and methods for a variety of uses. There are additional uses and systems which will immediately become apparent to those skilled in the art. For example, a PT can be used as a repeater-relay when one needs to extend the range of a system or to be one of a series of repeater-relay PTs in an alarm system requiring the signal of one PT to activate another of the PTs. Individuals skilled in the arts to which these inventions pertain may, if they so desire, be able to manufacture inoperative devices utilizing the teachings of this specification. However, they can also utilize the teachings of this specification to create efficient operative embodiments of the systems described and claimed.

Now, having described the invention, what is claimed is:

1. A monitoring and control system comprising: active transceiver (AT) means including computing means and memory means and adapted for producing and transmitting encoded interrogation signals by at least one of electromagnetic radiation (EMR) and sound and;
   unitary, self-contained passive transceiver (PT) means comprising encodeable and recodeable memory means, including at least one form of ROM memory means, means for encoding and recoding said memory means on the receipt of, respectively, encoding and recoding signals from said AT means, and transmission means adapted to transmit at least one indentification signal only in response to the receipt of said encoded interrogation signal.

2. A monitoring and control system comprising at least one each of an active transceiver (AT) means associated with passive transceiver (PT) means, each being adapted for at least one of electromagnetic radiation (EMR) and sound communication with the other within predetermined distances; and each including computing means and alterable computer memory means,
   said AT means being further adapted for at least one of (a) transmission of coded interrogation signals; (b) calculation, from identification signals transmitted by the PT means, of the location of, the identification of, the motion of, and the count of the said PT means; (c) control of devices associated with PT means and (d) transmitting encoded PT memory alteration codes,
   each PT means further comprising computing means having memory means including at least one form of alterable ROM and means for altering memory means on receipt of at least one PT memory alteration code from an associated AT means and means for transmitting at least one predetermined identification signal only after the receipt of a coded interrogation signal from an associated AT means.

3. A monitoring and control system comprising at least one each of an active transceiver (AT) means associated with passive transceiver (PT) means, each being adapted for at least one of electromagnetic radiation (EMR) and sound communication with the other within predetermined distances; and each including computing means and alterable computer memory means,
   said AT means being further adapted for at least one of (a) transmission of coded interrogation signals; (b) calculation, from identification signals transmitted by the PT means, of the location of, the identification of, the motion of, and the count of the said PT means; (c) control of devices associated with PT means and (d) transmitting encoded PT memory alteration codes,
   each PT means further comprising computing means having memory means and including at least one form of alterable ROM means for altering memory means on receipt of at least one PT memory alteration code from an associated AT means and means for transmitting at least one predetermined encoded identification signal only after the receipt of a coded interrogation signal from an associated AT means.

4. The system of claim 1, 2 or 3 wherein said AT means and said PT means are adapted for communication by at least light.

5. The system of claim 1, 2 or 3 wherein said AT means and said PT means are adapted for communication by at least sound.

6. The system of claim 1, 2, or 3 wherein said AT means and said PT means are adapted for communication by at least radio frequency EMR.

7. The system of claim 1, 2 or 3 wherein said AT means and PT means are adapted for communication by at least microwave frequency EMR.

8. The system of claim 1, 2 or 3 wherein the system is adapted to utilize a plurality of broadcast frequencies in communication between the said AT means and the said PT means.

9. The system of claim 1, 2 or 3 wherein the said PT means is adapted to transmit an identification signal only after receipt of a signal containing at least 12 bits of a predetermined interrogation code.

10. The system of claim 1, 2 or 3 wherein said PT means and AT means are adapted for receiving and transmitting at least 12 bits of coding.

11. The system of claim 1, 2 or 3 wherein the transmissions of the AT means and the PT means each utilize an 18 to 45 bit identification code.

12. The system of claim 1, 2 or 3 wherein the transmissions of the AT means and the PT means each utilize a 36 to 50 bit identification code.

13. The system of claim 1, 2 or 3 wherein the transmissions of the AT means and the PT means each utilize in excess of 26 coded bits for identification purposes.

14. The AT means and PT means of the system of claim 1, 2 or 3 additionally including anti-jamming means.

15. The At means and PT means of the system of claim 1, 2 or 3 additionally including error-detection error-correction means.

16. The AT means and PT means of the system of claim 1, 2 or 3 adapted for use of variable description means.

17. The PT means of the system of claim 1, 2 or 3 additionally having means programmed in said alterable memory means for operating said PT on a predetermined carrier frequency on receipt of predetermined carrier code signal from said AT means.

18. The system of claim 1, 2 or 3 wherein the computing means includes means adapted to encode and decode a plurality of codes for a plurality of purposes.

19. The system of claim 1, 2 or 3 wherein the said PT means includes means for transmitting signals at least one of different rates, frequencies and distances on coded command of said AT means.

20. The system of claim 1, 2 or 3 wherein computing means of the AT and the PT effect coded communication using a combination of digital and frequency codes.

21. The system of claim 1, 2 or 3 wherein the said AT means additionally are sealed, coded with an identification code, and include at least one of means for producing variable description code means, error detection-error correction means, redundant circuit means, and anti-jamming means.

22. The system of claim 1, 2 or 3 wherein at least the computer memory of said AT means is additionally enclosed in a container means including seal means.

23. The system of claim 22 wherein said AT means additionally includes means for at least one of destroying said memory means or erasing said programming and encoded information in the memory means of said At means on the destruction of the seal created by the seal means.

24. The system of claim 1, 2 or 3 wherein said PT means is adapted for incorporation within a predetermined medium which is substantially transparent to the at least one of sound and EMR which the said PT is adapted to receive and transmit.

25. The system of claim 1, 2 or 3 wherein the AT means is a "hand-held" portable unit.

26. The system of claim 1 wherein said AT means includes computing means programmed to analyze identification signals received from said PT means for at least one of location, indentification, movement and inventory count.

27. The system of claim 1, 2 or 3 wherein the AT means is additionally adapted to control objects with which said PTs means are associated by computing means analysis of the identification signals received by the said AT means from said PT means to obtain control data and inputing said control data into means in association with such objects for controlling such objects.

28. The system of claim 1, 2 or 3 wherein said AT means includes triangulation means adapted to locate PT means.

29. The system of claim 1, 2 or 3 wherein the said AT means includes ranging means adapted to locate PT means.

30. The system of claim 1, 2 or 3 including repeater-relay means.

31. The system of claim 1, 2 or 3 including at least one of associated EMR and sound reflectors.

32. The system of claim 1, 2 or 3 wherein the said AT means includes antenna array means.

33. The system of claim 1, 2 or 3 wherein the said PT means includes memory means in PROM form.

34. The system of claim 1, 2 or 3 wherein the said PT means includes memory means in EPROM form.

35. The system of claim 1, 2 or 3 wherein the said PT means includes memory means in EPROM form.

36. The system of claim 1, 2 or 3 wherein the said PT means includes memory means in EPROM form.

37. The system of claim 1, 2 or 3 wherein the said PT means includes memory means as a combination of non-alterable and alterable memory means.

38. The system of claim 1, 2 or 3 wherein the said PT means includes memory means as an integrated combination of ROM and RAM memory means.

39. The system of claim 1, 2 or 3 wherein the said PT means includes memory means as a combination of RAM and a substantially non-alterable memory means.

40. The system of claim 1, 2 or 3 wherein the said PT means includes memory means as a combination of ROM and at least one alterable memory means.

41. The said PT means of claim 1, 2 or 3 wherein the said PT means includes dynamic RAM memory circuitry.

42. The PT means of the monitoring and control system of claim 1, 2 or 3 further including preprogrammed PROM, said preprogrammed PROM including an address blanking means and multiple addresses.

43. The system of claim 1, 2 or 3 wherein said PT means is adapted for association with objects.

44. The system of claim 1, 2 or 3 wherein said PT means is associated with a solid object.

45. The system of claim 1, 2 or 3 wherein said PT means is associated with a mechanical device.

46. The system of claim 1, 2 or 3 wherein said PT means is associated with a machine tool means.

47. The system of claim 1, 2 or 3 wherein said PT means is associated with a credit card means.

48. The system of claim 1, 2 or 3 wherein said PT means is associated with an identification means.

49. The system of claim 1, 2 or 3 wherein said PT means is associated with a separator slug means.

50. The system of claim 1, 2 or 3 wherein said PT means is associated with a petroleum product means.

51. The system of claim 1, 2 or 3 wherein said PT means is associated with a fencing means.

52. The system of claim 1, 2 or 3 wherein said PT means is associated with a decoration means.

53. The system of claim 1, 2 or 3 wherein said PT means is associated with a picture means.

54. The system of claim 1, 2 or 3 wherein said PT means is associated with a fabric means.

55. The system of claim 1, 2 or 3 wherein said PT means is associated with a clothing means.

56. The system of claim 1, 2 or 3 wherein said PT means is associated with a vehicle means.

57. The system of claim 1, 2 or 3 wherein said PT means is associated with a vehicle component means.

58. The system of claim 1, 2 or 3 wherein said PT means is associated with a container means.

59. The system of claim 1, 2 or 3 wherein said PT means is associated with a food container means.

60. The system of claim 1, 2 or 3 wherein said PT means is associated with a tank means.

61. The system of claim 1, 2 or 3 wherein said PT means is associated with a basket means.

62. The system of claim 1, 2 or 3 wherein said PT means is associated with a dispenser means.

63. The system of claim 1, 2 or 3 wherein said PT means is associated with an encapsulation means.

64. The system of claim 1, 2 or 3 wherein said PT means is associated with means for floating said PT means in a predetermined fluid.

65. The system of claim 1, 2 or 3 wherein said PT means is associated with a boat means.

66. The system of claim 1, 2 or 3 wherein said PT means is associated with a pleasure boat means.

67. The system of claim 1, 2 or 3 wherein said PT means is associated with a marine equipment means.

68. The system of claim 1, 2 or 3 wherein said PT means is associated with an amusement device means.

69. The system of claim 1, 2 or 3 wherein said PT means is associated with a golf ball means.

70. The system of claim 1, 2 or 3 wherein said PT means is adapted for association with an animal.

71. The system of claim 1, 2 or 3 wherein said PT means is associated with a human.

72. The system of claim 1, 2 or 3 wherein said PT means is associated with a book means.

73. The system of claim 1, 2 or 3 wherein said PT means is associated with a record medium means.

74. The system of claim 1, 2 or 3 wherein said PT means is associated with a ticket means.

75. The system of claim 1, 2 or 3 wherein said PT means is associated with a metal medium.

76. The system of claim 1, 2 or 3 wherein said PT means is associated with a paper medium.

77. The system of claim 1, 2 or 3 wherein said PT means is associated with a currency medium.

78. The system of claim 1, 2 or 3 wherein said PT means is associated with a bond medium.

79. The system of claim 1, 2 or 3 wherein said PT means is associated with a stock medium.

80. The system of claim 1, 2 or 3 wherein said PT means is associated with a glass medium.

81. The system of claim 1, 2 or 3 wherein said PT means is associated with a plastic medium.

82. The system of claim 1, 2 or 3 wherein said PT means is associated with a wood medium.

83. The system of claim 1, 2 or 3 wherein said PT means is associated with a particulate medium.

84. The system of claim 1, 2 or 3 wherein said PT means is associated with a picture means.

85. The system of claim 1, 2 or 3 wherein said PT means is associated with an electronic component.

86. The system of claim 1, 2 or 3 wherein said PT means is associated with a key means.

87. The system of claim 1, 2 or 3 wherein said PT means is associated with a building means.

88. The system of claim 1, 2 or 3 wherein said PT means is associated with a building component means.

89. The system of claim 1, 2 or 3 wherein said PT means is associated with a storage means.

90. The system of claim 1, 2 or 3 wherein said PT means is associated with a furniture means.

91. The system of claim 1, 2 or 3 wherein said PT means is associated with a building enclosure means.

92. The system of claim 1, 2 or 3 wherein said PT means is associated with a sensor means.

93. The system of claim 1, 2 or 3 wherein said PT means is associated with a condition sensor means.

94. The system of claim 1, 2 or 3 wherein said PT means is associated with a meter means.

95. The system of claim 1, 2 or 3 wherein said PT means is associated with a valve means.

96. The system of claim 1, 2 or 3 wherein said PT means is associated with a valve operator means.

97. The system of claim 1, 2 or 3 wherein said PT means is associated with a bulk distribution means.

98. The system of claim 1, 2 or 3 wherein said PT means is associated with a grocery means.

99. The system of claim 1, 2 or 3 wherein said PT means is associated with an electronic device means.

100. The system of claim 1, 2 or 3 wherein said PT means is associated with a cable means.

101. The system of claim 1, 2 or 3 wherein said PT means is associated with a cable assembly means.

102. The system of claim 1, 2 or 3 wherein said PT means is associated with an electronic component means.

103. The system of claim 1, 2 or 3 wherein said PT means is associated with an electronic device means.

104. The system of claim 1, 2 or 3 wherein said PT means is associated with a typewriter means.

105. The system of claim 1, 2 or 3 wherein said PT means is associated with an optical reader means.

106. The system of claim 1, 2 or 3 wherein said PT means is associated with a printer means.

107. The system of claim 1, 2 or 3 wherein said PT means is associated with a display means.

108. The system of claim 1, 2 or 3 wherein said PT means is associated with a magnetic recording means.

109. The system of claim 1, 2 or 3 wherein said PT means is associated with a sound reproduction medium.

110. The system of claim 1, 2 or 3 wherein said PT means is associated with a video reproduction medium.

111. The system of claim 1, 2 or 3 wherein said PT means is associated with an isotope disintegration medium.

112. The sytem of claim 1, 2 or 3 wherein said PT means is associated with a fluid medium.

113. The system of claim 1, 2 or 3 wherein said PT means is associated with a plastic medium.

114. The system of claim 1, 2 or 3 wherein said PT means is adapted to receive and utilize at least one of an EMR or sound energy spike from an unassociated source.

115. The system of claim 1, 2 or 3 wherein said PT means power source means includes one of a passive power source means and active power source means.

116. The system of claim 1, 2 or 3 wherein said PT means includes encode and decode means and alterable memory means adapted to maintain in said memory means the codes impressed in said memory means.

117. The system of claim 1, 2 or 3 wherein said PT means includes at least a broad band antenna and a narrow band antenna.

118. The system of claim 1, 2 or 3 wherein said PT means includes at least one of broad band antenna means and narrow band antenna means.

119. The system of claim 1, 2 or 3 wherein said AT means antenna means includes satellite communication means.

120. The system of claim 1, 2 or 3 wherein said AT means antenna means includes microwave communication means.

121. The system of claim 1, 2 or 3 wherein said AT means antenna means includes telecommunication means.

122. The system of claim 1, 2 or 3 wherein said PT means is associated with a computer means.

123. The system of claim 1, 2 or 3 wherein said PT means is associated with a communication device means.

124. The system of claim 1, 2 or 3 wherein said PT means is associated with a telephone means.

125. The system of claim 1, 2 or 3 wherein said PT means is associated with an object storage means.

126. The system of claim 1, 2 or 3 wherein said PT means is associated with a parking means.

127. The system of claim 1, 2 or 3 wherein said PT means is associated with a shelving means.

128. The system of claim 1, 2 or 3 wherein said PT means is associated with a sensor and alarm means.

129. The system of claim 1, 2 or 3 wherein said PT means is associated with a photovoltaic means.

130. The system of claim 1, 2 or 3 wherein said PT means is associated with a piezoelectric means.

131. The system of claim 1, 2 or 3 wherein said PT means is associated with a thermoelectric means.

132. The system of claim 1, 2 or 3 wherein said PT means is associated with a way means.

133. The system of claim 1, 2 or 3 wherein said PT means is associated with a lane means.

134. The system of claim 1, 2 or 3 wherein said PT means is associated with a robot means.

135. The system of claim 1, 2 or 3 wherein said AT antenna means includes cellular radio telephone means.

136. The system of claim 1, 2 or 3 wherein said PT means is associated with a machine tool means.

137. The system of claim 1, 2 or 3 wherein said PT means is associated with a machine tool workpiece means.

138. The system of claim 1, 2 or 3 wherein said PT means is associated with a sorter means.

139. The system of claim 1, 2 or 3 wherein said PT means is associated with a counter means.

140. The system of claim 1, 2 or 3 wherein said PT means is associated with a human adornment means.

141. The system of claim 1, 2 or 3 wherein said PT means is associated with a jewelry means.

142. The system of claim 1, 2 or 3 wherein said PT means is associated with an integrated circuit chip means to make an integrated whole.

143. The system of claim 1, 2 or 3 wherein PT means includes an integrated circuit chip means.

* * * * *

UNITED STATES PATENT AND TRADEMARK OFFICE
CERTIFICATE OF CORRECTION

PATENT NO. : 4,656,463                                Page 1 of 2

DATED     : April 7, 1987

INVENTOR(S) : Frank W. Anders et al.

It is certified that error appears in the above-identified patent and that said Letters Patent is hereby corrected as shown below:

Column 3, line 55, after "and" insert --Digital Computer Design--.
Column 4, line 4, delete "association" and insert --associated--.
Column 4, line 55, delete "he" and insert --the--.
Column 5, line 49, delete "compicated" and insert --complicated--.
column 5, line 52, delete "gold" and insert --golf--.
Column 5, line 54, delete "gold" and insert --golf--.
Column 6, line 38, delete "lile" and insert --like--.
Column 6, line 66, delete "chosen transparency" and insert
--chosen. Transparency --.
Column 9, line 3, delete "tha" and insert --that--.
Column 9, line 35, delete " "PT" " and insert --PT--.
Column 11, line 22, delete "premanently" and insert --permanently--.
Column 12, line 53, delete "through" and insert --though--.
Column 14, line 65, delete "EMF" and insert --EMR--.
Column 15, line 63, delete "for determining" and insert
--can determine--.
Column 19, line 7, delete ")" and insert --,--.
Column 19, line 53, delete "which communication is via"
Column 19, line 54, delete "rf" and insert --Rf--.
Column 19, line 61, after "and" insert --a--.
Column 19, line 63, after "antenna and" insert --an--.
Column 22, line 62, delete "alarm unit 66" and insert --alarm unit 67--.
Column 27, line 16, after "is" insert --that--,
Column 38, line 16, after "hand-held" insert --unit--,
Column 40, line 17, delete "converser" and insert --converter--.
Column 40, line 21, delete "utilizes" and insert --utilities--.
Column 40, line 55, delete "of" and insert --or--.
Column 40, line 62, delete "than" and insert --that--,

UNITED STATES PATENT AND TRADEMARK OFFICE
CERTIFICATE OF CORRECTION

PATENT NO. : 4,656,463

DATED : April 7, 1987

INVENTOR(S) : Frank W. Anders et al.

It is certified that error appears in the above-identified patent and that said Letters Patent is hereby corrected as shown below:

Column 42, line 24, delete "referred" and insert --referring--.
Column 45, line 7, delete "At" and insert --AT--.
Column 45, line 50, after "Claim 1" insert --,2 or 3--.
Column 45, line 54, delete "indentification" and insert --identification--.
Column 46, line 12, delete "EPROM" and insert --EEPROM--.
Column 46, line 14, delete "EPROM" and insert EAPROM--.

Signed and Sealed this

Fourth Day of October, 1988

Attest:

DONALD J. QUIGG

*Attesting Officer*　　　*Commissioner of Patents and Trademarks*